US010480177B2

(12) United States Patent
Siddhartha et al.

(10) Patent No.: US 10,480,177 B2
(45) Date of Patent: Nov. 19, 2019

(54) WALL PANEL BLOCKING BRACKET AND METHOD OF USING SAME

(71) Applicant: Illinois Tool Works Inc., Glenview, IL (US)

(72) Inventors: Yash Siddhartha, Chicago, IL (US); Anthony Versino, Buffalo Grove, IL (US); Sakif Ferdous, Arlington Heights, IL (US); Michael Schwitter, Coppell, TX (US); Stephen Moore, Palatine, IL (US); Genaro Cortez, Bolingbrook, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 15/805,772

(22) Filed: Nov. 7, 2017

(65) Prior Publication Data

US 2018/0142463 A1 May 24, 2018

Related U.S. Application Data

(60) Provisional application No. 62/424,032, filed on Nov. 18, 2016.

(51) Int. Cl.
*E04B 2/70* (2006.01)
*F16M 13/02* (2006.01)
(Continued)

(52) U.S. Cl.
CPC .............. *E04B 1/40* (2013.01); *F16M 13/02* (2013.01); *E04B 2/70* (2013.01); *E04B 2001/405* (2013.01)

(58) Field of Classification Search
CPC .. F16M 13/02; F16M 13/005; F16M 2200/08; E04B 2001/2415; E04B 1/24;
(Continued)

(56) References Cited

U.S. PATENT DOCUMENTS 598,135 A 2/1898 Butz
744,527 A 11/1903 Gervais
(Continued)

FOREIGN PATENT DOCUMENTS

GB 2 488 794 9/2012
WO WO 01/16437 3/2001
WO WO 2016/191426 12/2016

OTHER PUBLICATIONS

Bracket photograph available prior to Nov. 18, 2016 (1 page).
(Continued)

*Primary Examiner* — Phi D A
(74) *Attorney, Agent, or Firm* — Neal, Gerber & Eisenberg LLP

(57) ABSTRACT

In various embodiments, the present disclosure provides a wall panel blocking bracket including a first base, a first stud side engager connected to and extending upwardly from the first base, a second stud side engager connected to and extending upwardly from the first base, a second base connected to the first stud side engager, a third base connected to the second stud side engager, a first hook extending transversely from the first stud side engager, a second hook extending transversely from the second stud side engager, all configured to partially support a wooden block adjacent to a support beam in any one of a perpendicular orientation, a first position parallel orientation, and a second different position parallel orientation.

16 Claims, 28 Drawing Sheets

(51) Int. Cl.
*E04B 1/41* (2006.01)
*E04B 1/38* (2006.01)

(58) Field of Classification Search
CPC .... E04B 1/40; E04B 2001/405; E04B 1/2608;
E04B 1/2612; E04B 2001/2696; E04B
2001/2672; E04B 2/70
See application file for complete search history.

(56) References Cited

U.S. PATENT DOCUMENTS

| | | | |
|---|---|---|---|
| 936,167 A * | 10/1909 | Rittler | F16M 11/22 |
| | | | 348/797 |
| 1,146,251 A * | 7/1915 | Harp | E04B 1/2608 |
| | | | 52/289 |
| 1,547,184 A * | 7/1925 | Venzie | E04F 13/045 |
| | | | 52/355 |
| 2,191,979 A * | 2/1940 | Bierbach | E04B 5/12 |
| | | | 52/365 |
| 3,036,347 A | 5/1962 | Findleton | |
| 3,328,056 A | 6/1967 | Heiken | |
| 3,601,428 A | 8/1971 | Gilb | |
| 3,633,950 A | 1/1972 | Gilb | |
| D224,083 S | 7/1972 | Gilb | |
| 3,752,512 A | 8/1973 | Gilb | |
| 3,857,218 A | 12/1974 | Gilb | |
| 3,889,441 A | 6/1975 | Fortine | |
| 4,003,179 A | 1/1977 | Gilb | |
| 4,005,942 A | 2/1977 | Gilb | |
| 4,022,537 A | 5/1977 | Gilb | |
| D248,275 S | 6/1978 | Gilb | |
| 4,106,257 A | 8/1978 | Gilb | |
| 4,160,350 A * | 7/1979 | Craib | E04C 3/292 |
| | | | 411/458 |
| D254,476 S | 3/1980 | Gilb | |
| 4,192,118 A | 3/1980 | Gilb | |
| D256,663 S | 9/1980 | Gilb | |
| 4,230,416 A | 10/1980 | Gilb | |
| 4,261,155 A | 4/1981 | Gilb | |
| D260,964 S | 9/1981 | Gilb | |
| 4,291,996 A | 9/1981 | Glib | |
| 4,313,688 A | 2/1982 | Daniels | |
| 4,353,664 A | 10/1982 | Gilb | |
| 4,410,294 A | 10/1983 | Gilb et al. | |
| 4,411,548 A | 10/1983 | Tschan | |
| 4,422,792 A | 12/1983 | Gilb | |
| 4,423,977 A | 1/1984 | Gilb | |
| 4,480,941 A | 11/1984 | Glib | |
| 4,498,801 A | 2/1985 | Gilb | |
| 4,527,375 A * | 7/1985 | Braginetz | E04B 1/2608 |
| | | | 403/232.1 |
| 4,560,301 A | 12/1985 | Gilb | |
| 4,572,695 A | 2/1986 | Gilb | |
| 4,625,415 A * | 12/1986 | Diamontis | E04G 21/1891 |
| | | | 33/562 |
| 4,665,672 A | 5/1987 | Commins et al. | |
| 4,714,372 A | 12/1987 | Commins | |
| 4,717,279 A | 1/1988 | Commins | |
| 4,744,192 A | 5/1988 | Commins | |
| 4,817,359 A | 4/1989 | Colonias | |
| 4,841,690 A | 6/1989 | Commins | |
| 4,890,436 A | 1/1990 | Colonias | |
| 4,896,985 A | 1/1990 | Commins | |
| 4,932,173 A | 6/1990 | Commins | |
| 4,995,206 A | 2/1991 | Colonias et al. | |
| 5,027,573 A | 7/1991 | Commins et al. | |
| 5,042,217 A | 8/1991 | Bugbee et al. | |
| 5,104,252 A | 4/1992 | Colonias et al. | |
| 5,109,646 A | 5/1992 | Colonias et al. | |
| 5,150,553 A | 9/1992 | Commins et al. | |
| 5,150,982 A | 9/1992 | Gilb | |
| 5,197,241 A | 3/1993 | Romeo et al. | |
| 5,236,273 A | 8/1993 | Gilb | |
| 5,240,342 A * | 8/1993 | Kresa, Jr. | E04B 1/2612 |
| | | | 248/300 |
| 5,253,465 A | 10/1993 | Gilb | |
| 5,259,685 A | 11/1993 | Gilb | |
| 5,274,981 A | 1/1994 | Commins | |
| 5,307,603 A * | 5/1994 | Chiodo | E04B 1/2608 |
| | | | 52/297 |
| 5,324,132 A | 6/1994 | Hunter et al. | |
| 5,333,435 A | 8/1994 | Leek | |
| 5,335,469 A | 8/1994 | Stuart | |
| 5,341,619 A | 8/1994 | Dunagan et al. | |
| 5,380,115 A | 1/1995 | Colonias | |
| 5,380,116 A | 1/1995 | Colonias | |
| 5,412,920 A * | 5/1995 | Hess | E04B 5/12 |
| | | | 403/232.1 |
| 5,419,646 A | 5/1995 | Gilb | |
| 5,442,887 A * | 8/1995 | Welsh | E04B 7/045 |
| | | | 52/713 |
| D364,331 S | 11/1995 | Leek | |
| 5,467,570 A | 11/1995 | Leek | |
| 5,555,694 A | 9/1996 | Commins | |
| 5,595,031 A | 1/1997 | Commins | |
| 5,603,580 A | 2/1997 | Leek et al. | |
| 5,611,179 A | 3/1997 | Leek | |
| 5,653,079 A * | 8/1997 | Loeffler | E04B 1/2608 |
| | | | 403/396 |
| 5,732,519 A | 3/1998 | Leek | |
| 5,755,416 A | 5/1998 | Leek | |
| D399,013 S | 9/1998 | Nguyen | |
| H1795 H | 7/1999 | Leek | |
| 6,022,165 A | 2/2000 | Lin | |
| 6,176,057 B1 | 1/2001 | Bouchet et al. | |
| 6,230,466 B1 | 5/2001 | Pryor | |
| 6,230,467 B1 | 5/2001 | Leek | |
| 6,260,402 B1 | 7/2001 | Leek | |
| 6,415,575 B1 * | 7/2002 | Thompson | E04B 1/2608 |
| | | | 52/712 |
| 6,513,290 B2 | 2/2003 | Leek | |
| 6,523,321 B1 | 2/2003 | Leek et al. | |
| 6,560,943 B1 | 5/2003 | Leek et al. | |
| 6,655,096 B1 | 12/2003 | Pryor | |
| 6,658,806 B1 | 12/2003 | Leek | |
| 6,698,971 B1 | 3/2004 | Wilhelmi | |
| 6,796,099 B1 | 9/2004 | Georges et al. | |
| 6,877,291 B2 | 4/2005 | Shamroukh et al. | |
| 7,065,932 B2 | 6/2006 | Roesset et al. | |
| 7,207,150 B2 | 4/2007 | Leek et al. | |
| 7,293,390 B2 | 11/2007 | Roesset et al. | |
| 7,296,386 B2 | 11/2007 | Leek | |
| 7,334,372 B2 | 2/2008 | Evans et al. | |
| 7,367,168 B2 | 5/2008 | Lin | |
| 7,503,148 B2 | 3/2009 | Lin | |
| 7,707,785 B2 | 5/2010 | Lin | |
| 7,716,877 B2 | 5/2010 | Gilstrap et al. | |
| D618,085 S | 6/2010 | Lin et al. | |
| 7,762,031 B2 | 7/2010 | Leek et al. | |
| 7,788,873 B2 | 9/2010 | Leek | |
| 7,891,144 B2 | 2/2011 | Gilstrap et al. | |
| 7,913,472 B2 | 3/2011 | Troth et al. | |
| D640,916 S | 7/2011 | Sias | |
| 7,971,409 B2 | 7/2011 | Bak et al. | |
| 8,720,155 B1 | 5/2014 | Robell | |
| 9,003,738 B1 * | 4/2015 | Evans, Jr. | E04B 5/12 |
| | | | 52/702 |
| 2003/0200705 A1 | 10/2003 | Collie | |
| 2004/0163355 A1 * | 8/2004 | Collie | E04B 7/045 |
| | | | 52/702 |
| 2005/0120669 A1 | 6/2005 | Harrison | |
| 2006/0266722 A1 | 11/2006 | Roberts | |
| 2007/0044421 A1 | 3/2007 | Nguyen | |
| 2007/0103605 A1 * | 5/2007 | Maruta | F16M 11/22 |
| | | | 348/797 |
| 2007/0221807 A1 * | 9/2007 | Park | F16M 11/10 |
| | | | 248/324 |
| 2007/0245677 A1 | 10/2007 | Nguyen | |
| 2007/0294979 A1 | 12/2007 | Lin et al. | |
| 2008/0101855 A1 | 5/2008 | Lin | |
| 2009/0121097 A1 * | 5/2009 | Takao | F16M 11/10 |
| | | | 248/158 |
| 2010/0011697 A1 | 1/2010 | Nguyen et al. | |

(56) References Cited

U.S. PATENT DOCUMENTS

| | | |
|---|---|---|
| 2010/0146903 A1 | 6/2010 | Ellis |
| 2010/0162638 A1 | 7/2010 | Hunt |
| 2010/0162656 A1 | 7/2010 | Lin |
| 2010/0162783 A1 | 7/2010 | Lin |
| 2010/0166497 A1 | 7/2010 | Vilaskineekul |
| 2010/0229495 A1 | 9/2010 | Gridley et al. |
| 2010/0288992 A1 | 11/2010 | Gray |
| 2011/0107710 A1 | 5/2011 | Sias |
| 2011/0154770 A1 | 6/2011 | Friis |
| 2014/0338282 A1* | 11/2014 | Sidhu ................. E04C 3/04 52/702 |
| 2015/0264823 A1* | 9/2015 | Shirley ............... F16M 13/02 248/287.1 |

OTHER PUBLICATIONS

Simpson Strong-Tie Z-Max 2 in. x 4 in. Galvanized Double Shear Face Mount Joist Hanger, retrieved from the Internet at https://www.homedepot.com/p/Simpson-Strong-Tie-Z-MAX-2-in-x-4-in-Galvanized-Double-Shear-Face-Mount-Joist-Hanger-LUS24Z/100375190?keyword=lus24z, on Nov. 7, 2017 (available prior to Nov. 18, 2016)(4 pages).

International Search Report and Written Opinion for International Application No. PCT/US2017/060602, dated Mar. 1, 2018 (12 pages).

\* cited by examiner

WALL PANEL BLOCKING BRACKET AND METHOD OF USING SAME

PRIORITY

This application claims priority to and the benefit of U.S. Provisional Patent Application Ser. No. 62/424,032, filed Nov. 18, 2016, the entire contents of which is incorporated herein by reference.

BACKGROUND

Wood blocking is a common practice in the construction industry. Wood blocking typically includes installing one or more wooden blocks in the opening between two adjacent, spaced apart support beams such as two adjacent, spaced apart wooden support beams. Wood blocking is commonly used for several purposes such as: (1) structural support; (2) fire blocking; (3) spacing between studs; (4) panel edge supports for sheets of drywall or plywood; and (5) support attachment sites for mounted objects.

There are two generally known methods of constructing a wall structure with support beams and wooden blocks. One method involves constructing the wall structure in an upright position where the wall might be positioned in the final structure. In such case, the support beams extend vertically (i.e. perpendicularly to the ground), and the wooden blocks are connected to the support beams such that they are between the support beams and above the ground.

The other generally known method involves constructing the wall structure in a horizontal position either on site where the final structure will be constructed or off site. In such case, the support beams extend horizontally (i.e. parallel to and on the ground or some flat surface), and the wooden blocks are connected to the support beams such that they rest between the support beams. After properly positioning the support beams and wooden blocks of the wall structure, the wall structure is lifted and positioned into its upright position.

FIG. 1 illustrates a typical arrangement of a wooden block 10 positioned between two adjacent, spaced apart support beams 20a and 20b. The wooden block 10 includes: (1) an outwardly facing first or front side 11; (2) a downwardly facing second or bottom side 12; (3) an upwardly facing third or top side 13; (4) an outwardly facing fourth or end side 14; (5) an outwardly facing fifth or opposing end side 15; and (6) an outwardly facing sixth or rear side 16.

The support beam 20a includes: (1) an outwardly facing first or front side 21a; (2) a second or inwardly facing side 22a; (3) a third or outwardly facing side 23a; (4) an outwardly facing fourth or back side 24a that faces away from the first side 21a; (5) an upwardly facing fifth or top side 25a; and (6) a downwardly facing sixth or bottom side 26a.

The support beam 20b includes: (1) an outwardly facing first or front side 21b; (2) a second or inwardly facing side 22b; (3) a third or outwardly facing side 23b; (4) an outwardly facing fourth or back side 24b that faces away from the first side 21b; (5) an upwardly facing fifth or top side 25b; and (6) a downwardly facing sixth or bottom side 26b.

It is well known to attach the wooden block between two support beams without any brackets. It is also well known to attach the wooden block between two support beams with one or more known brackets.

FIGS. 2 and 3 illustrate a known bracket 30 used to secure a wooden block to and between two adjacent, spaced apart support beams. This known bracket 30 includes: (1) a member 32; (2) a member 34a connected to and extending upwardly from the member 32; (3) a member 34b connected to and extending upwardly from the member 32; (4) a member 36a connected to and extending transversely to the member 34a; and (5) a member 36b connected to and extending transversely to the member 34b. The member 34a defines a fastener opening 38a. The member 34b defines a fastener opening 38b. The member 36a defines the fastener openings 40a. The member 36b defines fastener openings 40b.

FIG. 4 illustrates a way to install the wooden block 10 between two support beams 20a and 20b using two such known brackets 30. An installer typically first connects a first known bracket 30 to the support beam 20a. More specifically, the installer inserts a nail through the fastener opening 40a on the known bracket 30 and drives the nail into the second side 22a of the support beam 20a using a hammer or powered nailer. The installer repeats this process by driving another through the fastener opening 40b. The installer connects another such known bracket 30 via the same process to the opposite support beam 20b. The known brackets 30 are positioned directly across from one another. The installer measures the distance between the two support beams 20a and 20b. The installer uses that measurement to cut a wooden block 10 to the measured length. After cutting, the installer positions the wooden block 10 in the opening between the two support beams 20a and 20b such that the fourth side 14 of the wooden block 10 engages with the second side 22a of the support beam 20a and the fifth side 15 of the wooden block 10 engages with the second side 22b of the support beam 20b. The wooden block 10 also rests on the top surface of the member 32 of each known bracket 30. The installer secures the wooden block 10 to the support beams 20a and 20b. More specifically, the installer inserts another nail through the fastener opening 38a. The installer toes nails the nail through the fastener opening 38a. The nail traverses the wooden block 10 and inserts itself into the second side 22a of the support beams 20a. The installer repeats this process by inserting nails into the fastener openings 38a and 38b of the other known bracket 30 to connect the wooden block 10 to the other support beam 20b.

One problem with this known bracket 30 is that there it is difficult to position the wooden block prior to nailing either the wooden block to the support beams or the brackets to the support beams. This can lead to positioning the brackets along the side of the support beams inaccurately. In such case, this can lead to positioning the wooden block between two support beams inaccurately. Additionally, either one or both ends of the wooden block would not properly rest on the top surface(s) of the base(s) of the bracket(s). These inaccuracies can result in wasted time and materials when an installer tries to correctly position the brackets on and the wooden block between two support beams.

Another problem with this known bracket is that the installer has to bend over for long periods of time while installing the brackets and wooden block. This can provide discomfort to the installer.

Another problem with this known bracket is that it only enables the installer to install the wooden block in one orientation between the adjacent, spaced apart support beams. The wooden block can only rest on this known bracket in one possible orientation.

Accordingly, there is a need to solve the above problems.

SUMMARY

The present disclosure provides various different versions of a wall panel blocking bracket and method of using same that overcome the above described problems.

In various embodiments, two brackets of the present disclosure are configured to rest on adjacent, spaced apart support beams. The brackets may or may not be connected to the support in different versions. The brackets are configured to support one or more wooden blocks. The brackets rest on or against the respective side of the support beams such the wooden block can rest between the adjacent, spaced apart support beams. In various embodiments, the brackets are configured to enable the installer to change the position of the wooden block and brackets if necessary along the sides of the support beams to properly position the wooden block between the support beams.

In various embodiments of the present disclosure, each bracket is configured to position or assist the installer in positioning the wooden block in three different orientations relative to the support beams. The three different orientations include: (1) a perpendicular orientation; (2) a first position parallel orientation; and (3) a second position parallel orientation. These embodiments of the bracket enable one bracket to be used for multiple different installation methods.

In various methods of installing the wooden block between two support beams using the various embodiments of the bracket of the present disclosure, the support beams lie parallel to the ground. It should be appreciated that the bracket of the present disclosure can be used in other orientations, such as when the support beams are positioned in an upright manner from the ground. In certain such cases, the bracket of the present disclosure can be configured so that the first and second hooks fit tightly on the support beam and do not fall off of the support beam when placed on the upright support beam.

Additional features and advantages of the present invention are described in, and will be apparent from, the following Detailed Description and the Figures.

DETAILED DESCRIPTION OF EXAMPLE EMBODIMENTS

Figure 1:
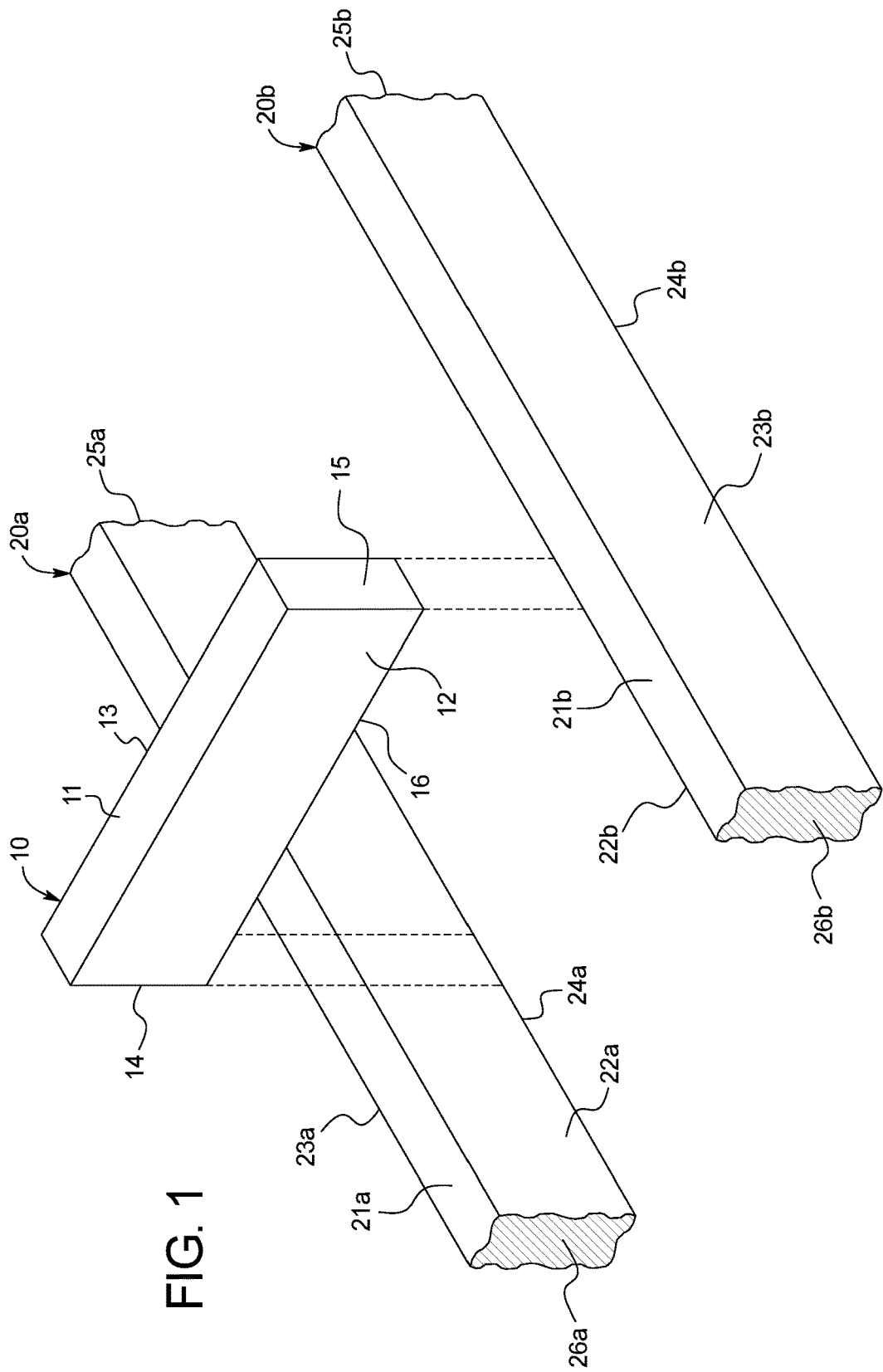
FIG. 1 is an exploded perspective view of a wooden block between two support beams.
Figure 2:
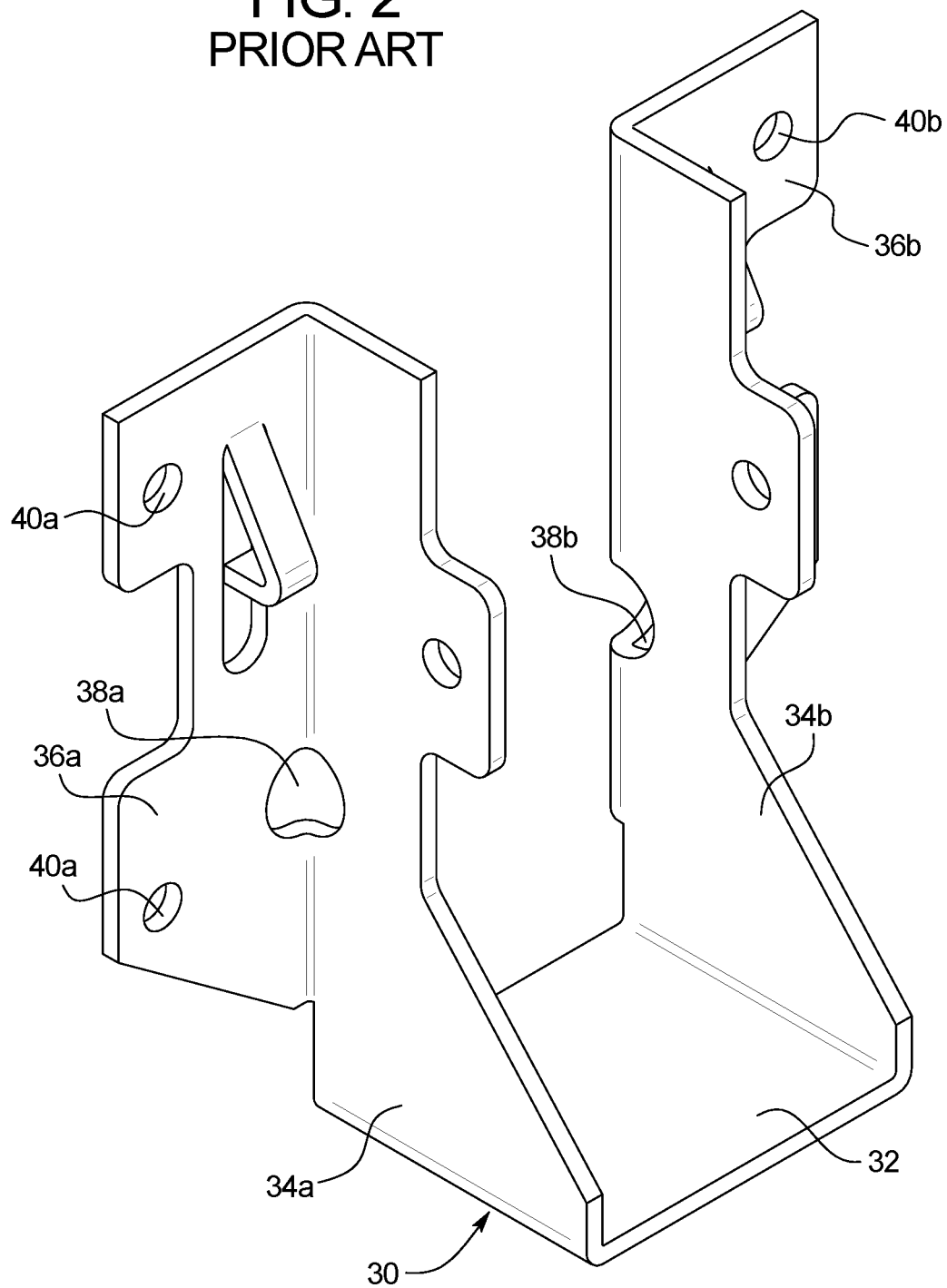
FIG. 2 is a front perspective view of a known bracket.
Figure 3:
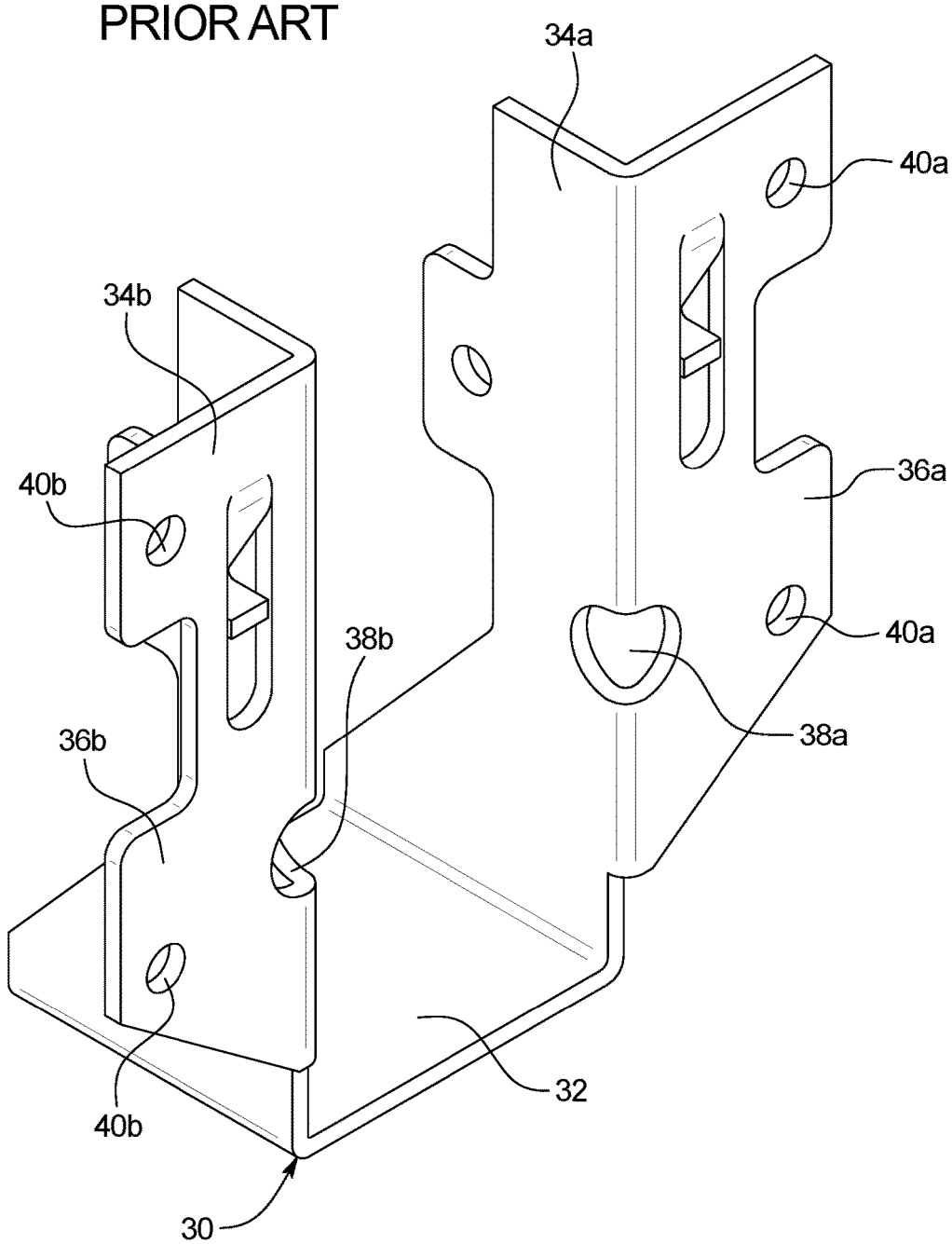
FIG. 3 is a rear perspective view of the known bracket of FIG. 2.
Figure 4:
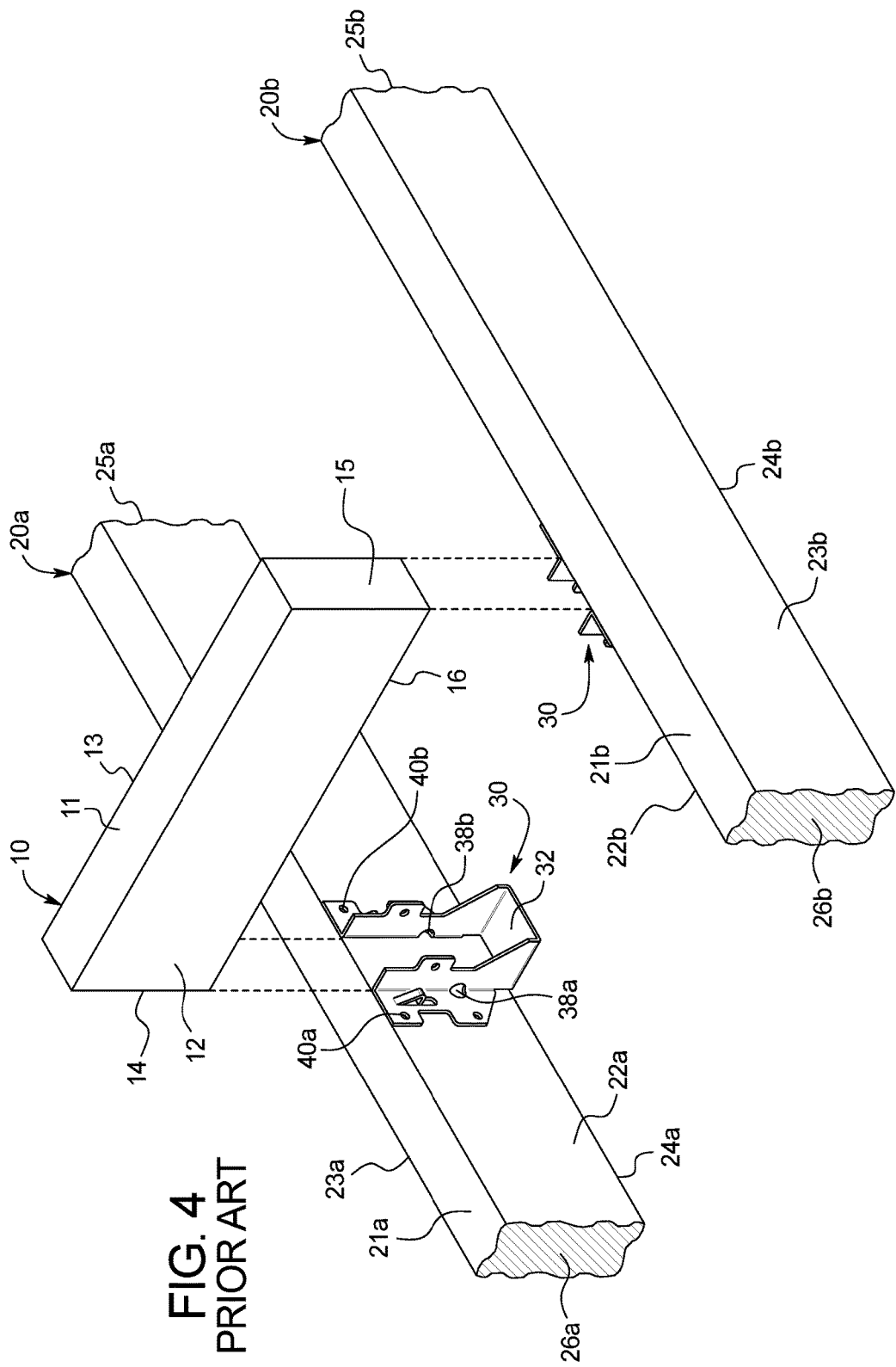
FIG. 4 is a partially exploded perspective view of two known brackets of FIG. 2 attached to two support beams and the wooden block prior to attachment to the brackets.
Figure 5:
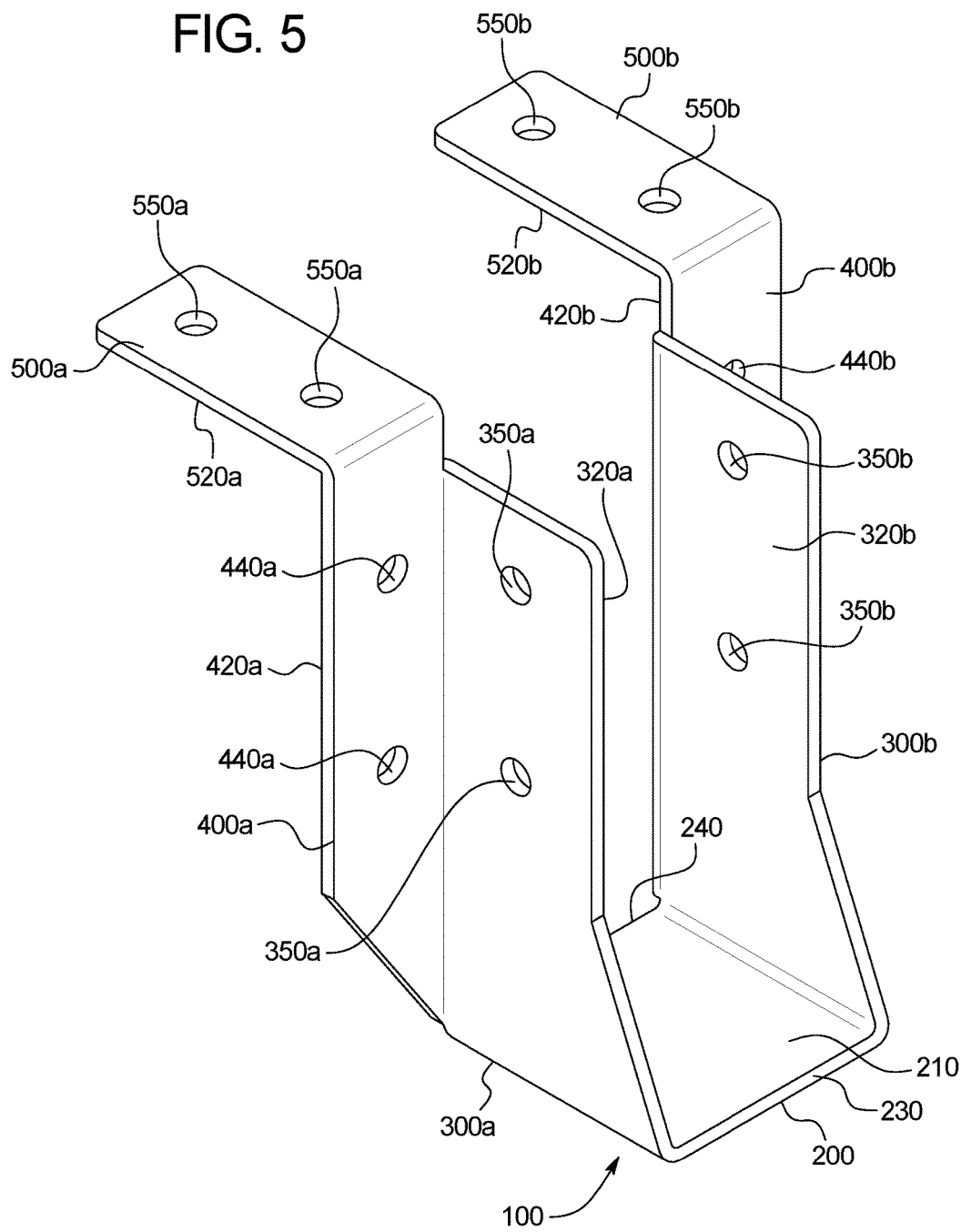
FIG. 5 is a front perspective view of a bracket of one example embodiment of the present disclosure.
Figure 6:
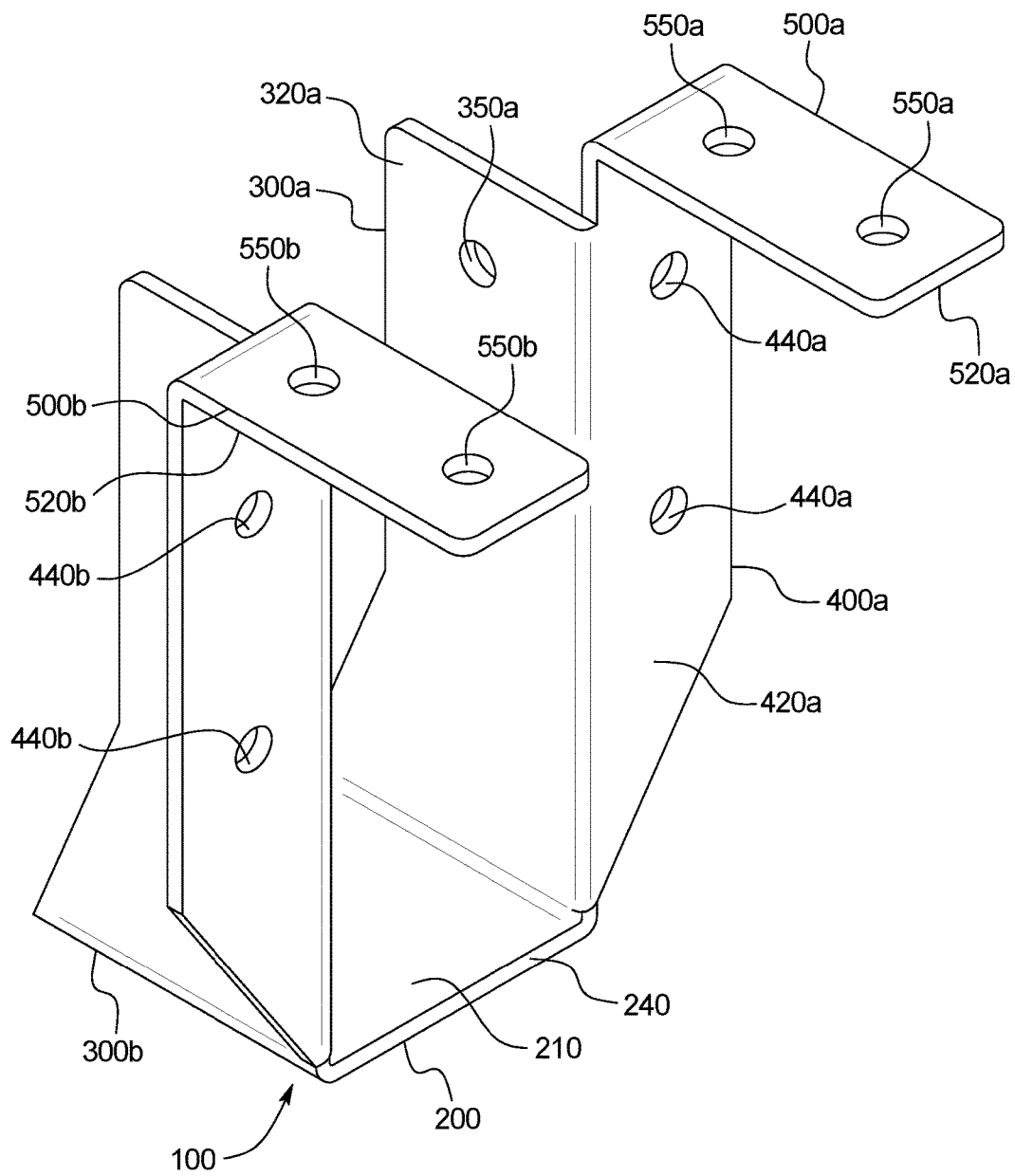
FIG. 6 is a rear perspective view of the bracket of FIG. 5.
Figure 7:
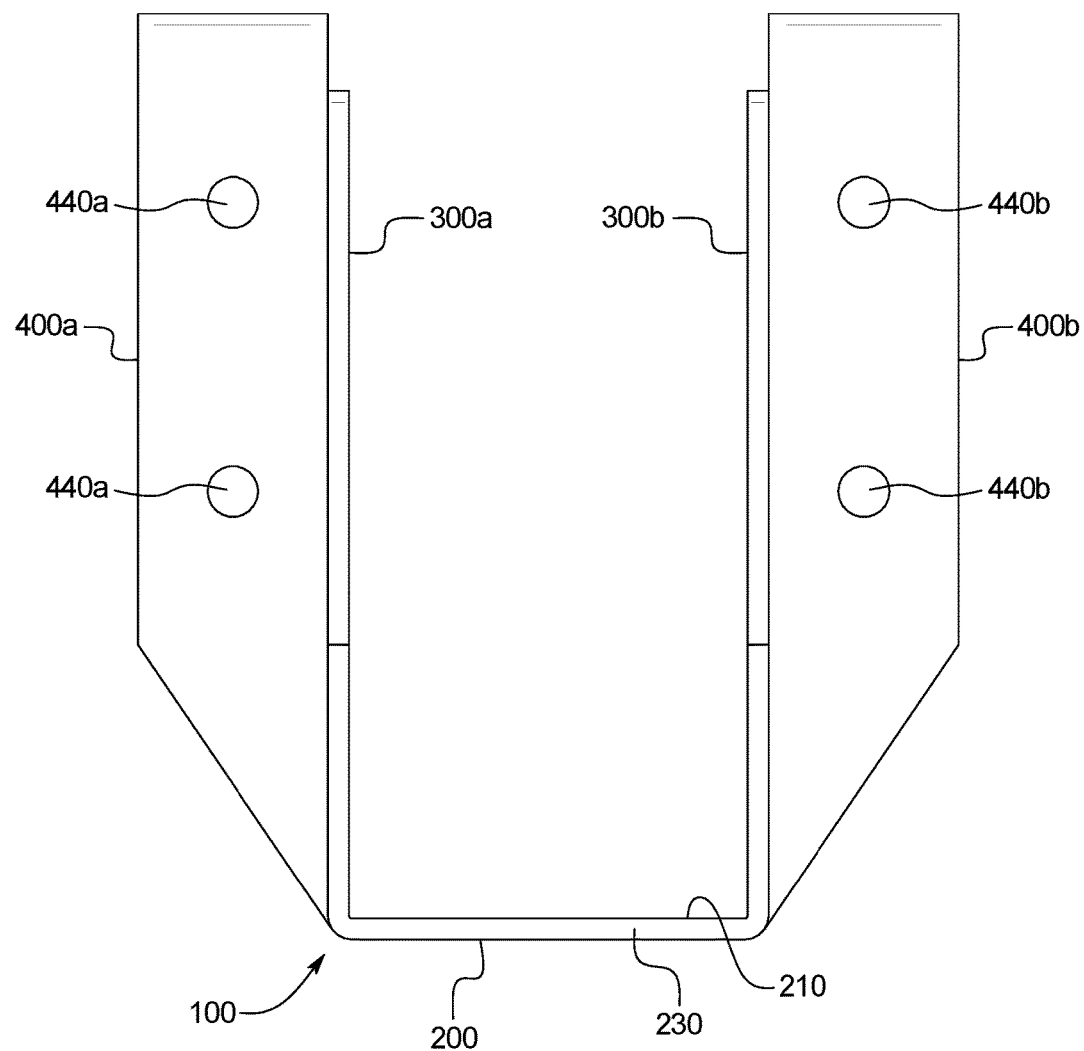
FIG. 7 is front view of the bracket of FIG. 5.
Figure 8:
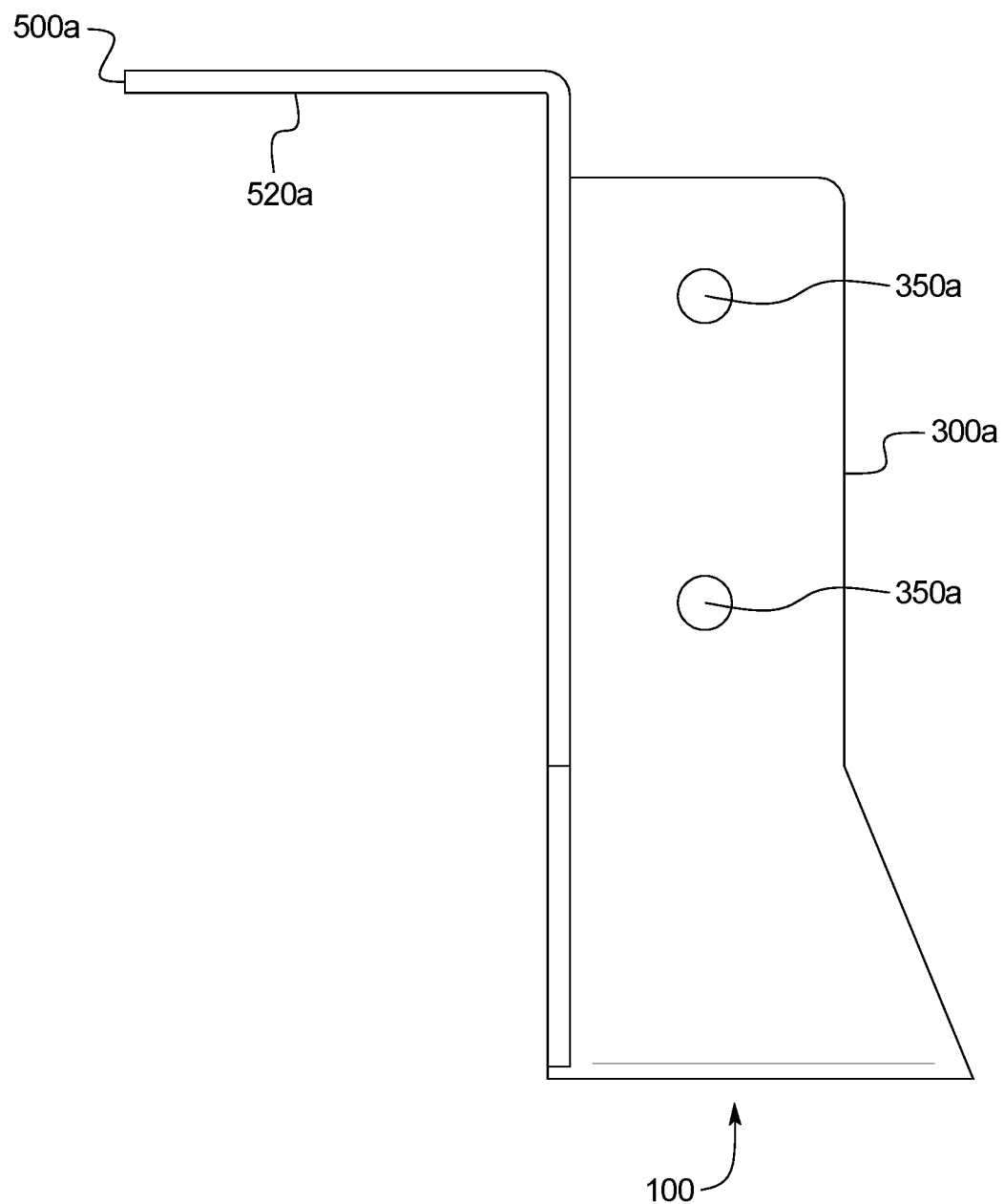
FIG. 8 is a side view of the bracket of FIG. 5.
Figure 9:
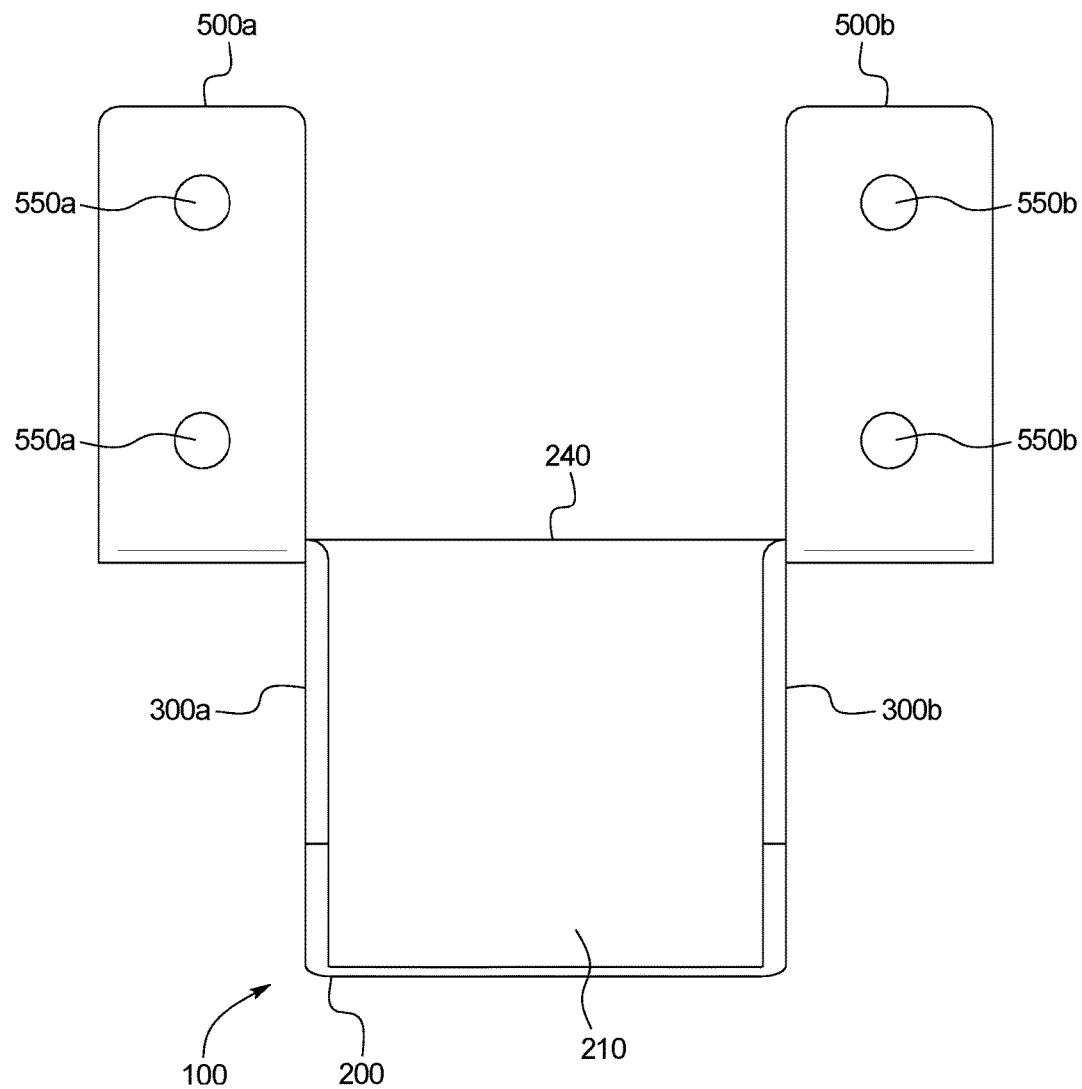
FIG. 9 is a top view of the bracket of FIG. 5.

The present disclosure provides a wall panel blocking bracket and method of using same that overcome the above described problems. Six different example versions or different embodiments of the brackets of the present disclosure are discussed below; however, it should be appreciated that the present disclosure is not limited to such example brackets or methods of using same. For brevity, the "wall panel blocking bracket" is primarily referred to as the "bracket" in this disclosure.

First Example Embodiment

Referring now to FIGS. 5, 6, 7, 8, 9, 10 and 11, one example embodiment of the bracket of the present disclosure is generally illustrated and indicated by numeral 100. This first example embodiment of the bracket 100 is configured to rest on the side of the support beam and to support the wooden block in a single perpendicular orientation.

The bracket 100 generally includes: (1) an outwardly facing base 200; (2) a first block positioner 300a connected to and extending upwardly from the base 200; (3) a second block positioner 300b connected to and extending upwardly from the base 200; (4) a first stud side engager 400a connected to and extending transversely to the first block positioner 300*a*; (5) a second stud side engager 400*b* connected to and extending transversely to the second block positioner 300*b*; (6) a first hook 500*a* connected to and extending transversely to the first stud side engager 400*a*; and (7) a second hook 500*b* connected to and extending transversely to the second stud side engager 400*b*.

More specifically, the outwardly facing base 200 in this illustrated example embodiment includes: (1) an upwardly facing top surface 210; (2) a downwardly facing bottom surface; (3) an outwardly facing edge 230 connecting the upwardly facing top surface 210 and the downwardly facing surface; and (4) an outwardly facing edge 240 connecting the upwardly facing top surface 210 and the downwardly facing bottom surface. The base 200 is configured to support the wooden block 10 by enabling the wooden block 10 to rest on the upwardly facing top surface 210 of the base 200.

The first block positioner 300*a* includes: (1) an outwardly facing side surface; (2) an inwardly facing side surface 320*a*; (3) an outwardly facing edge connecting the outwardly facing side surface and the inwardly facing side surface 320*a*; (4) an upwardly facing top edge connecting the outwardly facing side surface, the inwardly facing side surface 320*a*, and the outwardly facing edge; and (5) a body with a plurality of circular inner edges that define fastener openings 350*a*. The first block positioner 300*a* is configured to engage with the second side 12 of the wooden block 10. This ensures that the wooden block 10 rests on the upwardly facing top surface 210 of the base 200 of each bracket 100 when the installer positions the wooden block 10 between the support beams 20*a* and 20*b*. The fastener openings 350*a* enable an installer to drive nails using a hammer or powered nailer through the respective fastener openings 350*a* and connect the bracket 100 to the wooden block 10.

The second block positioner 300*b* includes: (1) an outwardly facing side surface; (2) an inwardly facing side surface 320*b*; (3) an outwardly facing edge connecting the outwardly facing side surface avfnd the inwardly facing side surface 320*b*; (4) an upwardly facing top edge connecting the outwardly facing side surface, the inwardly facing side surface 320*b*, and the outwardly facing edge; and (5) a body with a plurality of circular inner edges that define fastener openings 350*b*. The second block positioner 300*b* is configured to engage with the third side 13 of the wooden block 10. This ensures that the wooden block 10 rests on the upwardly facing top surface 210 of the base 200 of each bracket 100 when the installer positions the wooden block 10 between the support beams 20*a* and 20*b*. The fastener openings 350*b* enable an installer to drive nails using a hammer or nailer through the respective fastener openings 350*b* and connect the bracket 100 to the wooden block 10.

The first stud side engager 400*a* includes: (1) an outwardly facing side surface; (2) an inwardly facing side surface 420*a*; (3) an outwardly facing edge connecting the outwardly facing side surface and the inwardly facing side surface 420*a*; and (4) a body with a plurality of circular inner edges that define fastener openings 440*a*. The inwardly facing side surface 420*a* is configured to engage with the second side 22*a* of the support beam 20*a*. The first stud side engager 400*a* includes fastener openings 440*a* facilitating driving nails using a hammer or nailer through the respective fastener openings 440*a* and connecting the bracket 100 to the second side 22*a* of the support beam 20*a*.

The second stud side engager 400*b* includes: (1) an outwardly facing side surface; (2) an inwardly facing side surface 420*b*; (3) an outwardly facing edge connecting the outwardly facing side surface and the inwardly facing side surface 420*b*; and (4) a body with a plurality of circular inner edges that define fastener openings 440*b*. The inwardly facing side surface 420*b* is configured to engage with the second side 22*a* of the support beam 20*a*. The second stud side engager 400*b* includes fastener openings 440*b* facilitating driving nails using a hammer or nailer through the respective fastener openings 440*b* and connecting the bracket 100 to the inwardly facing side 22*a* of the support beam 20*a*.

The first hook 500*a* includes: (1) an upwardly facing top surface; (2) a downwardly facing bottom surface 520*a*; (3) an outwardly facing edge connecting the upwardly facing top surface and the downwardly facing bottom surface 520*a*; (4) an outwardly facing edge 540*a* connecting the upwardly facing top surface, the downwardly facing bottom surface 520*a*, and the outwardly facing edge; and (5) a body with a plurality of circular inner edges that define fastener openings 550*a*. The downwardly facing bottom surface 520*a* is configured to engage with the first side 21*a* of the support beam 20*a*. When engaging with the first side 21*a* of the support beam 20*a*, the first hook 500*a* enables the installer to manually move the bracket 100 along the first side 21*a* of the support beam 20*a*. This enables the installer to properly position the bracket 100, and therefore, the wooden block 10 between two support beams 20*a* and 20*b*. The first hook 500*a* includes fastener openings 550*a* facilitating driving nails using a hammer or nailer through the respective fastener openings 550*a* and connecting the bracket to the first side 21*a* of the support beam 20*a*.

The second hook 500*b* includes: (1) an upwardly facing top surface; (2) a downwardly facing bottom surface 520*b*; (3) an outwardly facing edge connecting the upwardly facing top surface and the downwardly facing bottom surface 520*b*; (4) an outwardly facing edge connecting the upwardly facing top surface 510*b*, the downwardly facing bottom surface 520*b*, and the outwardly facing edge; and (5) a body with a plurality of circular inner edges that define fastener openings 550*b*. The downwardly facing bottom surface 520*b* is configured to engage with the first side 21*a* of the support beam 20*a*. When engaging with the first side 21*a* of the support beam 20*a*, the second hook 500*b* enables the installer to manually move the bracket 100 along the first side 21*a* of the support beam 20*a*. This enables the installer to properly position the bracket 100, and therefore, a wooden block 10 between two support beams 20*a* and 20*b*. The second hook 500*b* includes fastener openings 550*b* facilitating driving nails using a hammer or nailer through the respective fastener openings 550*b* and connecting the bracket to the first side 21*a* of the support beam 20*a*.

It should be appreciated that multiple brackets 100 will or can be used together on adjacent, spaced apart support beams.

Figure 10:
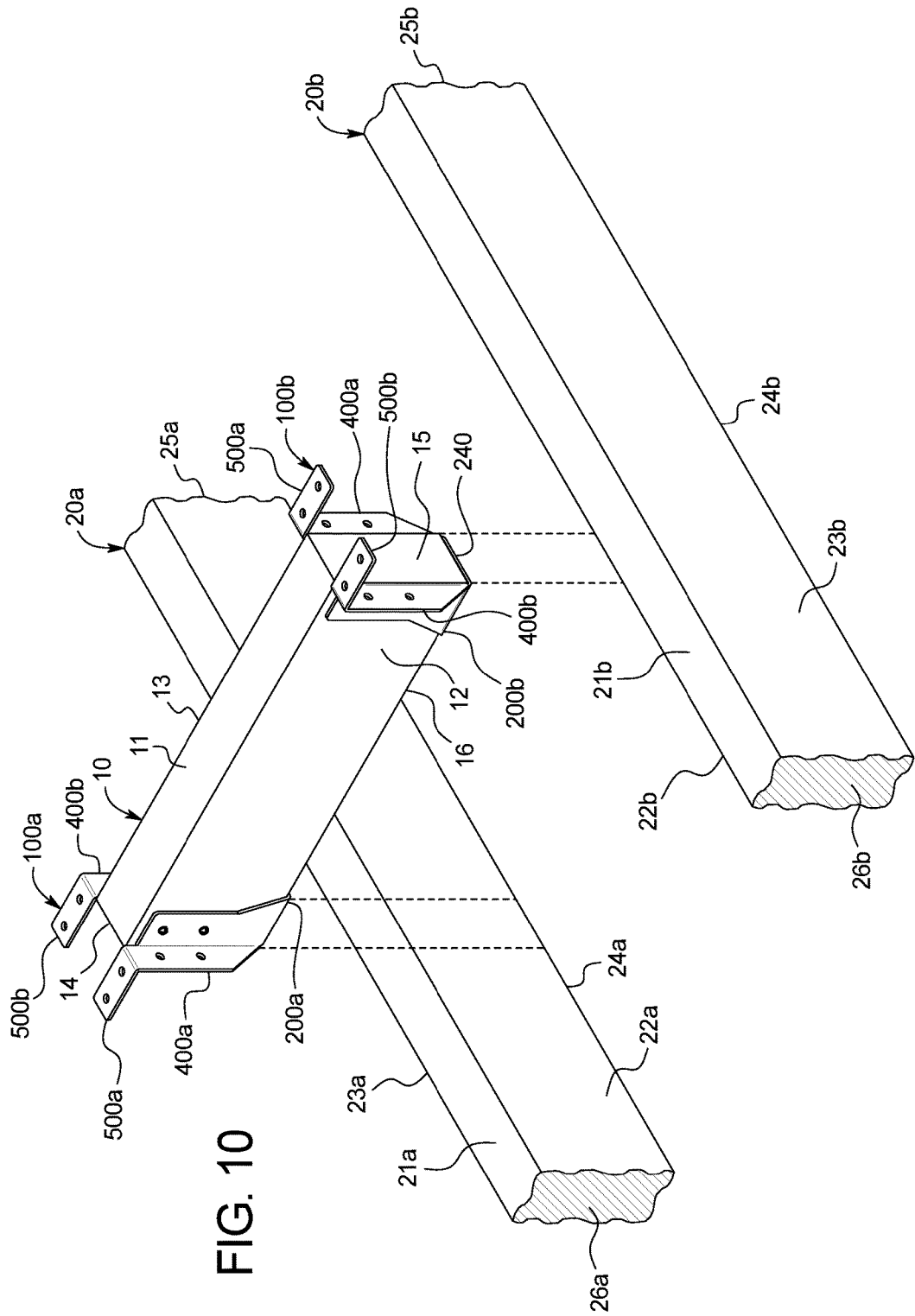
FIG. 10 is a partially exploded perspective view of two brackets of FIG. 5 in the perpendicular orientation connected to the ends of the wooden block.
Figure 11:
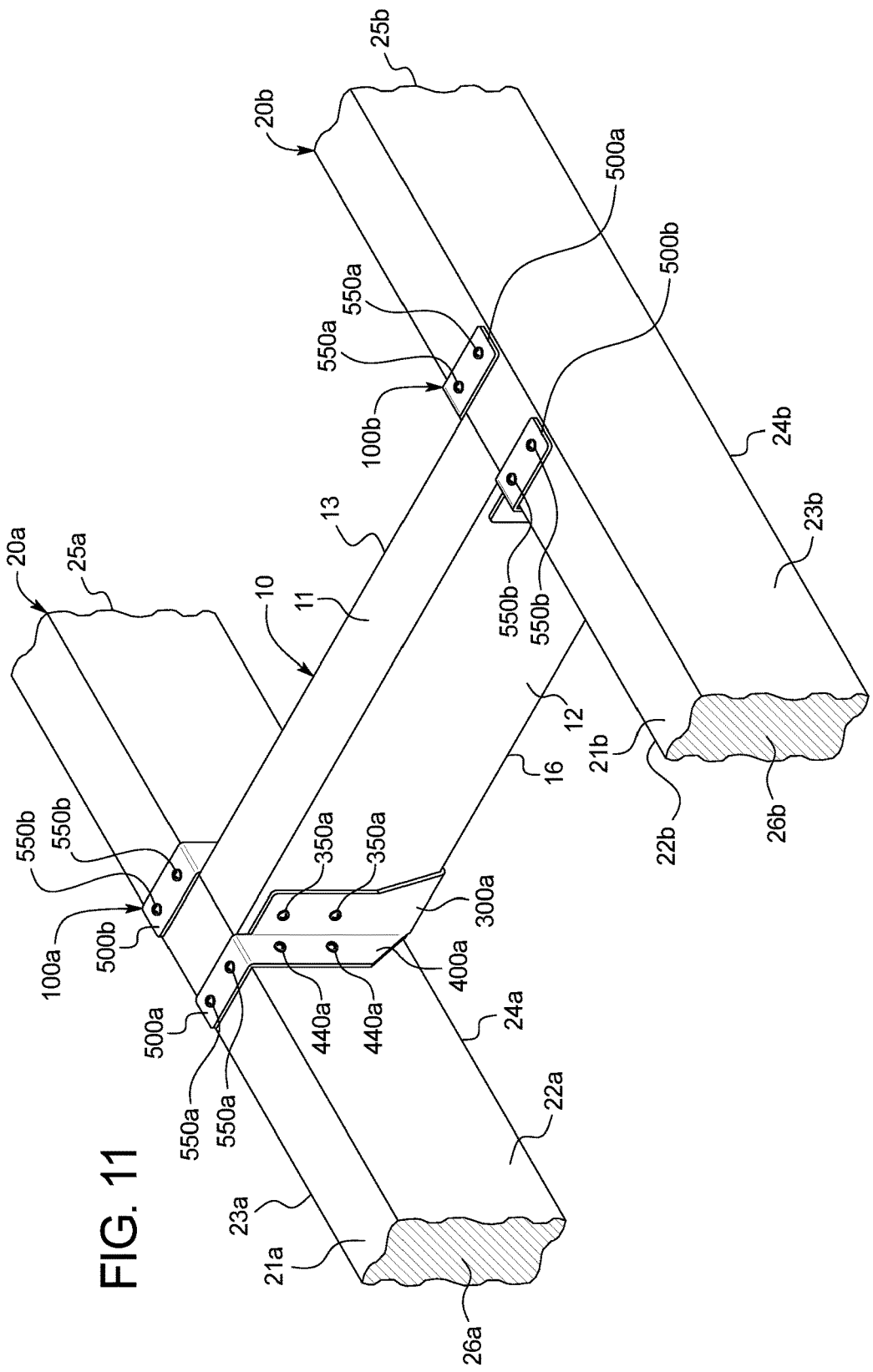
FIG. 11 is a perspective view of the wooden block in the perpendicular orientation positioned between two support beams using two brackets of FIG. 5.

FIGS. 10 and 11 illustrate one method of using the bracket 100 for single orientation perpendicular blocking.

The method includes measuring the distance between the two inwardly facing sides 22*a* and 22*b* of the support beams 20*a* and 20*b*. The method further includes cutting a wooden block 10 to this measured length. After cutting the wooden block 10, the method includes positioning two brackets 100*a* and 100*b* opposite from each other such that the bases 200*a* and 200*b* face outwardly towards one another. More specifically, the outwardly facing edge 230*a* of the base 200*a* of the bracket 100*a* faces towards the outwardly facing edge 230*b* of the base 200*b* of the bracket 100*b*. The method further includes placing one side of the wooden block 10 onto the upwardly facing top surface 210*a* of the base 200*a* of the bracket 100*a*. More specifically, the fourth side 14 of the wooden block 10 aligns with the outwardly facing edge 240*a* of the base 200*a* of the bracket 100*a*. The method further includes placing the opposing end of the wooden block 10 onto the upwardly facing top surface 210*b* of the base 200*b* of the bracket 100*b*. More specifically, the fifth side 15 of the wooden block 10 aligns with the outwardly facing edge 240*b* of the base 200*b* of the bracket 100*b*. The inwardly facing side 320*a* of the first block positioner 300*a* of the bracket 100*a* is configured to engage with the second side 12 of the wooden block 10. The inwardly facing side 320*b* of the second block positioner 300*b* of the bracket 100*b* is configured to engage with the third side 13 of the wooden block 10. It should be appreciated that either the first side 11 of the wooden block 10 or the sixth side 16 of the wooden block 10 can rest on the upwardly facing top surface 210*a* of the base 200*a* of the bracket 100*a* and on the upwardly top surface 210*b* of the base 200*b* of the bracket 100*b*.

The method further includes connecting the brackets 100*a* and 100*b* to the wooden block 10 by driving one or more nails through the fastener openings 350*a* and 350*b*.

The method further includes positioning the wooden block 10 between two support beams 20*a* and 20*b* by placing the bracket 100*a* on the support beam 20*a* and the bracket 100*b* on the support beam 20*b*. More specifically, the downwardly facing bottom surface 520*a* of the first hook 500*a* of the bracket 100*a* and the downwardly facing bottom surface 520*b* of the second hook 500*b* of the bracket 100*a* rest on and engage with the first side 21*a* of the support beam 20*a*. The inwardly facing side surface 420*a* of the first stud side engager 400*a* of the bracket 100*a* and the inwardly facing side surface 420*b* of the second stud side engager 400*b* of the bracket 100*b* engage with the second side 22*a* of the support beam 20*a*. The bracket 100*b* is placed on to the support beam 20*b* in a similar manner.

It should be appreciated that the method can alternatively include placing the brackets 100*a* and 100*b* on the support beams 20*a* and 20*b*, and further placing the wooden block 10 on to the top surface 210*a* of the base 200*a* of the bracket 100*a* and the top surface 210*b* of the base 200*b* of the bracket 100*b*.

Prior to connecting the bracket 100*a* to the support beam 20*a* and the bracket 100*b* to the support beam 20*b*, the method can include changing the position of the brackets 100 and the wooden block 10 relative to the support beams 20*a* and 20*b* if necessary.

After positioning the wooden block 10 between the two support beams 20*a* and 20*b*, the method further includes connecting the bracket 100*a* to the support beam 20*a* and the bracket 100*b* to the support beam 20*b* by driving one or more nails through the fastener openings 440*a*, 440*b*, 550*a*, and 550*b*.

Second Example Embodiment

Figure 12:
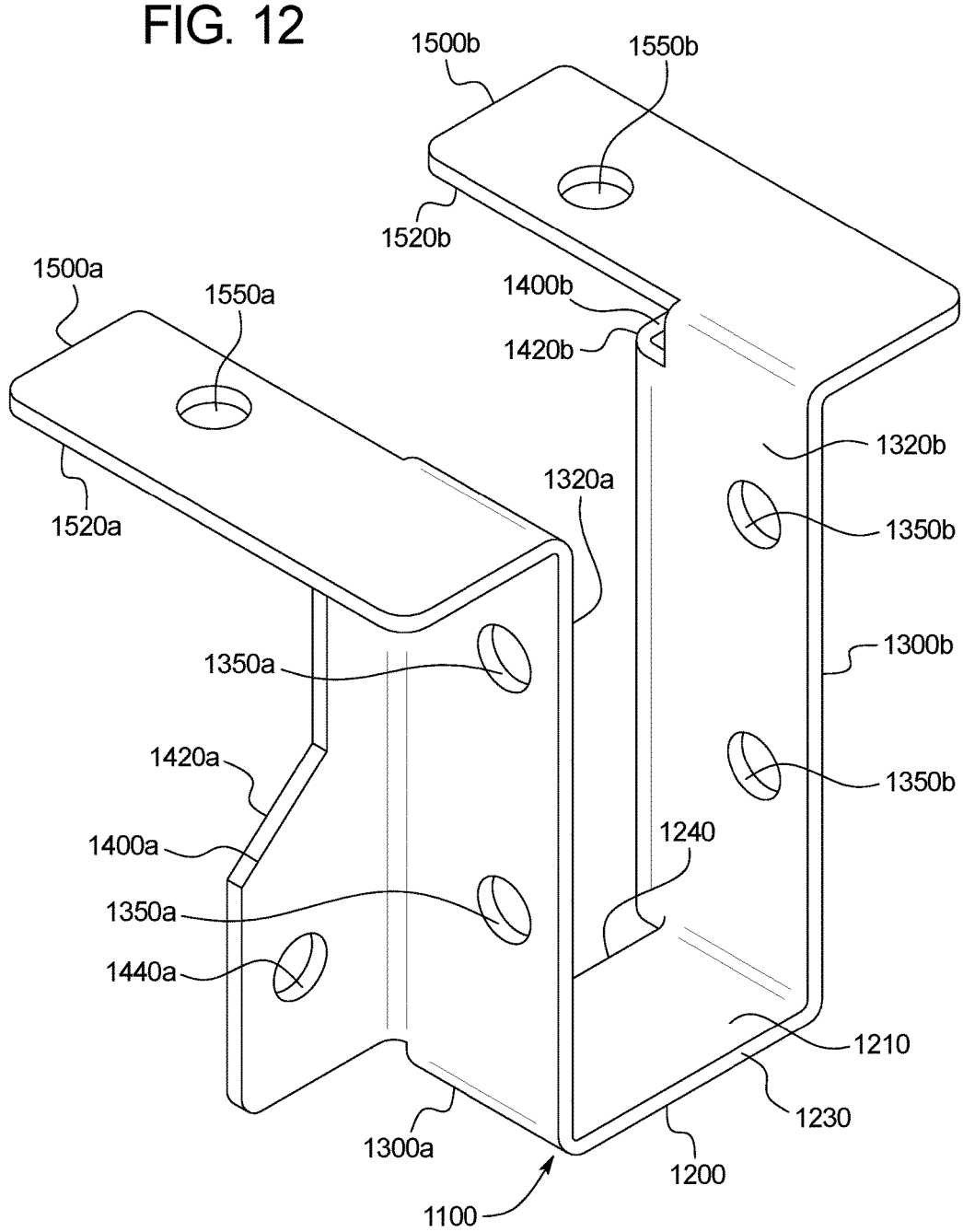
FIG. 12 is a front perspective view of a bracket of an alternative example embodiment of the present disclosure.
Figure 13:
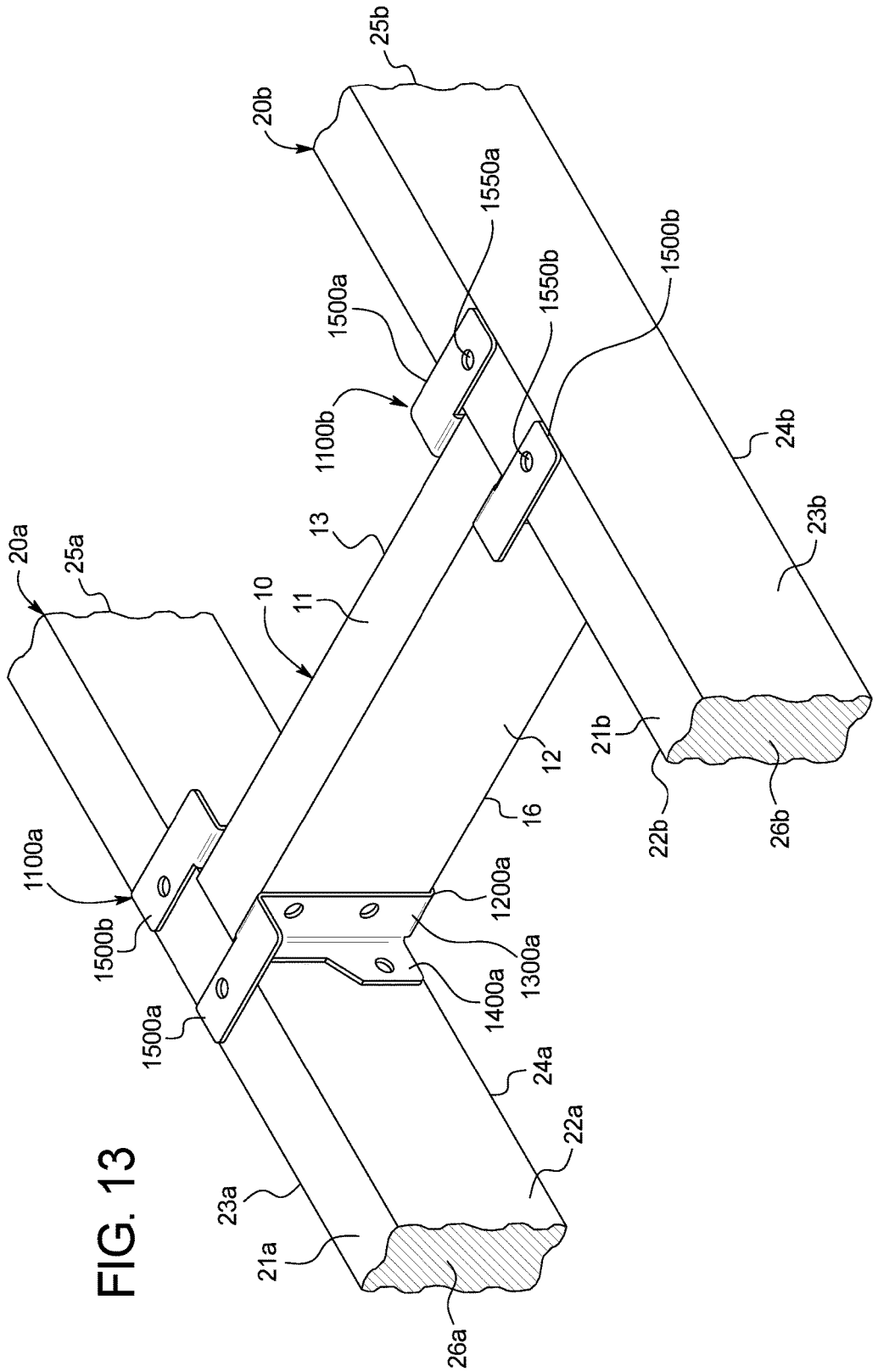
FIG. 13 is a perspective view of the wooden block in the perpendicular orientation positioned between two support beams using two brackets of FIG. 12.

Referring now to FIGS. 12 and 13, another example embodiment of the bracket of the present disclosure is generally illustrated and indicated by numeral 1100. This second example embodiment of the bracket 1100 is configured to rest on the side of the stud and to support the wooden block in a single perpendicular orientation.

The bracket 1100 generally includes: (1) an outwardly facing base 1200; (2) a first block positioner 1300*a* connected to and extending upwardly from the base 1200; (3) a second block positioner 1300*b* connected to and extending upwardly from the base 1200; (4) a first stud side engager 1400*a* connected to and extending transversely to the first block positioner 1300*a*; (5) a second stud side engager 1400*b* connected to and extending transversely to the second block positioner 1300*b*; (6) a first hook 1500*a* connected to and extending transversely to the first block positioner 1400*a*; and (7) a second hook 1500*b* connected to and extending transversely to the second block positioner 1400*b*.

More specifically, the outwardly facing base 1200 in this illustrated example embodiment includes: (1) an upwardly facing top surface 1210; (2) a downwardly facing bottom surface; (3) an outwardly facing edge 1230 connecting the upwardly facing top surface 1210 and the downwardly bottom surface 1220; and (4) an outwardly facing edge 1240 connecting the upwardly facing top surface 1210 and the downwardly facing bottom surface. The base 1200 is configured to support the wooden block 10 by enabling the wooden block 10 to rest on the upwardly facing top surface 1210 of the base 1200.

The first block positioner 1300*a* includes: (1) an outwardly facing side surface; (2) an inwardly facing side surface 1320*a*; (3) an outwardly facing edge connecting the outwardly facing side surface and the inwardly facing side surface 1320*a*; (4) an upwardly facing top edge connecting the outwardly facing side surface, the inwardly facing side surface 1320*a*, and the outwardly facing edge; and (5) a body with a plurality of circular inner edges that define fastener openings 1350*a*. The first block positioner 1300*a* is configured to engage with the second side 12 of the wooden block 10. This ensures that the wooden block 10 rests on the upwardly facing top surface 1210 of the base 1200 of each bracket 1100 when the installer positions the wooden block 10 between the support beams 20*a* and 20*b*. The fastener openings 1350*a* enable an installer to drive nails through the respective fastener openings 1350*a* and secure the bracket 1100 to the wooden block 10.

The second block positioner 1300*b* includes: (1) an outwardly facing side surface; (2) an inwardly facing side surface 1320*b*; (3) an outwardly facing edge connecting the outwardly facing side surface and the inwardly facing side surface 1320*b*; (4) an upwardly facing top edge connecting the outwardly facing side surface, the inwardly facing side surface 1320*b*, and the outwardly facing edge; and (5) a body with a plurality of circular inner edges that define fastener openings 350*b*. The second block positioner 1300*b* is configured to engage with the third side 13 of the wooden block 10. This ensures that the wooden block 10 rests on the upwardly facing top surface 1210 of the base 1200 of each bracket 1100 when the installer positions the wooden block 10 between the support beams 20*a* and 20*b*. The fastener openings 1350*b* enable an installer to drive nails through the respective fastener openings 1350*b* and connect the bracket 1100 to the wooden block 10.

The first stud side engager 1400*a* includes: (1) an outwardly facing side surface; (2) an inwardly facing side surface 1420*a*; (3) an outwardly facing edge connecting the outwardly facing side surface and the inwardly facing side surface 1420*a*; and (4) a body with a plurality of circular inner edges that define fastener openings 1440*a*. The inwardly facing side surface 1420*a* is configured to engage with the second side 22*a* the support beam 20*a*. The first stud side engager 1400*a* includes fastener openings 1440*a* facilitating driving nails using a hammer or nailer through the respective fastener openings 1440*a* and connecting the bracket 1100 to the second side 22*a* the support beam 20*a*.

The second stud side engager 1400*b* includes: (1) an outwardly facing side surface; (2) an inwardly facing side surface 1420*b*; (3) an outwardly facing edge connecting the outwardly facing side surface and the inwardly facing side surface 1420*b*; and (4) a body with a plurality of circular inner edges that define fastener openings 1440*b*. The inwardly facing side surface 1420*b* is configured to engage with the second side 22*a* the support beam 20*a*. The second stud side engager 1400*b* includes fastener openings 1440*b* facilitating driving nails using a hammer or nailer through the respective fastener openings 1440*b* and connecting the bracket 1100 to the second side 22*a* the support beam 20*a*.

The first hook 1500*a* includes: (1) an upwardly facing top surface; (2) a downwardly facing bottom surface 1520*a*; (3) an outwardly facing edge connecting the upwardly facing top surface and the downwardly facing bottom surface 1520*a*; (4) an outwardly facing edge connecting the upwardly facing side surface, the downwardly facing bottom surface 1520*a*, and the outwardly facing edge; and (5) a body with a plurality of circular inner edges that define fastener openings 1550*a*. The downwardly facing bottom surface 1520*a* is configured to engage with the first side 21*a* of the support beam 20*a*. When engaging with the first side 21*a* of the support beam 20*a*, the first hook 1500*a* enables the installer to manually move the bracket 1100 along the first side 21*a* of the support beam 20*a*. This enables the installer to properly position the bracket 1100, and therefore, the wooden block 10 between two support beams 20*a* and 20*b*. The first hook 1500*a* includes fastener openings 1550*a* facilitating driving nails using a hammer or nailer through the respective fastener openings 1550*a* and connecting the bracket to the first side 21*a* of the support beam 20*a*.

The second hook 1500*b* includes: (1) an upwardly facing top surface; (2) a downwardly facing bottom surface 1520*b*; (3) an outwardly facing edge connecting the upwardly facing top surface 1510*b* and the downwardly facing bottom surface 520*b*; (4) an outwardly facing edge connecting the upwardly facing side surface, the downwardly facing bottom surface 1520*b*, and the outwardly facing edge; and (5) a body with a plurality of circular inner edges that define fastener openings 1550*b*. The downwardly facing bottom surface 1520*b* is configured to engage with the first side 21*a* of the support beam 20*a*. When engaging with the first side 21*a* of the support beam 20*a*, the second hook 1500*b* enables the installer to manually move the bracket 1100 along the first side 21*a* of the support beam 20*a*. This enables the installer to properly position the brackets 1100, and therefore, a wooden block 10 between two support beams 20*a* and 20*b*. The second hook 1500*b* includes fastener openings 1550*b* facilitating driving nails using a hammer or nailer through the respective fastener openings 1550*b* and connecting the bracket to the first side 21*a* of the support beam 20*a*.

It should be appreciated that multiple brackets 1100 will or can be used together on adjacent, spaced apart support beams.

FIG. 13 illustrates one method of using the bracket 1110 for single orientation perpendicular blocking. The method includes measuring the distance between the two inwardly facing sides 22*a* and 22*b* of the support beams 20*a* and 20*b*. The method further includes cutting a wooden block 10 to this measured length. After cutting the wooden block 10, the method includes positioning two brackets 1100*a* and 1100*b* opposite from each other such that the bases 1200*a* and 1200*b* face outwardly towards one another. More specifically, the outwardly facing edge 1230*a* of the base 1200*a* of the bracket 1100*a* faces towards the outwardly facing edge 1230*b* of the base 1200*b* of the bracket 1100*b*. The method further includes placing one side of the wooden block 10 onto the upwardly facing top surface 1210*a* of the base 1200*a* of the bracket 1100*a*. More specifically, the fourth side 14 of the wooden block 10 aligns with the outwardly facing edge 1240*a* of the base 1200*a* of the bracket 1100*a*. The method further includes placing the opposing end of the wooden block 10 onto the upwardly facing top surface 1210*b* of the base 1200*b* of the bracket 1100*b*. More specifically, the fifth side 15 of the wooden block 10 aligns with the outwardly facing edge 1240*b* of the base 1200*b* of the bracket 1100*b*. The block positioner 1300*a* of the bracket 1100*a* is configured to engage with the second side 12 of the wooden block 10. The block positioner 1300*b* of the bracket 1100*b* is configured to engage with the third side 13 of the wooden block 10. It should be appreciated that either the first side 11 of the wooden block 10 or the sixth side 16 of the wooden block 10 can rest on the upwardly facing top surface 1210*a* of the base 1200*a* of the bracket 1100*a* and on the upwardly top surface 1210*b* of the base 1200*b* of the bracket 1100*b*.

The method further includes connecting the brackets 1100*a* and 1100*b* to the wooden block 10 by driving one or more nails through the fastener openings 1350*a* and 1350*b*.

The method includes positioning the wooden block 10 between two support beams 20*a* and 20*b* by placing the bracket 1100*a* on the side of the support beam 20*a* and the bracket 1100*b* on the support beam 20*b*. More specifically, the method includes placing the hooks 500*a* and 500*b* of the bracket 1100*a* such that the downwardly facing bottom surface 1520*a* of the first hook 1500*a* of the bracket 1100*a* and the downwardly facing bottom surface 1520*b* of the second hook 1500*b* of the bracket 1100*a* rest on and engage with the first side 21*a* of the support beam 20*a*. The inwardly facing side surface 1420*a* of the first stud side engager 1400*a* of the bracket 1100*a* and the inwardly facing side surface 1420*b* of the second stud side engager 1400*b* of the bracket 1100*a* engage with the second side 22*a* of the support beam 20*a*. The bracket 1100*b* is placed on to the support beam 20*b* in a similar manner.

It should be appreciated that the method can alternatively include placing the brackets 1100*a* and 1100*b* on the support beams 20*a* and 20*b*, and further placing the wooden block 10 on to the top surface 1210*a* of the base 1200*a* of the bracket 1100*a* and the top surface 1210*b* of the base 1200*b* of the bracket 1100*b*.

Prior to connecting the bracket 1100*a* to the support beam 20*a* and the bracket 1100*b* to the support beam 20*b*, the method can include changing the position of the brackets 1100 and the wooden block 10 relative to the support beams 20*a* and 20*b* if necessary.

After positioning the wooden block 10 between the two support beams 20*a* and 20*b*, the method includes connecting the bracket 1100*a* to the support beam 20*a* and the bracket 1100*b* to the support beam 20*b* by driving one or more nails through the fastener openings 1440*a*, 1440*b*, 1550*a*, and 1550*b*.

Third Example Embodiment

Figure 14:
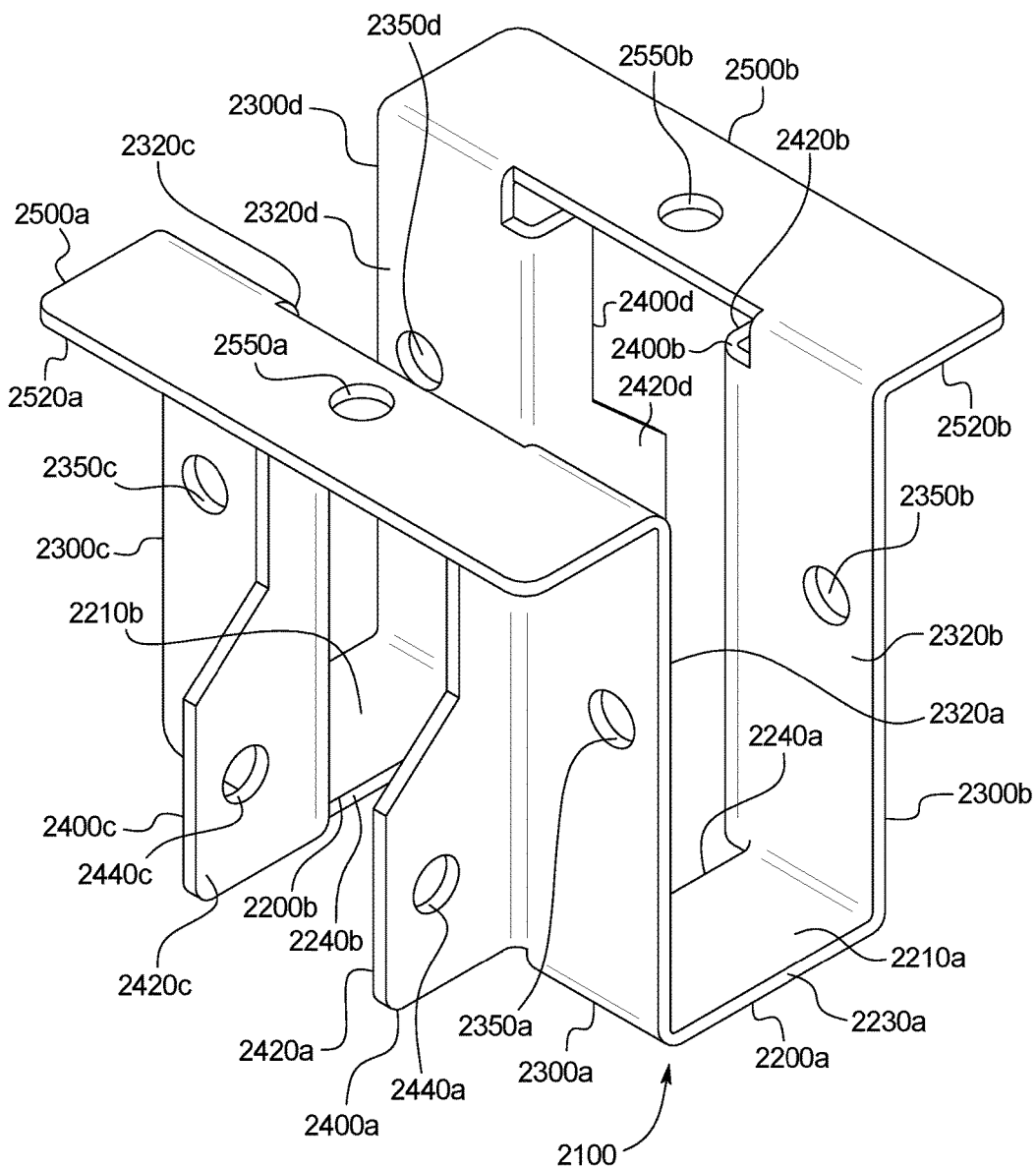
FIG. 14 is a perspective view of a bracket of a further alternative example embodiment of the present disclosure.
Figure 15:
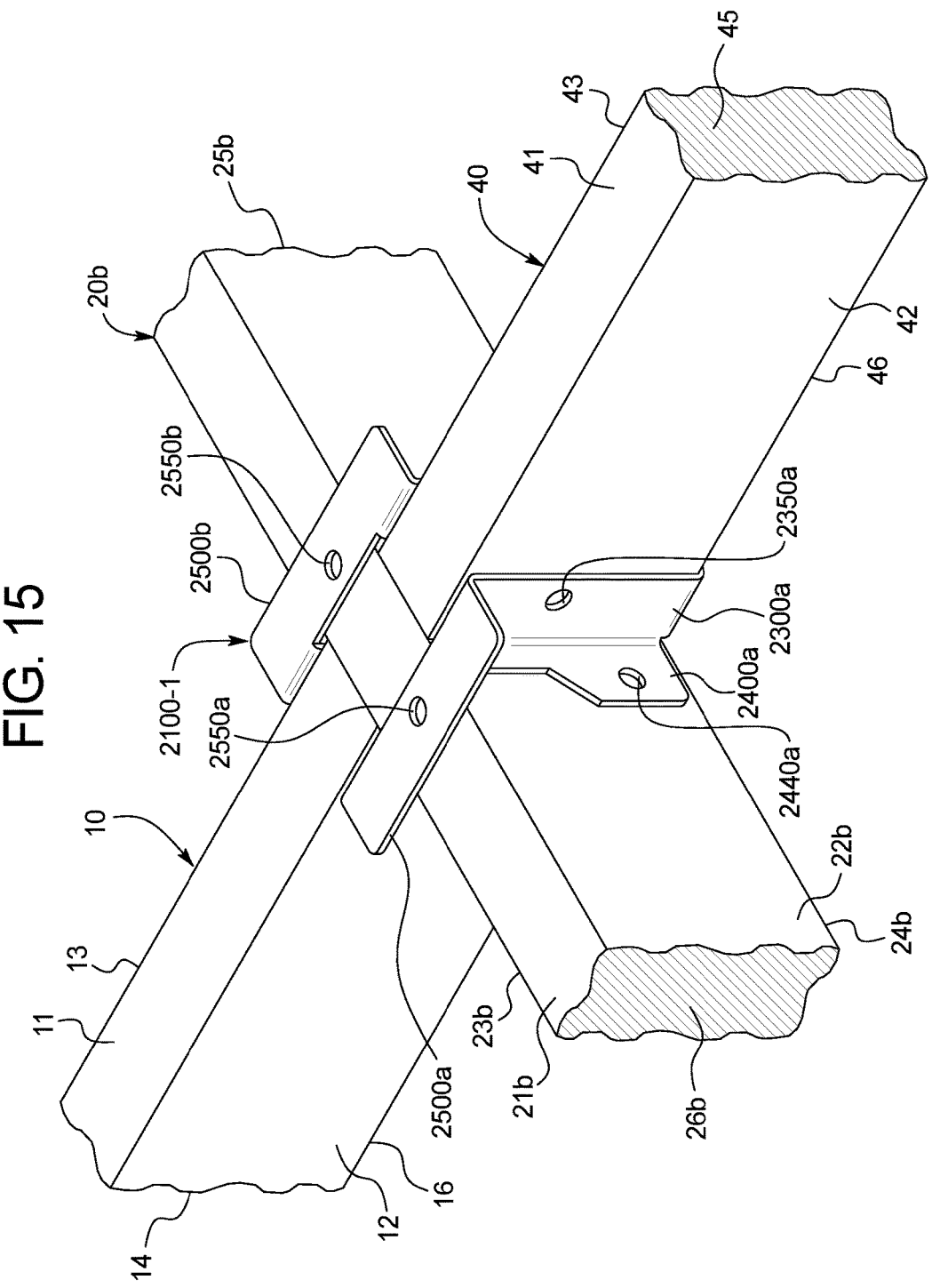
FIG. 15 is a perspective view of two wooden blocks in the perpendicular orientation between support beams using the bracket of FIG. 14.
Figure 16:
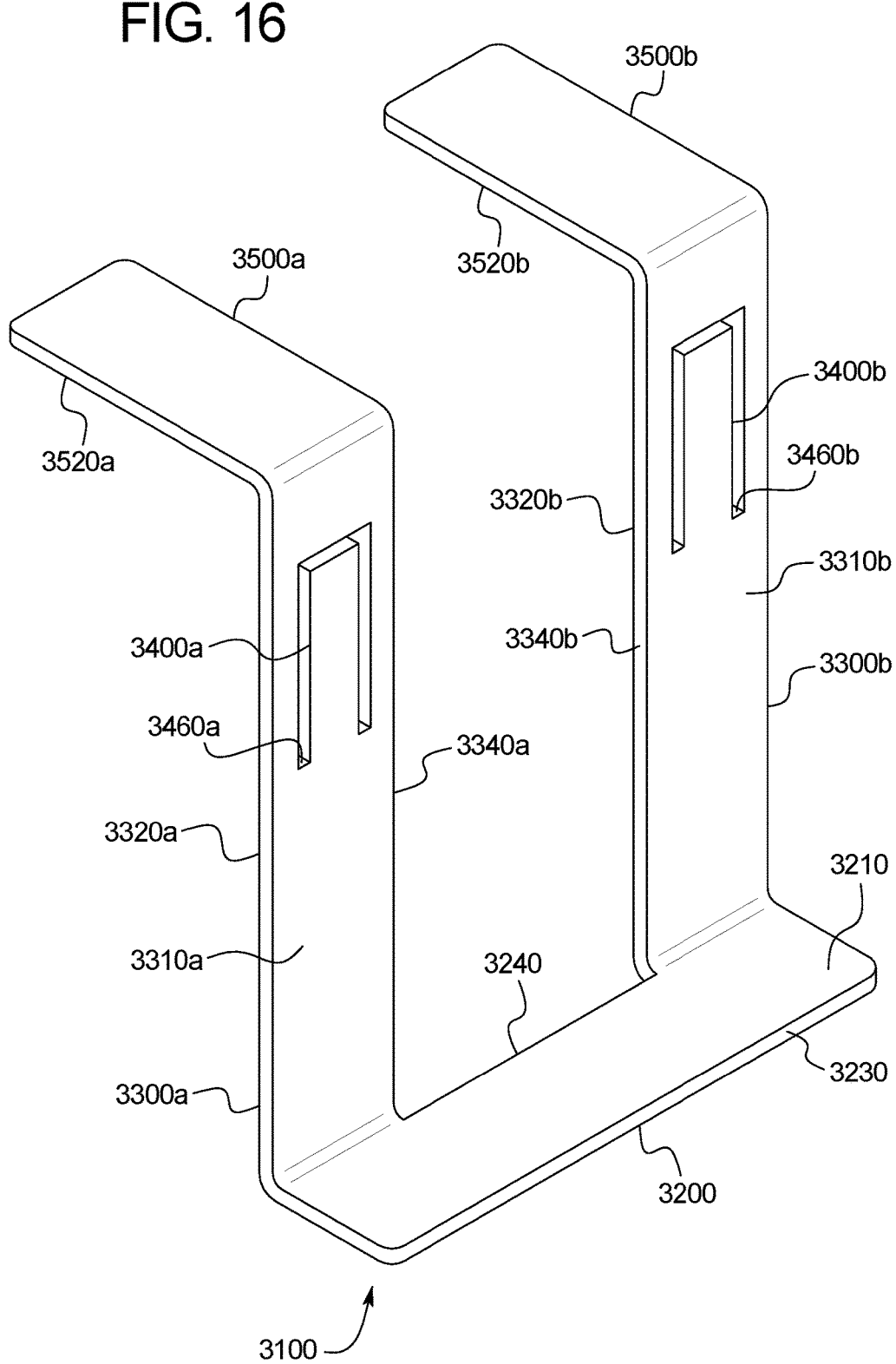
FIG. 16 is a perspective view of a bracket of a further alternative example embodiment of the present disclosure with the movable bases in the folded up position.
Figure 17:
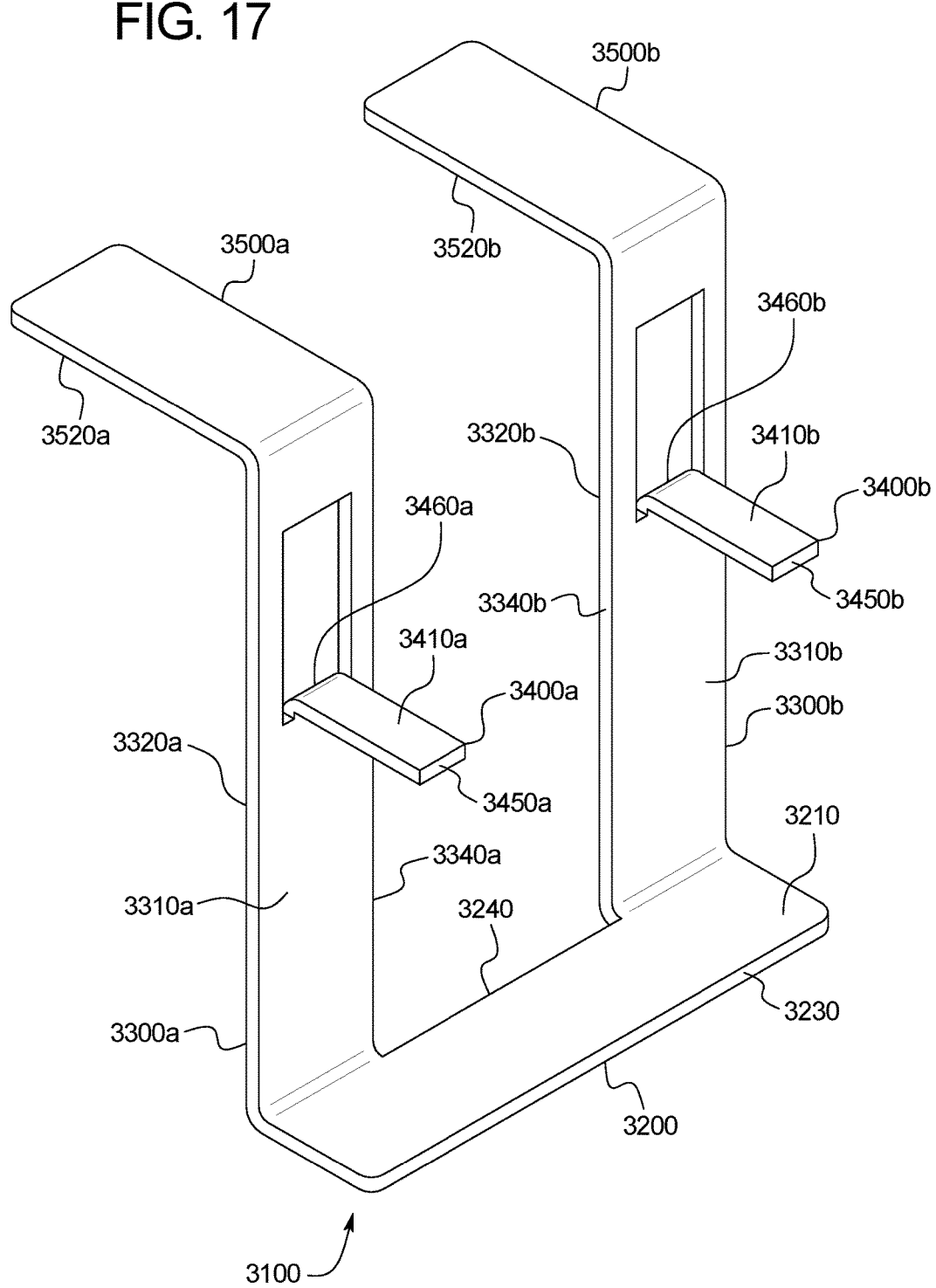
FIG. 17 is a perspective view of the bracket of FIG. 16 with the movable bases in the folded down position

Referring now to FIGS. 14 and 15, another example embodiment of the bracket of the present disclosure is generally illustrated and indicated by numeral 2100. This third example embodiment of the bracket 2100 is configured to rest on the side of the support beam and support one or more wooden blocks in a single perpendicular orientation.

The bracket 2100 generally includes: (1) an outwardly facing first base 2200*a*; (2) a first block positioner 2300*a* connected to and extending upwardly from the first base 2200*a*; (3) a second block positioner 2300*b* connected to and extending upwardly from the first base 2200*a*; (4) a first stud side engager 2400*a* connected to and extending transversely to the first block positioner 2300a; (5) a second stud side engager 2400b connected to and extending transversely to the second block positioner 2300b; (6) an outwardly facing second base 2200b extending in the opposite direction of the outwardly facing first base 2200a; (7) a third block positioner 2300c connected to and extending upwardly from the second base 2200b; (8) a fourth block positioner 2300d connected to and extending upwardly from the second base 2200b; (9) a third stud side engager 2400c connected to and extending transversely to the third block positioner 2300c; (10) a fourth stud side engager 2400d connected to and extending transversely to the fourth block positioner 2300d; (11) a first connecting hook 2500a connecting the first block positioner 2300a and the third block positioner 2300c; and (12) a second connecting hook 2500b connecting the second block positioner 2300b and the fourth block positioner 2300d.

The bracket 2100 assists in installing the wooden block 10 between two adjacent, spaced apart support beams 20a and 20b and another wooden block 40 between two adjacent, spaced apart support beams 20b and 20c (not shown) simultaneously.

The wooden block 40 includes: (1) an outwardly facing first or front side 41; (2) a downwardly facing second or bottom side 42; (3) an upwardly facing third or top side 43; (4) an outwardly facing fourth or end side 44; (5) an outwardly facing fifth or opposing end side 45; and (6) an outwardly facing sixth or rear side 46.

The outwardly facing first base 2200a of the bracket 2100 includes: (1) an upwardly facing top surface 2210a; (2) a downwardly facing bottom surface; (3) an outwardly facing edge 2230a connecting the upwardly facing top surface 2210a and the downwardly facing bottom surface 2220a; and (4) an outwardly facing edge 2240a connecting the upwardly facing top surface 2210a and downwardly facing bottom surface 2220a. The base 2200a is configured to support the wooden block 40 by enabling the wooden block 40 to rest on the upwardly facing top surface 2210a of the first base 2200a.

The outwardly facing second base 2200b in this illustrated example embodiment includes: (1) an upwardly facing top surface 2210b; (2) a downwardly facing bottom surface; (3) an outwardly facing edge 2230b connecting the upwardly facing top surface 2210b and the downwardly facing bottom surface 2220b; and (4) an outwardly facing edge 2240b connecting the upwardly facing top surface 2210b and the downwardly bottom surface 2220b. The base 2200b is configured to support the wooden block 10 by enabling the wooden block 10 to rest on the upwardly facing top surface 2210b of the second base 2200b.

The first block positioner 2300a includes: (1) an outwardly facing side surface; (2) an inwardly facing side surface 2320a; (3) an outwardly facing edge connecting the outwardly facing side surface and the inwardly facing side surface 2320a; and (4) a body with a plurality of circular inner edges that define fastener openings 2350a. The inwardly facing side 2320a of the first block positioner 2300a is configured to engage with the second side 42 of the wooden block 40. This ensures that the wooden block 40 rests on the upwardly facing top surface 2210a of the first base 2200a of the bracket 2100 when the installer positions the wooden block 40 between the support beams 20b and 20c. The fastener openings 2350a enable an installer to drive nails through the respective fastener openings 2350a and secure the bracket 2100 to the wooden block 40.

The second block positioner 2300b includes: (1) an outwardly facing side surface; (2) an inwardly facing side surface 2320b; (3) an outwardly facing edge connecting the outwardly facing side surface and the inwardly facing side surface 2320b; and (4) a body with a plurality of circular inner edges that define fastener openings 2350b. The inwardly facing side 2320b of the second block positioner 2300b is configured to engage with the third side 43 of the wooden block 40. This ensures that the wooden block 40 rests on the upwardly facing top surface 2210a of the first base 2200a of the bracket 2100 when the installer positions the wooden block 40 between the support beams 20b and 20c. The fastener openings 2350b enable an installer to drive nails through the respective fastener openings 2350b and connect the bracket 2100 to the wooden block 40.

The third block positioner 2300c includes: (1) an outwardly facing side surface; (2) an inwardly facing side surface 2320c; (3) an outwardly facing edge connecting the outwardly facing side surface and the inwardly facing side surface 2320c; and (4) a body with a plurality of circular inner edges that define fastener openings 2350c. The inwardly facing side 2320c of the third block positioner 2300c is configured to engage with the second side 12 of the wooden block 10. This ensures that the wooden block 10 rests on the upwardly facing top surface 2210b of the second base 2200b of the bracket 2100 when the installer positions the wooden block 10 between the support beams 10a and 10b. The fastener openings 2350c enable an installer to drive nails through the respective fastener openings 2350c and connect the bracket 2100 to the wooden block 10.

The fourth block positioner 2300d includes: (1) an outwardly facing side surface; (2) an inwardly facing side surface 2320d; (3) an outwardly facing edge connecting the outwardly facing side surface and the inwardly facing side surface 2320d; and (4) a body with a plurality of circular inner edges that define fastener openings 2350d. The inwardly facing side 2320d of the fourth block positioner 2300d is configured to engage with the third side 13 of the wooden block 10. This ensures that the wooden block 10 rests on the upwardly facing top surface 2210 of the second base 2200b of the bracket 2100 when the installer positions the wooden block 10 between the support beams 20a and 20b. The fastener openings 2350d enable an installer to drive nails through the respective fastener openings 2350d and connect the bracket 2100 to the wooden block 10.

The first stud side engager 2400a includes: (1) an outwardly facing side surface; (2) an inwardly facing side surface 2420a; (3) an outwardly facing edge connecting the outwardly facing side surface and the inwardly facing side surface 2420a; and (4) a body with a plurality of circular inner edges that define fastener openings 2440a. The inwardly facing side surface 2420a of the first stud side engager 2400a is configured to engage with the second side 22b of the support beam 20b. The first stud side engager 2200a includes fastener openings 2440a facilitating driving nails using a hammer or nailer through the respective fastener openings 2440a and connecting the bracket 2100 to the second side 22b of the support beam 20b.

The second stud side engager 2400b includes: (1) an outwardly facing side surface; (2) an inwardly facing side surface 2420b; (3) an outwardly facing edge connecting the outwardly facing side surface and the inwardly facing side surface 2420b; and (4) a body with a plurality of circular inner edges that define fastener openings 2440b. The inwardly facing side surface 2420b of the second stud side engager 2400b is configured to engage with the second side 22b of the support beam 20b. The second stud side engager 2400b includes fastener openings 2440b facilitating driving nails using a hammer or nailer through the respective fastener openings 2440b and connecting the bracket 2100 to the second side 22b of the support beam 20b.

The third stud side engager 2400c includes: (1) an outwardly facing side surface; (2) an inwardly facing side surface 2420c; (3) an outwardly facing edge connecting the outwardly facing side surface and the inwardly facing side surface 2420c; and (4) a body with a plurality of circular inner edges that define fastener openings 2440c. The inwardly facing side surface 2420c of the third stud side engager 2400c is configured to engage with the third side 23b of the support beam 20b. The third stud side engager 2200c includes fastener openings 2440c facilitating driving nails using a hammer or nailer through the respective fastener openings 2440c and connecting the bracket 2100 to the third side 23b of the support beam 20b.

The fourth stud side engager 2400d includes: (1) an outwardly facing side surface; (2) an inwardly facing side surface 2420d; (3) an outwardly facing edge connecting the outwardly facing side surface and the inwardly facing side surface 2420d; and (4) a body with a plurality of circular inner edges that define fastener openings 2440d. The inwardly facing side surface 2420d of the fourth stud side engager is configured to engage with the third side 23b of the support beam 20b. The fourth stud side engager 2200d includes fastener openings 2440d facilitating driving nails using a hammer or nailer through the respective fastener openings 2440d and connecting the bracket 2100 to the third side 23b of the support beam 20b.

The first connecting hook 2500a includes: (1) an upwardly facing top surface; (2) a downwardly facing bottom surface 2520a; (3) an outwardly facing first edge connecting the upwardly facing top surface and the downwardly facing bottom surface 2520a; (4) an outwardly facing second edge connecting the upwardly facing top surface and the downwardly facing bottom surface 1520a; and (5) a body with a plurality of circular inner edges that define fastener openings 2550a. The downwardly facing bottom surface 2520a is configured to engage with the first side 21b of the support beam 20b. When engaging with the first side 21b of the support beam 20b, the first connecting hook 2500a enables the installer to manually move the bracket 2100 along the first side 21b of the support beam 20b. This enables the installer to properly position the bracket 2100, and therefore, the wooden block 10 between support beams 20a and 20b and the wooden block 40 between support beams 20b and 20c. The first hook 2500a includes fastener openings 2550a facilitating driving nails using a hammer or nailer through the respective fastener openings 2550a and connecting the bracket to the first side 21b of the support beam 20b.

The second connecting hook 2500b includes: (1) an upwardly facing top surface; (2) a downwardly facing bottom surface 2520b; (3) an outwardly facing first edge connecting the upwardly facing top surface and the downwardly facing bottom surface 2520b; (4) an outwardly facing second edge connecting the upwardly facing top surface and the downwardly facing bottom surface 1520b; and (5) a body with a plurality of circular inner edges that define fastener openings 2550b. The downwardly facing bottom surface 2520b is configured to engage with the first side 21b of the support beam 20b. When engaging with the first side 21b of the support beam 20b, the first connecting hook 2500a enables the installer to manually move the bracket 2100 along the first side 21b of the support beam 20b. This enables the installer to properly position the bracket 2100, and therefore, the wooden blocks 10 between support beams 20a and 20b or the wooden block 40 between support beams 20b and 20c. The first hook 2500a includes fastener openings 2550a facilitating driving nails using a hammer or nailer through the respective fastener openings 2550a and connecting the bracket to the first side 21b of the support beam 20b.

It should be appreciated that multiple brackets 2100 will or can be used together on adjacent, spaced apart support beams FIG. 15 illustrates one method of using the bracket 2100 for single orientation perpendicular blocking The method includes measuring the distance between the two inwardly facing sides 22a (not shown) and 22b of the support beams 20a and 20b. The method further includes cutting a wooden block 10 to this measured length. This process is repeated for cutting a properly measured wooden block 40 to be installed between support beams 20b and 20c. After cutting the wooden blocks 10 and 40, the method includes placing a bracket 2100-1 on to the support beam 20b. More specifically, the inwardly facing side 2420b of the first stud side engager 2400a engages with the second side 22b of the support beam 20b. The inwardly facing side 2420b of the second stud side engager 2400b engages with the second side 22b of the support beam 20b. The inwardly facing side 2420c of the third stud side engager 2400c engages with the third side 23b of the support beam 20b. The inwardly facing side 2420d of the fourth stud side engager 2400d engages with the third side 23b of the support beam 20b. The downwardly facing bottom surface 2520b of the first connecting hook 2500a engages with the first side 21b of the support beam 20b. The downwardly facing bottom surface 2520b of the second connecting hook 2500b engages with the first side 21b of the support beam 20b. This orientation is the same when placing the bracket 2100-2 on to the support beam 20b and the bracket 2100-3 on the support beam 20c.

The method further includes placing one side of the wooden block 40 onto the upwardly facing top surface 2210a of the first base 2200a of the bracket 2100-1. More specifically, the fourth side 44 of the wooden block 40 aligns with the outwardly facing edge 2240a of the first base 2200a of the bracket 2100-1. The method further includes placing the end of the wooden block 10 onto the upwardly facing top surface 2210b of the second base 2200b of the bracket 2100-1. More specifically, the fifth side 15 of the wooden block 10 aligns with the outwardly facing edge 2430b of the base 2200b of the bracket 2100-1. The inwardly facing side surface 2320a of the first block positioner 2300a of the bracket 2100-1 engages with the second side 42 of the wooden block 40. The inwardly facing side surface 2320b of the third block positioner 2300c of the bracket 2100-1 engages with the second side 12 of the wooden block 10. The inwardly facing side surface 2320b of the second block positioner 2300b of the bracket 2100-1 engages with the third side 43 of the wooden block 40. The inwardly facing side surface 2320d of the fourth block positioner 2300d of the bracket 2100-1 engages with the third side 13 of the wooden block 10. It should be appreciated that either the first side 41 of the wooden block 40 or the sixth side 46 of the wooden block 40 can rest on the upwardly facing top surface 2210a of the base 2200a of the bracket 2100-1. It should be further appreciated that either the first side 11 of the wooden block 10 or the sixth side 16 of the wooden block 10 can rest on the upwardly facing top surface 2210b of the base 2200b of the bracket 2100-1.

The method further includes connecting the bracket 2100-1 to the wooden blocks 10 and 40 by driving one or more nails through the fastener openings 2350a 2350b, 2350c, and 2350d.

Prior to connecting the bracket 2100-1 to the support beam 20b, the method can include changing the position of the brackets 2100 and the wooden blocks 10 and 40 relative to the support beams 20a, 20b, and 20c if necessary.

After positioning the wooden block 10 between the two support beams 20a and 20b and the wooden block 40 between the support beams 20b and 20c, the method includes connecting the bracket 2100-1 to the support beam 20b by driving one or more nails through the fastener openings 2550a, 2550b, 2440a, 2440b, 2440c, and 2440d. It should be appreciated that the method of connecting the bracket 2100 to a support beam is the same when connecting other brackets of this alternative embodiment to other support beams.

Fourth Example Embodiment

Referring now to FIGS. 16, 17, 18, 19, and 20, another example embodiment of the bracket of the present disclosure is generally illustrated and indicated by numeral 3100. This fourth example embodiment of the bracket 3100 is configured to rest on the side of the stud and to support the wooden block in any one of a perpendicular orientation, a first position parallel orientation, and a second different position parallel orientation.

The bracket 3100 generally includes: (1) an outwardly facing first base 3200; (2) a first stud side engager 3300a connected to and extending transversely to the first stationary base 3200; (3) a second stud side engager 3300b connected to and extending transversely to the first stationary base 3200; (4) a second movable base 3400a connected to the first stud side engager 3300a; (5) a third movable base 3400b connected to the second stud side engager 3300b; (6) a first hook 3500a connected to and extending transversely to the first stud side engager 3300a; and (7) a second hook 3500b connected to and extending transversely to the second stud side engager 3300b.

More specifically, the outwardly facing first stationary base 3200 in this illustrated example embodiment includes: (1) an upwardly facing top surface 3210; (2) a downwardly facing bottom surface; (3) an outwardly facing edge 3230 connecting the upwardly facing top surface 3210 and the downwardly facing bottom surface; and (4) an inwardly facing edge 3240 connecting the upwardly facing top surface 3210 and the downwardly facing bottom surface. The first stationary base 3200 is configured to support the wooden block 10 by enabling the wooden block 10 to rest on the upwardly facing top surface 3210 of the base 3200.

The first stud side engager 3300a includes: (1) an outwardly facing side surface 3310a; (2) an inwardly facing side surface 3320a; (3) an outwardly facing edge connecting the outwardly facing side surface 3310a and the inwardly facing side surface 3320a; and (4) an inwardly facing edge 3340a connecting the outwardly facing side surface 3310a and the inwardly facing side surface 3320a. The inwardly facing side surface 3320a is configured to engage the second side 22a of the support beam 20a.

The second stud side engager 3300b includes: (1) an outwardly facing side surface 3310b; (2) an inwardly facing side surface 3320b; (3) an outwardly facing edge connecting the outwardly facing side surface 3310b and the inwardly facing side surface 3320b; and (4) an inwardly facing edge 3340b connecting the outwardly facing side surface 3310b and the inwardly facing side surface 3320b. The inwardly facing side surface 3320b is configured to engage the inwardly facing second side 22a of the support beam 20a.

The second movable base 3400a includes: (1) an upwardly facing top surface 3410a; (2) a downwardly facing bottom surface; (3) an outwardly facing edge connecting the upwardly facing top surface 3410a and the downwardly facing bottom surface; (4) an outwardly facing edge connecting the upwardly facing top surface 3410a and the downwardly facing bottom surface; (5) an outwardly facing front edge 3450a connecting the upwardly facing top surface 3410a and the downwardly facing bottom surface; and (6) a movable hinge 3460a connecting the second movable base 3400b and the first stud engager 3300a and assisting the second movable base 3400a to rest in an upright folded position lying in the same plane as the first stud engager 3300a or to rest in an unfolded outwardly extending block supporting position lying in the same plane as the outwardly facing base 3200. When the second movable base 3400a is in its unfolded outwardly extending block supporting position, the second movable base is configured to support the wooden block 10 by enabling the wooden block 10 to rest on the upwardly facing top surface 3410a of the second movable base 3400a.

The third movable base 3400b includes: (1) an upwardly facing top surface 3410b; (2) a downwardly facing bottom surface; (3) an outwardly facing edge connecting the upwardly facing top surface 3410b and the downwardly facing bottom surface; (4) an outwardly facing edge connecting the upwardly facing top surface 3410b and the downwardly facing bottom surface; (5) an outwardly facing front edge 3450b connecting the upwardly facing top surface 3410b and the downwardly facing bottom surface; and (6) a movable hinge 3460b connecting the third movable base 3400b and the second stud engager 3300b and assisting the third movable base 3400b to rest in an upright folded position lying in the same plane as the second stud engager 3300b or to rest in an unfolded outwardly extending block supporting position lying in the same plane as the outwardly facing base 3200. When the third movable base 3400b is in its unfolded outwardly extending block supporting position, the third movable base is configured to support the wooden block 10 by enabling the wooden block 10 to rest on the upwardly facing top surface 3410b of the third movable base 3400b.

It should be appreciated that the second base 3400a and the third base 3400b are configured to be at the same distance from the first base 3200 and at the same level relative to each other.

It should be further appreciated that the bracket 3100 can include four movable bases such that the bracket 3100 supports more than one wooden block between adjacent, spaced apart support beams.

The first hook 3500a includes: (1) an upwardly facing top surface; (2) a downwardly facing bottom surface 3520a; (3) an outwardly facing edge connecting the upwardly facing top surface and the bottom surface 3520a; and (4) an outwardly facing edge connecting the upwardly facing side surface, the downwardly facing bottom surface 3520a, and the outwardly facing edge. The downwardly facing bottom surface 3520a is configured to engage with the first side 21a of the support beam 20a. When engaging with the first side 21a of the support beam 20a, the first hook 3500a enables the installer to manually move the bracket 3100 along the first side 21a of the support beam 20a. This enables the installer to properly position the brackets 3100, and therefore, the wooden block 10 between two support beams 20*a* and 20*b*.

The second hook 3500*b* includes: (1) an upwardly facing top surface; (2) a downwardly facing bottom surface 3520*b*; (3) an outwardly facing edge connecting the upwardly facing top surface and the downwardly facing bottom surface 3520*b*; and (4) an outwardly facing edge connecting the upwardly facing side surface, the downwardly facing bottom surface 3520*b*, and the outwardly facing edge. The downwardly facing bottom surface 3520*b* is configured to engage with the first side 21*a* of the support beam 20*a*. When engaging with the first side 21*a* of the support beam 20*a*, the second hook 3500*b* enables the installer to manually move the bracket 3100 along the first side 21*a* of the support beam 20*a*. This enables the installer to properly position the brackets 3100, and therefore, a wooden block 10 between two support beams 20*a* and 20*b*.

It should be appreciated that multiple brackets 3100 will or can be used together on adjacent, spaced apart support beams.

Figure 18:
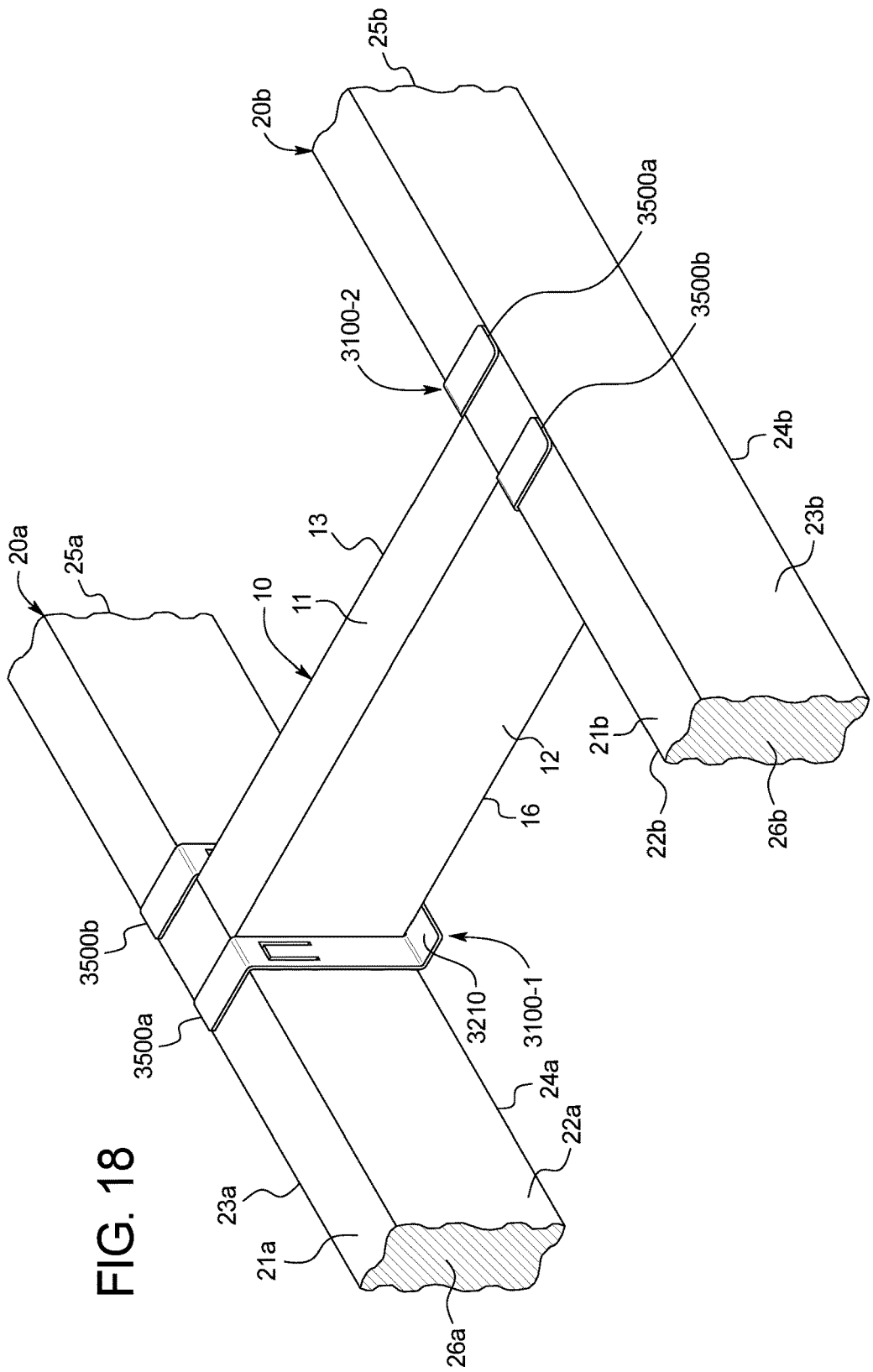
FIG. 18 is a perspective view of the wooden block in the perpendicular orientation positioned between two support beams using two brackets of FIG. 16.

FIG. 18 illustrates one method of using the bracket 3100 for perpendicular blocking.

The method includes measuring the distance between the two inwardly facing sides 22*a* and 22*b* of the support beams 20*a* and 20*b*. The method further includes cutting a wooden block 10 to this measured length. After cutting the wooden block 10, the method includes placing one bracket 3100-1 on to the support beam 20*a* and another bracket 3100-2 on to the support beam 20*b*. More specifically, the downwardly facing bottom surface 3520*a* of the first hook 3500*a* of the bracket 3100-1 and the downwardly facing bottom surface 3520*b* of the second hook 3500*b* of the bracket 3100-1 engage with the first side 21*a* of the support beam 20*a*. The inwardly facing side surface of the first stud side engager 3400*a* of the bracket 3100-1 and the inwardly facing side surface of the second stud side engager 3400*b* of the bracket 3100-1 engage with the second side 22*a* of the support beam 20*a*. The bracket 3100-2 is placed on to the support beam 20*b* in a similar manner and directly opposite of the bracket 3100-1 such the outwardly facing base 3200*a* of the bracket 3100-1 faces towards the outwardly facing base 3200*b* of the bracket 3100-2.

The method further includes placing one side of the wooden block 10 onto the upwardly facing top surface 3210 of the base 3200 of the bracket 3100-1. More specifically, the second side 12 of the wooden block 10 is configured to engage with the inwardly facing edge 3340*a* of the first stud side engager 3300*a* of the bracket 3100-1. The third side 13 of the wooden block 10 is configured to engage with the inwardly facing edge 3340*b* of the second stud side engager 3300*b* of the bracket 3100-1. The method further includes placing the opposing end of the wooden block 10 onto the upwardly facing top surface 3210 of the first stationary base 3200 of the bracket 3100-2. More specifically, the second side 12 of the wooden block 10 is configured to engage with the inwardly facing edge 3340*a* of the first stud side engager 3300*a* of the bracket 3100-2. The third side 13 of the wooden block 10 is configured to engage with the inwardly facing edge 3340*b* of the second stud side engager 3300*b* of the bracket 3100-1. It should be appreciated that either the first side 11 of the wooden block 10 or the sixth side 16 of the wooden block 10 can rest on the upwardly facing top surface 3210 of the base 3200 of the bracket 3100-1 and on the upwardly facing top surface 3210 of the base 3200 of the bracket 3100-2.

Prior to connecting the wooden block 10 to the support beams 20*a* and 20*b*, the method can include changing the position of the brackets 3100 and the wooden block 10 relative to the support beams 20*a* and 20*b* if necessary.

After positioning the wooden block 10 between the two support beams 20*a* and 20*b*, the method includes connecting the wooden block 10 to the support beam 20*a* and to the support beam 20*b*. More specifically, the method includes toe nailing the wooden block 10 into the second side 22*a* of the support beam 20*a*. The method further includes toe nailing the wooden block 10 into the second side 22*b* of the support beam 20*b*. It should be appreciated that the order in which sides are toe nailed first is not important to proper installation of the wooden block 10 in many instances.

Figure 19:
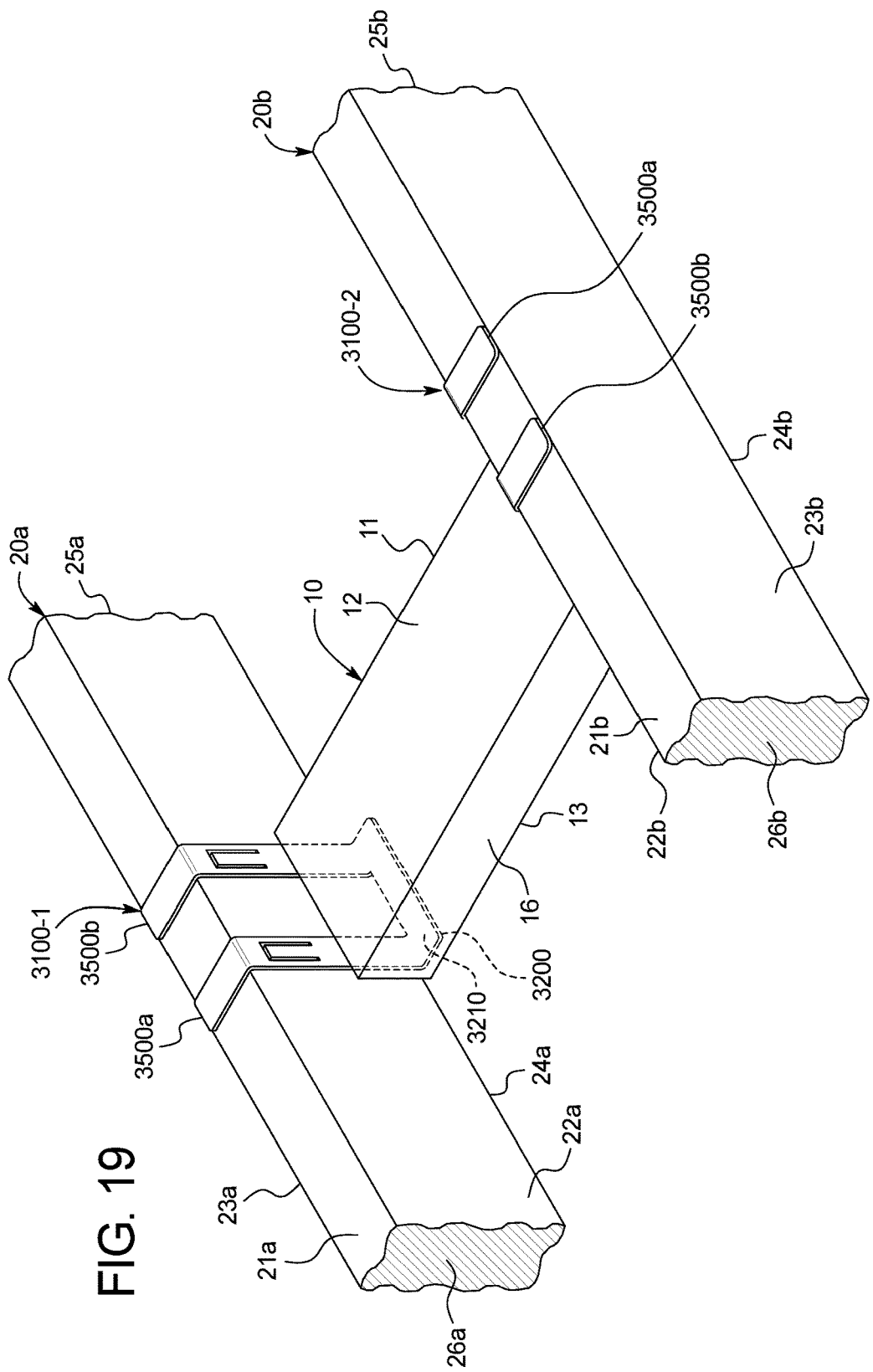
FIG. 19 is a perspective view of the wooden block in the first position parallel orientation positioned between two support beams using two brackets of FIG. 16.

FIG. 19 illustrates an alternative method of using the same bracket 3100 for parallel blocking in the first position.

The method includes measuring the distance between the two inwardly facing sides 22*a* and 22*b* of the support beams 20*a* and 20*b*. The method further includes cutting a wooden block 10 to this measured length. After cutting the wooden block 10, the method includes placing one bracket 3100-1 on to the support beam 20*a* and another bracket 3100-2 on to the support beam 20*b*. More specifically, the downwardly facing bottom surface 3520*a* of the first hook 3500*a* of the bracket 3100-1 and the downwardly facing bottom surface 3520*b* of the second hook 3500*b* of the bracket 3100-1 engage with the first side 21*a* of the support beam 20*a*. The inwardly facing side surface of the first stud side engager 3400*a* of the bracket 3100-1 and the inwardly facing side surface of the second stud side engager 3400*b* of the bracket 3100-1 engage with the second side 22*a* of the support beam 20*a*. The bracket 3100-2 is placed on to the support beam 20*b* in a similar manner and directly opposite of the bracket 3100-1 such the outwardly facing base 3200*a* of the bracket 3100-1 faces towards the outwardly facing base 3200*b* of the bracket 3100-2.

The method further includes placing one side of the wooden block 10 onto the upwardly facing top surface 3210 of the base 3200 of the bracket 3100-1. More specifically, the fourth side 14 of the wooden block 10 is configured to engage with the outwardly facing side surface 3310*a* of the first stud side engager 3300*a* of the bracket 3100-1 and with the outwardly facing side surface 3310*b* of the second stud side engager 3300*b* of the bracket 3100-1. The method further includes placing the opposing end of the wooden block 10 onto the upwardly facing top surface 3210 of the first stationary base 3200 of the bracket 3100-2. More specifically, the fourth side 14 of the wooden block 10 is configured to engage with the outwardly facing side surface 3310*a* of the first stud side engager 3300*a* of the bracket 3100-2 and with the outwardly facing side surface 3310*b* of the second stud side engager 3300*b* of the bracket 3100-2. It should be appreciated that either the second side 12 of the wooden block 10 or the third side 13 of the wooden block 10 can rest on the upwardly facing top surface 3210 of the base 3200 of the bracket 3100-1 and on the upwardly facing top surface 3210 of the base 3200 of the bracket 3100-2.

Prior to connecting the wooden block 10 to the support beams 20*a* and 20*b*, the method can include changing the position of the brackets 3100 and the wooden block 10 relative to the support beams 20*a* and 20*b* if necessary.

After positioning the wooden block 10 between the two support beams 20*a* and 20*b*, the method includes connecting the wooden block 10 to the support beam 20*a* and to the support beam 20*b*. More specifically, the method includes toe nailing the wooden block 10 into the second side 22*a* of the support beam 20a. The method further includes toe nailing the wooden block 10 into the second side 22b of the support beam 20b.

Figure 20:
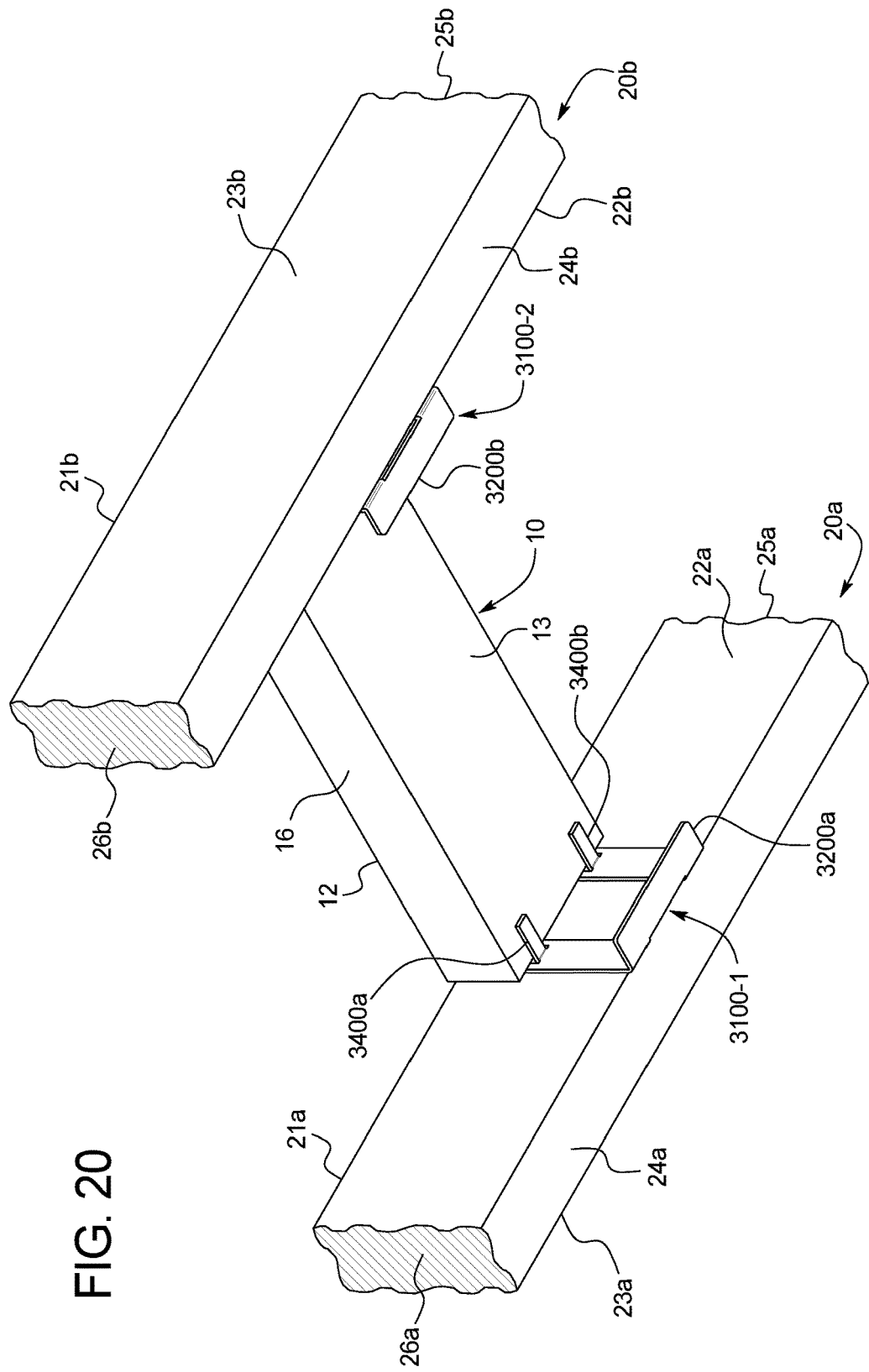
FIG. 20 is a bottom perspective view of the wooden block in the second position parallel orientation positioned between two support beams using two brackets of FIG. 17.
Figure 21:
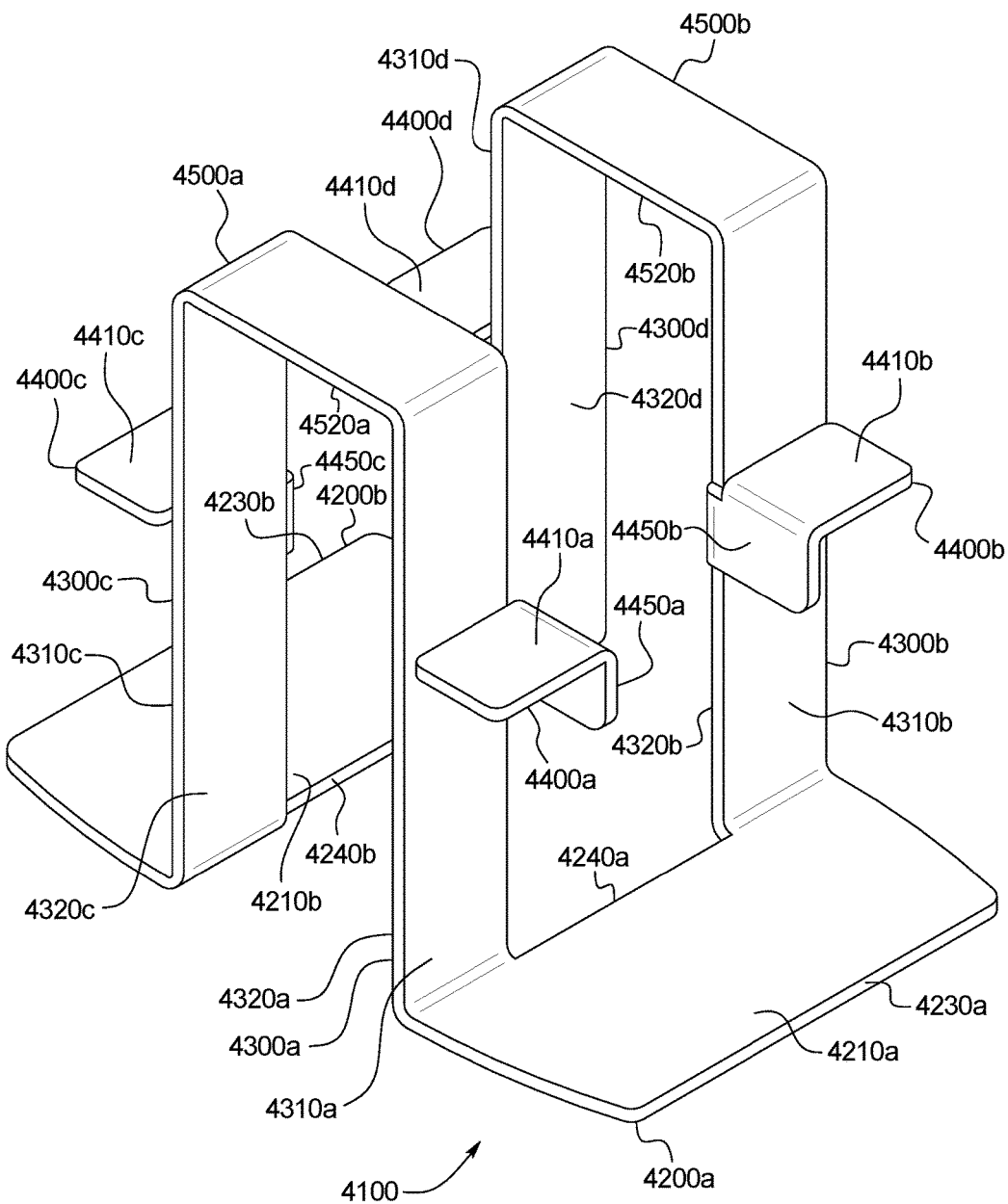
FIG. 21 is a perspective view of a bracket of a further alternative example embodiment of the present disclosure.

FIG. 20 illustrates another method of using the same bracket 3100 for parallel blocking in the second different position.

The method includes measuring the distance between the two inwardly facing sides 22a and 22b of the support beams 20a and 20b. The method further includes cutting a wooden block 10 to this measured length. After cutting the wooden block 10, the method includes placing one bracket 3100-1 on to the support beam 20a and another bracket 3100-2 on to the support beam 20b. More specifically, the downwardly facing bottom surface 3520a of the first hook 3500a of the bracket 3100-1 and the downwardly facing bottom surface 3520b of the second hook 3500b of the bracket 3100-1 engage with the first side 21a of the support beam 20a. The inwardly facing side surface of the first stud side engager 3400a of the bracket 3100-1 and the inwardly facing side surface of the second stud side engager 3400b of the bracket 3100-1 engage with the second side 22a of the support beam 20a. The method further includes folding the second movable base 3400a to its unfolded outward extending block supporting position such that the second movable base 3400a lies in the same plane as the first stationary base 3200. This process is repeated with the third movable base 3400b. The bracket 3100-2 is placed on to the support beam 20b in a similar manner and directly opposite of the bracket 3100-1 such that the outwardly facing first base 3200 of the bracket 3100-1 faces towards the outwardly facing first base 3200 of the bracket 3100-2 and the second movable base 3400a and the third movable base 3400b of the bracket 3100-1 and the second movable base 3400a and the third movable base 3400b of the bracket 3100-2 face towards each other.

The method further includes placing one side of the wooden block 10 on to the upwardly facing top surface 3410a of the second movable base 3400a of the bracket 3100-1 and the same side of the wooden block 10 on to the upwardly facing top surface 3410b of the third movable base 3400b of the bracket 3100-1. More specifically, the fourth side 14 of the wooden block 10 is configured to engage with the outwardly facing side surface 3320a of the first stud side engager 3300a of the bracket 3100-1 and the outwardly facing side surface 3320b of the second stud side engager 3300b of the bracket 3100-1. The method further includes placing the opposing end of the wooden block 10 onto the upwardly facing top surface 3410a of the second movable base 3400a of the bracket 3100-2 and on to the upwardly facing top surface 3410b of the third movable base 3400b of the bracket 3100-2. More specifically, the fifth side 15 of the wooden block 10 is configured to engage with the outwardly facing side surface 3320a of the first stud side engager 3300a of the bracket 3100-2 and the outwardly facing side surface 3320b of the second stud side engager 3300b of the bracket 3100-2. It should be appreciated that either the second side 12 of the wooden block 10 or third side 13 of the wooden block 10 can rest on the upwardly facing top surface 3410a of the second movable base 3400a and 3410b of the third movable base 3400b of the bracket 3100-1. It should be further appreciated that either the second side 12 of the won the upwardly facing top surface 3410a and the upwardly facing top surface 3410b of the wooden block 10 or third side 13 of the wooden block 10 can rest on the upwardly facing top surface 3410a of the second movable base 3400a and the upwardly facing top surface 3410b of the third movable base 3400b of the bracket 3100-2.

Prior to connecting the wooden block 10 to the support beams 20a and 20b, the method can include changing the position of the brackets 3100 and the wooden block 10 relative to the support beams 20a and 20b if necessary.

After positioning the wooden block 10 between the two support beams 20a and 20b, the method includes connecting the wooden block 10 to the support beam 20a and to the support beam 20b. More specifically, the method includes toe nailing the wooden block 10 into the second side 22a of the support beam 20a. The method further includes toe nailing the wooden block 10 into the second side 22b of the support beam 20b.

Fifth Example Embodiment

Referring now to FIGS. 21, 22, 23, and 24, another example embodiment of the bracket of the present disclosure is generally illustrated and indicated by numeral 4100. This fifth example embodiment of the bracket 4100 is configured to rest on the side of the stud and to support one or more wooden blocks in any one of a perpendicular orientation, a first position parallel orientation, and a second different position parallel orientation.

The bracket 4100 generally includes: (1) an outwardly facing first or lower base 4200a; (2) a first stud side engager 4300a connected to and extending upwardly from the first or lower base 4200a; (3) a second stud side engager 4300b connected to and extending upwardly from the first or lower base 4200a; (4) a second or upper base 4400a connected to the first stud side engager 4300a; (5) a third or upper base 4400b connected to the second stud side engager 4300b; (6) an outwardly facing fourth or lower base 4200b extending in the opposite direction of the outwardly facing first base 4200a; (7) a third stud side engager 4300c connected to and extending upwardly from the fourth or lower base 4200b; (8) a fourth stud side engager 4300d connected to and extending upwardly from the fourth or lower base 4200b; (9) a fifth or upper base 4400c connected to the third stud side engager 4300c; (10) a sixth or upper base 4400d connected to the fourth stud side engager 4300d; (11) a first connecting hook 4500a connecting the first stud side engager 4300a and the third stud side engager 4300c; and (12) a second connecting hook 4500b connecting the second stud side engager 4300b and the fourth second stud side engager 4300d.

More specifically, the outwardly facing first base 4200a in this illustrated example embodiment includes: (1) an upwardly facing top surface 4210a; (2) a downwardly facing bottom surface; (3) an outwardly facing edge 4230a connecting the upwardly facing top surface 4210a and the downwardly facing bottom surface 4220a; and (4) an outwardly facing edge 4240a connecting the upwardly facing top surface 4210a and downwardly facing bottom surface 4220a. The first base 4200a is configured to support the wooden block 10 by enabling the wooden block 10 to rest on the upwardly facing top surface 4210a of the base 4200a.

The outwardly facing fourth base 4200b in this illustrated example embodiment includes: (1) an upwardly facing top surface 4210b; (2) a downwardly facing bottom surface; (3) an outwardly facing edge 4230b connecting the upwardly facing top surface 4210b and the downwardly facing bottom surface 4220b; and (4) an outwardly facing edge 4240b connecting the upwardly facing top surface 4210b and downwardly facing bottom surface 4220b. The fourth base 4200b is configured to support the wooden block 10 by enabling the wooden block 10 to rest on the upwardly facing top surface 4210b of the fourth base 4200b.

The second base 4400*a* includes: (1) an upwardly facing top surface 4410*a*; (2) a downwardly facing bottom surface; (3) an outwardly facing edge connecting the upwardly facing top surface 4410*a* and the downwardly facing bottom surface; (4) an outwardly facing edge connecting the upwardly facing top surface 4210*a*, the downwardly facing bottom surface, the outwardly facing edge, and the first stud side engager 4300*a*; (5) an inwardly facing block positioner side 4450*a*; (6) an outwardly facing block positioner side; (7) an outwardly facing block positioner edge connecting the inwardly facing wooden block side engager 4450*a* and the outwardly facing block positioner side; and (8) a downwardly facing edge connecting the outwardly facing wooden block side engager, the inwardly facing wooden block side engager 4450*a*, the outwardly facing block positioner edge, and the first stud side engager 4300*a*. The second base 4400*a* is configured to support the wooden block 10 by enabling the wooden block 10 to rest on the upwardly facing top surface 4410*a* of the second base 4400*a*.

The third base 4400*b* includes: (1) an upwardly facing top surface 4410*b*; (2) a downwardly facing bottom surface; (3) an outwardly facing edge connecting the upwardly facing top surface 4410*b* and the downwardly facing bottom surface; (4) an outwardly facing edge connecting the upwardly facing top surface 4210*b*, the downwardly facing bottom surface, the outwardly facing edge 4430*b*, and the second stud side engager 4300*b*; (5) an inwardly facing block positioner side 4450*b*; (6) an outwardly facing block positioner side; (7) an outwardly facing block positioner edge connecting the inwardly facing wooden block side engager 4450*b* and the outwardly facing block positioner side; and (8) a downwardly facing edge connecting the outwardly facing wooden block side engager, the inwardly facing wooden block side engager 4450*b*, the outwardly facing block positioner edge, and the second stud side engager 4300*b*. The third base 4400*b* is configured to support the wooden block 10 by enabling the wooden block 10 to rest on the upwardly facing top surface 4410*b* of the third base 4400*b*.

The fifth base 4400*c* includes: (1) an upwardly facing top surface 4410*c*; (2) a downwardly facing bottom surface; (3) an outwardly facing edge connecting the upwardly facing top surface 4410*c* and the downwardly facing bottom surface; (4) an outwardly facing edge connecting the upwardly facing top surface 4210*c*, the downwardly facing bottom surface, the outwardly facing edge, and the third stud side engager 4300*c*; (5) an inwardly facing block positioner side 4450*c*; (6) an outwardly facing block positioner side; (7) an outwardly facing block positioner edge connecting the inwardly facing wooden block side engager 4450*c* and the outwardly facing block positioner side; and (8) a downwardly facing edge connecting the outwardly facing wooden block side engager, the inwardly facing wooden block side engager 4450*c*, the outwardly facing block positioner edge, and the third stud side engager 4300*c*. The fifth base 4400*c* is configured to support the wooden block 10 by enabling the wooden block 10 to rest on the upwardly facing top surface 4410*c* of the fifth base 4400*c*.

The sixth base 4400*d* includes: (1) an upwardly facing top surface 4410*d*; (2) a downwardly facing bottom surface; (3) an outwardly facing edge 4430*d* connecting the upwardly facing top surface 4410*d* and the downwardly facing bottom surface; (4) an outwardly facing edge connecting the upwardly facing top surface 4210*d*, the downwardly facing bottom surface, the outwardly facing edge 4430*d*, and the fourth stud side engager 4300*d*; (5) an inwardly facing block positioner side 4450*d*; (6) an outwardly facing block positioner side; (7) an outwardly facing block positioner edge connecting the inwardly facing wooden block side engager 4450*d* and the outwardly facing block positioner side; and (8) a downwardly facing edge connecting the outwardly facing wooden block side engager, the inwardly facing wooden block side engager 4450*d*, the outwardly facing block positioner edge, and the fourth stud side engager 4300*d*. The sixth base 4400*d* is configured to support the wooden block 10 by enabling the wooden block 10 to rest on the upwardly facing top surface 4410*c* of the sixth base 4400*d*.

It should be appreciated that the second base 4400*a* and the third base 4400*b* are configured to be at the same distance from the first base 4200*a* and at the same level relative to each other. It should further be appreciated that the fifth base 4400*c* and the sixth base 4400*d* are configured to be at the same distance from the fourth base 4200*b* and at the same level relative to each other. It should be further appreciated that the second base 4400*a*, the third base 4400*b*, the fifth base 4400*c*, and the sixth base 4400*d* are configured to be at the same distance from the first base 4200*a* and the second base 4200*b* and at the same level relative to each other.

The first stud side engager 4300*a* includes: (1) an outwardly facing side surface 4310*a*; (2) an inwardly facing side surface 4320*a*; (3) an outwardly facing edge connecting the outwardly facing side surface 4310*a* and the inwardly facing side surface 4320*a*; and (4) an inwardly facing edge connecting the outwardly facing side surface 4310*a* and the inwardly facing side surface 4320*a*. The inwardly facing side surface 4320*a* is configured to engage the inwardly facing second side 22*a* of the support beam 20*a*.

The second stud side engager 4300*b* includes: (1) an outwardly facing side surface 4310*b*; (2) an inwardly facing side surface 4320*b*; (3) an outwardly facing edge connecting the outwardly facing side surface 4310*b* and the inwardly facing side surface 4320*b*; and (4) an inwardly facing edge connecting the outwardly facing side surface 4310*b* and the inwardly facing side surface 4320*b*. The inwardly facing side surface 4320*b* is configured to engage the inwardly facing second side 22*a* of the support beam 20*a*.

The third stud side engager 4300*c* includes: (1) an outwardly facing side surface 4310*c*; (2) an inwardly facing side surface 4320*c*; (3) an outwardly facing edge connecting the outwardly facing side surface 4310*c* and the inwardly facing side surface 4320*c*; and (4) an inwardly facing edge connecting the outwardly facing side surface 4310*c* and the inwardly facing side surface 4320*c*. The inwardly facing side surface 4320*c* is configured to engage the inwardly facing third side 23*a* of the support beam 20*a*.

The fourth stud side engager 4300*d* includes: (1) an outwardly facing side surface 4310*d*; (2) an inwardly facing side surface 4320*d*; (3) an outwardly facing edge connecting the outwardly facing side surface 4310*d* and the inwardly facing side surface 4320*d*; and (4) an inwardly facing edge connecting the outwardly facing side surface 4310*d* and the inwardly facing side surface 4320*d*. The inwardly facing side surface 4320*d* is configured to engage the inwardly facing third side 23*a* of the support beam 20*a*.

The first connecting hook 4500*a* includes: (1) an upwardly facing top surface; (2) a downwardly facing bottom surface 4520*a*; (3) an outwardly facing edge connecting the upwardly facing top surface and the downwardly facing bottom surface 4520*a*; and (4) an outwardly facing edge connecting the upwardly facing top surface, the downwardly facing bottom surface 4520*a*, and the outwardly facing edge 4530*a*. The downwardly facing bottom surface 4520a is configured to engage with the first side 21a of the support beam 20a. When engaging with the first side 21a of the support beam 20a, the first hook 4500a enables the installer to manually move the bracket 3100 along the first side 21a of the support beam 20a. This enables the installer to properly position the brackets 4100, and therefore, the wooden block 10 between two support beams 20a and 20b.

The second connecting hook 4500b includes: (1) an upwardly facing top surface; (2) a downwardly facing bottom surface 4520b; (3) an outwardly facing edge connecting the upwardly facing top surface and the downwardly facing bottom surface 4520b; and (4) an outwardly facing edge connecting the upwardly facing top surface, the downwardly facing bottom surface 4520b, and the outwardly facing edge. The downwardly facing bottom surface 4520b is configured to engage with the first side 21a of the support beam 20a. When engaging with the first side 21a of the support beam 20a, the second hook 4500b enables the installer to manually move the bracket 4100 along the first side 21a of the support beam 20a. This enables the installer to properly position the bracket 4100, and therefore, a wooden block 10 between two support beams 20a and 20b.

Figure 22:
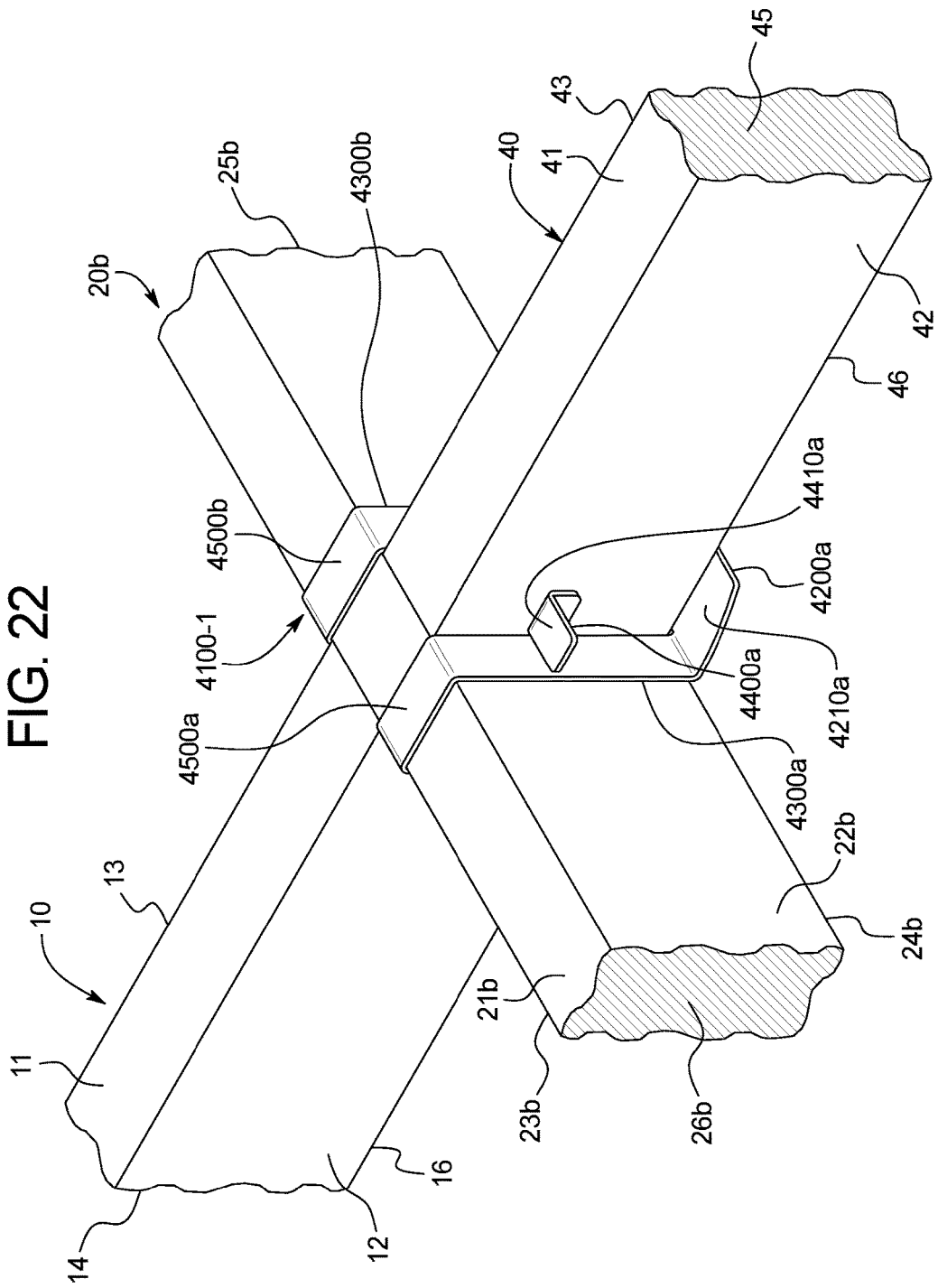
FIG. 22 is a perspective view of two wooden blocks in the perpendicular orientation between support beams using the bracket of FIG. 21.

It should be appreciated that multiple brackets 4100 can or will be used together on adjacent, spaced apart support beams FIG. 22 illustrates one method of using the bracket 4100 for perpendicular blocking.

The method includes measuring the distance between the two inwardly facing sides 22a and 22b of the support beams 20b and 20b (not shown). The method further includes cutting the wooden block 10 to this measured length. This process is repeated for cutting a properly measured wooden block 40 to be installed between support beams 20b and 20c. After cutting the wooden block 40, the method includes placing the bracket 4100-1 on to the support beam 20b. More specifically, the inwardly facing side 4420b of the first stud side engager 4400a engages with the second side 22b of the support beam 20b. The inwardly facing side 4420b of the second stud side engager 4400b engages with the second side 22b of the support beam 20b. The inwardly facing side 4420c of the third stud side engager 4400c engages with the third side 23b of the support beam 20b. The inwardly facing side 4420d of the fourth stud side engager 4400d engages with the third side 23b of the support beam 20b. This orientation is the same when placing other brackets of this alternative embodiment onto other support beams.

The method further includes placing one side of the wooden block 40 onto the upwardly facing top surface 4210a of the first base 4200a of the bracket 4100-1. More specifically, the fourth side 44 of the wooden block 40 aligns with the outwardly facing edge 4230a of the first base 4200a of the bracket 4100-1. The second side 42 of the wooden block 40 is configured to engage with the inwardly facing block positioner side 4450a of the second base 4400b of the bracket 4100-1, and the third side 43 of the wooden block 40 is configured to engage with the inwardly facing block positioner side 4450b of the third base 4400c of the bracket 4100-1. The method further includes placing the end of the wooden block 10 onto the upwardly facing top surface 4210b of the fourth base 4200b of the bracket 4100-1. More specifically, the fifth side 15 of the wooden block 10 aligns with the outwardly facing edge 4240b of the fourth base 4200b of the bracket 4100-1. The second side 12 of the wooden block 10 is configured to engage with the inwardly facing block positioner side 4450c of the fifth base 4400c of the bracket 4100-1, and the third side 13 of the wooden block 10 is configured to engage with the inwardly facing block positioner side 4450d of the sixth base 4400d of the bracket 4100-1. It should be appreciated that either the first side 41 of the wooden block 40 or the sixth side 46 of the wooden block 40 can rest on the upwardly facing top surface 4410a of the base 4200a of the bracket 4100-1. It should be further appreciated that either the first side 11 of the wooden block 10 or the sixth side 16 of the wooden block 10 can rest on the upwardly facing top surface 4210b of the fourth base 4200b of the bracket 4100-1.

Prior to connecting the wooden block 10 to the support beams 20a and 20b and the wooden block 40 to the support beams 20b and 20c, the method can include changing the position of the brackets 4100 and the wooden block 10 relative to the support beams 20a, 20b, and 20c if necessary.

After positioning the wooden block 10 between the two support beams 20a and 20b, the method includes connecting the wooden block 10 to the support beam 20a and to the support beam 20b. More specifically, the method includes toe nailing the wooden block 10 into the second side 22a of the support beam 20a. The method includes toe nailing the wooden block 10 into the second side 22b of the support beam 20b. This process is repeated when connecting the wooden block 40 to the support beam 20b and the support beam 20c. It should be appreciated that the order in which side is toe nailed first is not important to proper installation of the wooden block 10.

Figure 23:
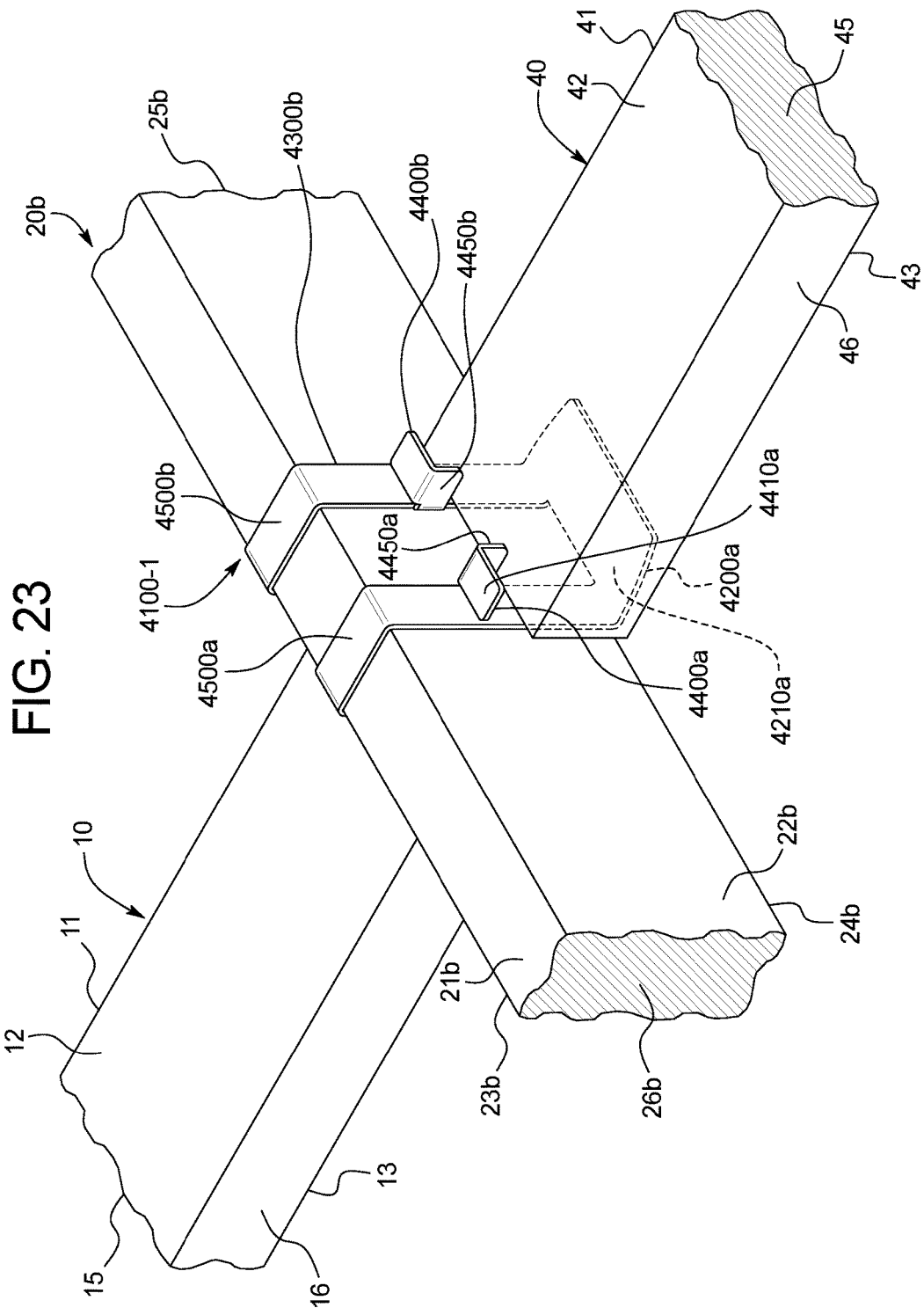
FIG. 23 is a perspective view of two wooden blocks in the first position parallel orientation between support beams using the bracket of FIG. 21.

FIG. 23 illustrates another method of the present disclosure of using the same bracket 4100 for parallel blocking in the first position.

The method includes measuring the distance between the two inwardly facing sides 22a and 22b of the support beams 20a and 20b. The method further includes cutting a wooden block 10 to this measured length. This process is repeated for cutting a properly measured wooden block 40 to be installed between support beams 20b and 20c. After cutting the wooden block 40, the method includes placing the bracket 4100-1 on to the support beam 20b. More specifically, the inwardly facing side 4420b of the first stud side engager 4400a engages with the second side 22b of the support beam 20b. The inwardly facing side 4420b of the second stud side engager 4400b engages with the second side 22b of the support beam 20b. The inwardly facing side 4420c of the third stud side engager 4400c engages with the third side 23b of the support beam 20b. The inwardly facing side 4420d of the fourth stud side engager 4400d engages with the third side 23b of the support beam 20b. This orientation is the same when placing other brackets of this alternative embodiment onto other support beams.

The method includes placing one side of the wooden block 40 onto the upwardly facing top surface 4210a of the base 4200a of the bracket 4100-1. More specifically, the fourth side 44 of the wooden block 40 is configured to engage with the outwardly facing side surface 4310a of the first stud side engager 4300a of the bracket 4100-1 and the outwardly facing side surface 4310b of the second stud side engager 4300b of the bracket 4100-1. The method includes placing the end of the wooden block 10 onto the upwardly facing top surface 4210b of the fourth base 4200b of the bracket 4100-1. More specifically, the fifth side 15 of the wooden block 10 aligns with the outwardly facing side surface 4310c of the third stud side engager 4300c of the bracket 4100-2 and the outwardly facing side surface 4310d of the fourth stud side engager 4300d of the bracket 4100-1. It should be appreciated that either the second side 42 of the wooden block 40 or the third side 43 of the wooden block 40 can rest on the upwardly facing top surface 4410a of the base 4200a of the bracket 4100-1. It should be further appreciated that either the second side 12 of the wooden block 10 or the third side 13 of the wooden block 10 can rest on the upwardly facing top surface 4410b of the fourth base 4200b of the bracket 4100-1.

Prior to connecting the wooden block 10 to the support beams 20a and 20b and the wooden block 40 to the support beams 20b and 20c, the method can include changing the position of the brackets 4100 and the wooden block 10 relative to the support beams 20a, 20b, and 20c if necessary.

After positioning the wooden block 10 between the two support beams 20a and 20b, the method includes connecting the wooden block 10 to the support beam 20a and to the support beam 20b. More specifically, the method includes toe nailing the wooden block 10 into the second side 22a of the support beam 20a. The method includes toe nailing the wooden block 10 into the second side 22b of the support beam 20b. This process is repeated when connecting the wooden block 40 to the support beam 20b and the support beam 20c. It should be appreciated that the order in which side is toe nailed first is not important to proper installation of the wooden block 10.

Figure 24:
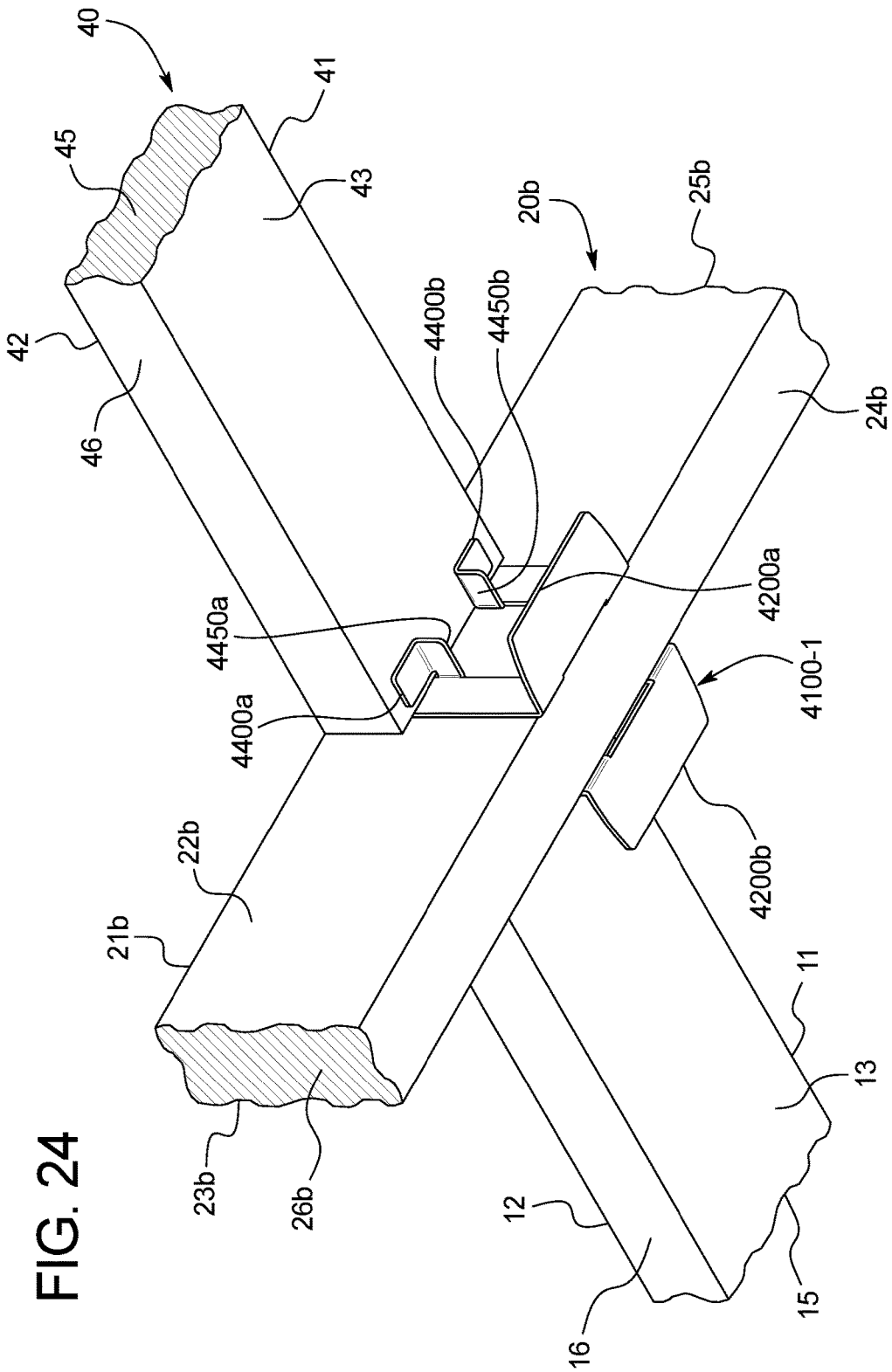
FIG. 24 is a bottom perspective view of two wooden blocks in the second position parallel orientation between support beams using the bracket of FIG. 21.
Figure 25:
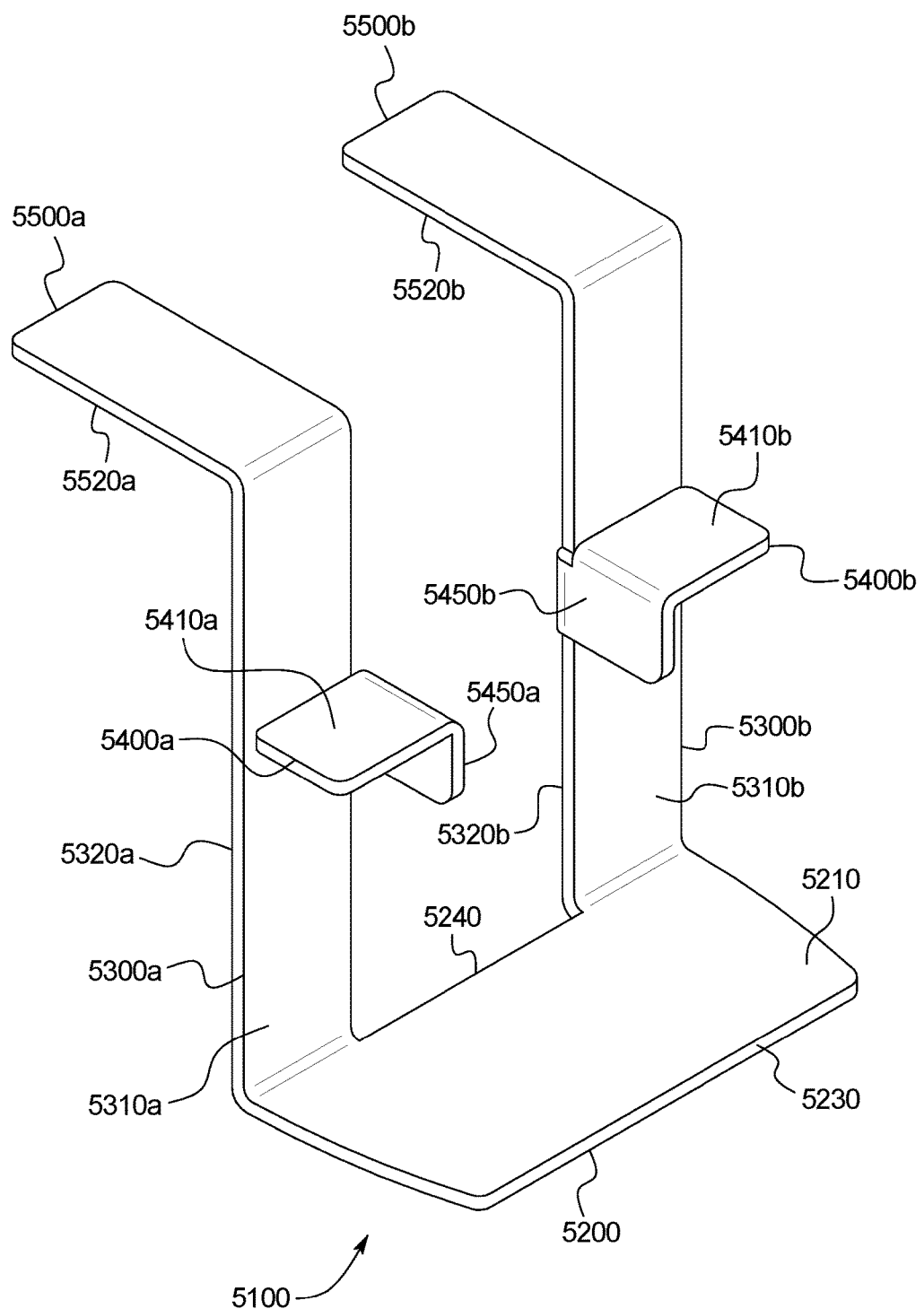
FIG. 25 is a perspective view of a bracket of a further alternative example embodiment of the present disclosure.

FIG. 24 illustrates another method of the present disclosure of using the same bracket 4100 for parallel blocking in the second position.

The method includes measuring the distance between the two inwardly facing sides 22a and 22b of the support beams 20a and 20b. The method further includes cutting a wooden block 10 to this measured length. This process is repeated for cutting a properly measured wooden block 40 to be installed between support beams 20b and 20c. After cutting the wooden block 40, the method includes placing the bracket 4100-1 on to the support beam 20b. More specifically, the inwardly facing side 4420b of the first stud side engager 4400a engages with the second side 22b of the support beam 20b. The inwardly facing side 4420b of the second stud side engager 4400b engages with the second side 22b of the support beam 20b. The inwardly facing side 4420c of the third stud side engager 4400c engages with the third side 23b of the support beam 20b. The inwardly facing side 4420d of the fourth stud side engager 4400d engages with the third side 23b of the support beam 20b. This orientation is the same when placing other brackets of this alternative embodiment onto other support beams.

The method further includes placing one side of the wooden block 40 onto the upwardly facing top surface 4410a of the second base 4400a of the bracket 4100-1. More specifically, the fourth side 44 of the wooden block 40 is configured to engage with the outwardly facing side surface 4310a of the first stud side engager 4300a of the bracket 4100-1 and the outwardly facing side surface 4310b of the second stud side engager 4300b of the bracket 4100-1. The method includes placing the end of the wooden block 10 onto the upwardly facing top surface 4410b of the fourth base 4200b of the bracket 4100-1. More specifically, the fifth side 15 of the wooden block 10 aligns with the outwardly facing side surface 4310c of the third stud side engager 4300c of the bracket 4100-1 and the outwardly facing side surface 4310d of the fourth stud side engager 4300d of the bracket 4100-1. It should be appreciated that either the second side 42 of the wooden block 40 or the third side 43 of the wooden block 40 can rest on the upwardly facing top surface 4410a of the base 4400a and the upwardly facing top surface 4410b of the base 4400b of the bracket 4100-1. It should further be appreciated that either the second side 12 of the wooden block 10 or the third side of the wooden block 10 can rest on the upwardly facing top surface 4410c of the base 4400c and the upwardly facing top surface 4410d of the base 4400d of the bracket 4100-1.

Prior to connecting the wooden block 10 to the support beams 20a and 20b and the wooden block 40 to the support beams 20b and 20c, the method can include changing the position of the brackets 4100 and the wooden blocks 10 and 40 relative to the support beams 20a, 20b, and 20c if necessary.

After positioning the wooden block 10 between the two support beams 20a and 20b, the method includes connecting the wooden block 10 to the support beam 20a and to the support beam 20b. More specifically, the method includes toe nailing the wooden block 10 into the second side 22a of the support beam 20a. The method includes toe nailing the wooden block 10 into the second side 22b of the support beam 20b. This process is repeated when connecting the wooden block 40 to the support beam 20b and the support beam 20c. It should be appreciated that the order in which side is toe nailed first is not important to proper installation of the wooden block 10.

It should be appreciated that the method described above for installing the wooden block in the perpendicular, first position parallel, or second position parallel orientation can be the same when connecting other brackets of this alternative embodiment to other support beams.

Sixth Example Embodiment

Referring now to FIGS. 25, 26, 27, and 28, another example embodiment of the bracket of the present disclosure is generally illustrated and indicated by numeral 5100. This sixth embodiment of the bracket 5100 is configured to rest on the side of the stud and to support a wooden block in any one of a perpendicular orientation, a first position parallel orientation, and a second different position parallel orientation.

The bracket generally 5100 includes: (1) an outwardly facing first or lower base 5200; (2) a first stud side engager 5300a connected to and extending upwardly from the first base 5200a; (3) a second stud side engager 5300b connected to and extending upwardly from the first base 5200a; (4) a second or upper base 5400a connected to the first stud side engager 5300a; (5) a third or upper base 5400b connected to the second stud side engager 5300b; (6) a first hook 5500a connected to an extending transversely from the first stud side engager 5300a; and (7) a second hook 5500b connected to an extending transversely from the second stud side engager 5300b.

More specifically, the outwardly facing first base 5200 in this illustrated example embodiment includes: (1) an upwardly facing top surface 5210; (2) a downwardly facing bottom surface; (3) an outwardly facing edge 5230 connecting the upwardly facing top surface 5210 and the downwardly facing bottom surface; and (4) an inwardly facing edge 5240 connecting the upwardly facing top surface 5210 and the downwardly facing bottom surface. The first base 5200 is configured to support the wooden block 10 by enabling the wooden block 10 to rest on the upwardly facing top surface 5210 of the base 5200.

The second base 5400a includes: (1) an upwardly facing top surface 5410a; (2) a downwardly facing bottom surface; (3) an outwardly facing edge connecting the upwardly facing top surface 5410a and the downwardly facing bottom surface; (4) an outwardly facing edge connecting the upwardly facing top surface 5210a, the downwardly facing bottom surface, the outwardly facing edge, and the first stud side engager 5300a; (5) an inwardly facing block positioner

5450*a*; (6) an outwardly facing block positioner; (7) an outwardly facing block positioner edge connecting the inwardly facing wooden block side engager 5450*a* and the outwardly facing block positioner; and (8) a downwardly facing edge connecting the outwardly facing wooden block side engager, the inwardly facing wooden block side engager 5450*a*, the outwardly facing block positioner edge, and the first stud side engager 5300*a*. The second base 5400*a* is configured to support the wooden block 10 by enabling the wooden block 10 to rest on the upwardly facing top surface 5410*a* of the second base 5400*a*.

The third base 5400*b* includes: (1) an upwardly facing top surface 5410*b*; (2) a downwardly facing bottom surface; (3) an outwardly facing edge connecting the upwardly facing top surface 5410*b* and the downwardly facing bottom surface; (4) an outwardly facing edge connecting the upwardly facing top surface 5210*b*, the downwardly facing bottom surface, the outwardly facing edge, and the second stud side engager 5300*b*; (5) an inwardly facing block positioner 5450*b*; (6) an outwardly facing block positioner; (7) an outwardly facing block positioner edge connecting the inwardly facing wooden block side engager 5450*b* and the outwardly facing block positioner; and (8) a downwardly facing edge connecting the outwardly facing wooden block side engager, the inwardly facing wooden block side engager 5450*b*, the outwardly facing block positioner edge, and the second stud side engager 5300*b*. The third base 5400*b* is configured to support the wooden block 10 by enabling the wooden block 10 to rest on the upwardly facing top surface 5410*b* of the third base 5400*b*.

It should be appreciated that the second base 5400*a* and the third base 4400*b* are configured to be at the same distance from the first base 5200 and at the same level relative to each other.

The first stud side engager 5300*a* includes: (1) an outwardly facing side surface 5310*a*; (2) an inwardly facing side surface 5320*a*; (3) an outwardly facing edge connecting the outwardly facing side surface 5310*a* and the inwardly facing side surface 5320*a*; and (4) an inwardly facing edge connecting the outwardly facing side surface 5310*a* and the inwardly facing side surface 5320*a*. The inwardly facing side surface 5320*a* is configured to engage the inwardly facing second side 22*a* of the support beam 20*a*.

The second stud side engager 5300*b* includes: (1) an outwardly facing side surface 5310*b*; (2) an inwardly facing side surface 5320*b*; (3) an outwardly facing edge connecting the outwardly facing side surface 5310*b* and the inwardly facing side surface 5320*b*; and (4) an inwardly facing edge connecting the outwardly facing side surface 5310*b* and the inwardly facing side surface 5320*b*. The inwardly facing side surface 5320*b* is configured to engage the inwardly facing second side 22*a* of the support beam 20*a*.

The first hook 5500*a* includes: (1) an upwardly facing top surface; (2) a downwardly facing bottom surface 5520*a*; (3) an outwardly facing edge connecting the upwardly facing top surface and the downwardly facing bottom surface 5520*a*; and (4) an outwardly facing edge connecting the upwardly facing top surface, the downwardly facing bottom surface 5520*a*, and the outwardly facing edge. The downwardly facing bottom surface 5520*a* is configured to engage with the first side 21*a* of the support beam 20*a*. When engaging with the first side 21*a* of the support beam 20*a*, the first hook 5500*a* enables the installer to manually move the bracket 5100 along the first side 21*a* of the support beam 20*a*. This enables the installer to properly position the brackets 4100, and therefore, the wooden block 10 between two support beams 20*a* and 20*b*.

The second hook 5500*b* includes: (1) an upwardly facing top surface; (2) a downwardly facing bottom surface 5520*b*; (3) an outwardly facing edge connecting the upwardly facing top surface and the downwardly facing bottom surface 5520*b*; and (4) an outwardly facing edge connecting the upwardly facing top surface, the downwardly facing bottom surface 5520*b*, and the outwardly facing edge. The downwardly facing bottom surface 5520*b* is configured to engage with the first side 21*a* of the support beam 20*a*. When engaging with the first side 21*a* of the support beam 20*a*, the second hook 5500*b* enables the installer to manually move the bracket 5100 along the first side 21*a* side of the support beam 20*a*. This enables the installer to properly position the bracket 5100, and therefore, a wooden block 10 between two support beams 20*a* and 20*b*.

It should be appreciated that multiple brackets 5100 will or can be used together on adjacent, spaced apart support beams.

Figure 26:
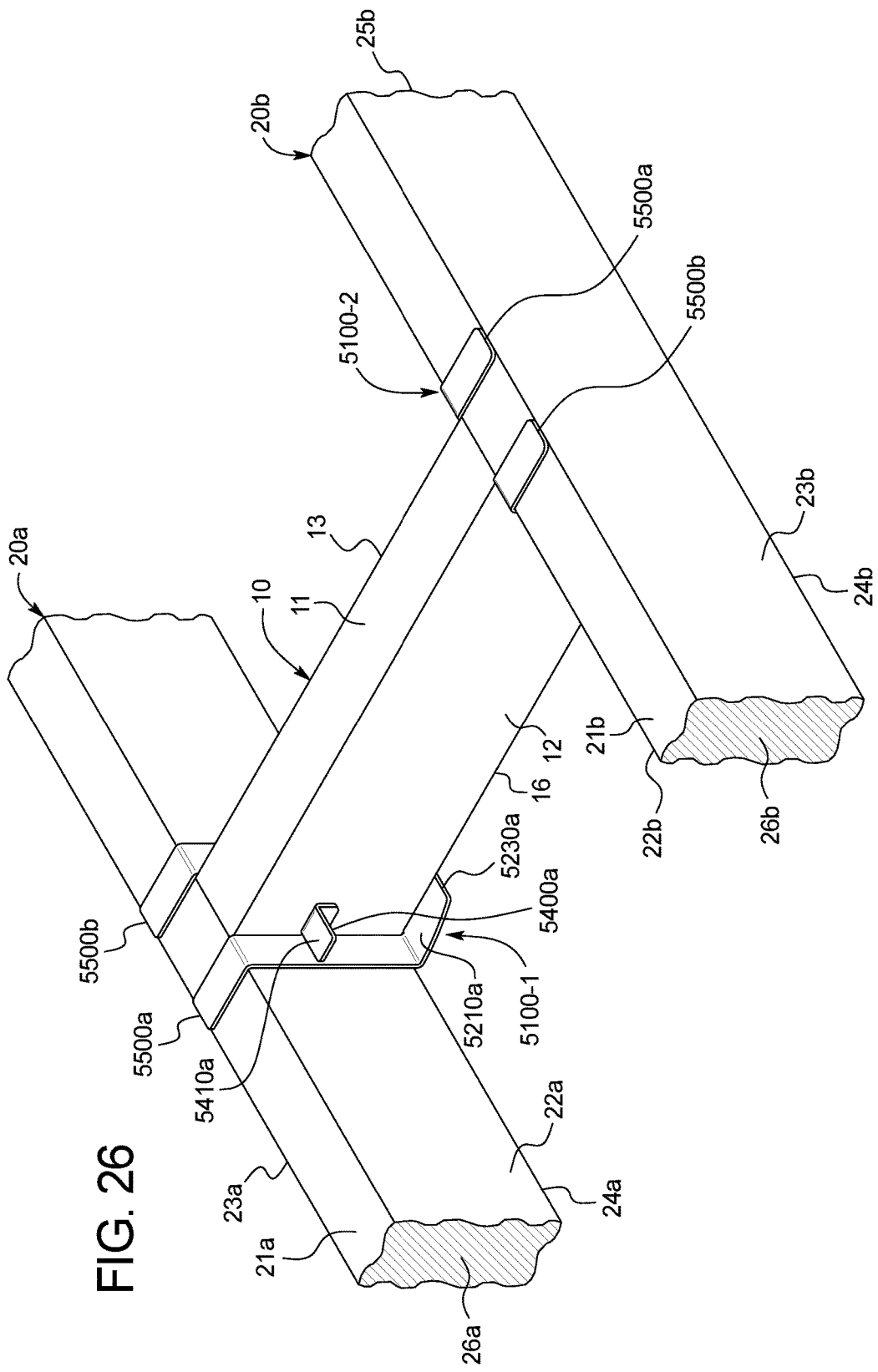
FIG. 26 is a perspective view of the wooden block in the perpendicular orientation positioned between two support beams using two brackets of FIG. 25.

FIG. 26 illustrates one method of the present disclosure of using the bracket 5100 for perpendicular blocking in the first position.

The method includes measuring the distance between the two inwardly facing sides 22*a* and 22*b* of the support beams 20*a* and 20*b*. The method further includes cutting a wooden block 10 to this measured length. After cutting the wooden block 10, the method includes placing one bracket 5100-1 on to the support beam 20*a* and another bracket 5100-2 on to the support beam 20*b*. More specifically, the downwardly facing bottom surface 5520*a* of the first hook 5500*a* of the bracket 5100-1 and the downwardly facing bottom surface 5520*b* of the second hook 5500*b* of the bracket 5100-1 engage with the first side 21*a* of the support beam 20*a*. The inwardly facing side surface of the first stud side engager 5400*a* of the bracket 5100-1 and the inwardly facing side surface of the second stud side engager 5400*b* of the bracket 5100-1 engage with the second side 22*a* of the support beam 20*a*. The bracket 5100-2 is placed on to the support beam 20*b* in a similar manner and directly opposite of the bracket 5100-1 such the outwardly facing base 5200*a* of the bracket 5100-1 faces towards the outwardly facing base 5200*b* of the bracket 5100-2.

The method further includes placing one side of the wooden block 10 onto the upwardly facing top surface 5210*a* of the first base 5200*a* of the bracket 5100-1. More specifically, the fourth side 14 of the wooden block 10 aligns with the outwardly facing edge 5230*a* of the first base 5200*a* of the bracket 5100-1. The second side 12 of the wooden block 10 is configured to engage with the inwardly facing block positioner 5450*a* of the second base 5400*a* of the bracket 5100-1, and the third side 13 of the wooden block 10 is configured to engage with the inwardly facing block positioner 5450*a* of the third base 5400*a* of the bracket 5100-1. The method further includes placing the opposing end of the wooden block 10 onto the upwardly facing top surface 5210*b* of the first base 5200*b* of the bracket 5100-2. More specifically, the fifth side 15 of the wooden block 10 aligns with the outwardly facing edge 5230*b* of the first base 5200*b* of the bracket 5100-2. The second side 12 of the wooden block 10 is configured to engage with the inwardly facing block positioner 5450*a* of the second base 5400*a* of the bracket 5100-2, and the third side 13 of the wooden block 10 is configured to engage with the inwardly facing block positioner 5450*b* of the third base 5400*c* of the bracket 5100-2. It should be appreciated that either the first side 11 of the wooden block 10 or the sixth side 16 of the wooden block 10 can rest on the upwardly facing top surface 5410*a* of the base 5200a of the bracket 5100-1 and on the upwardly facing top surface 5410b of the first base 5200b of the bracket 5100-2.

Prior to connecting the wooden block 10 the support beams 20a and 20b, the method can include changing the position of the brackets 5100 and the wooden block 10 relative to the support beams 20a and 20b if necessary.

After positioning the wooden block 10 between the two support beams 20a and 20b, the method includes connecting the wooden block 10 to the support beam 20a and to the support beam 20b. More specifically, the method includes toe nailing the wooden block 10 into the second side 22a of the support beam 20a. The method further includes toe nailing the wooden block 10 into the second side 22b of the support beam 20b. It should be appreciated that the order in which side is toe nailed first is not important to proper installation of the wooden block 10.

Figure 27:
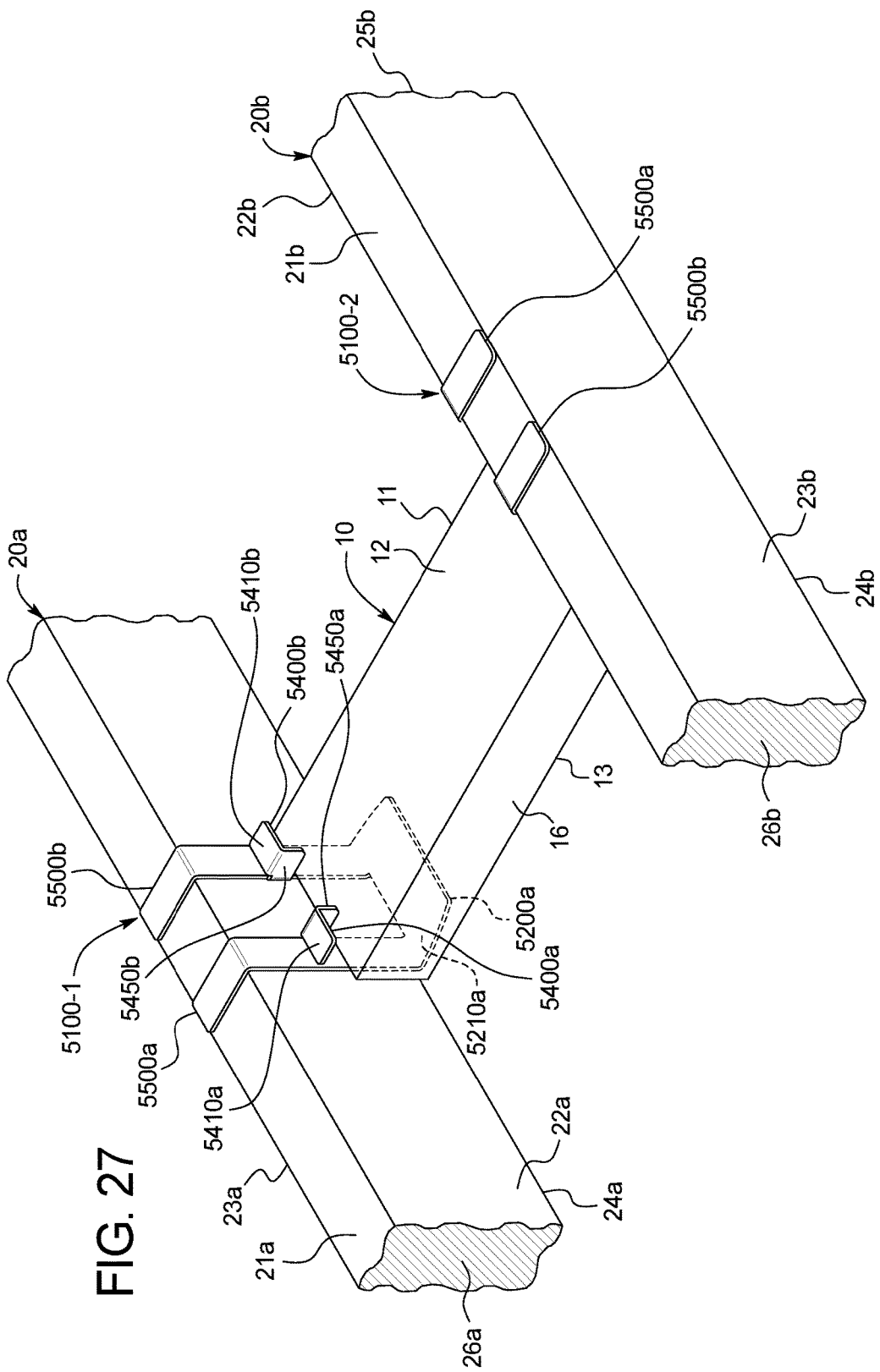
FIG. 27 is a perspective view of the wooden block in the first position parallel orientation positioned between two support beams using two brackets of FIG. 25.

FIG. 27 illustrates another method of the present disclosure of using the same bracket 5100 for parallel blocking in the first position.

The method includes measuring the distance between the two inwardly facing sides 22a and 22b of the support beams 20a and 20b. The method further includes cutting a wooden block 10 to this measured length. After cutting the wooden block 10, the method includes placing one bracket 5100-1 on to the support beam 20a and another bracket 5100-2 on to the support beam 20b. More specifically, the downwardly facing bottom surface 5520a of the first hook 5500a of the bracket 5100-1 and the downwardly facing bottom surface 5520b of the second hook 5500b of the bracket 5100-1 engage with the first side 21a of the support beam 20a. The inwardly facing side surface of the first stud side engager 5400a of the bracket 5100-1 and the inwardly facing side surface of the second stud side engager 5400b of the bracket 5100-1 engage with the second side 22a of the support beam 20a. The bracket 5100-2 is placed on to the support beam 20b in a similar manner and directly opposite of the bracket 5100-1 such the outwardly facing base 5200a of the bracket 5100-1 faces towards the outwardly facing base 5200b of the bracket 5100-2.

The method further includes placing one side of the wooden block 10 onto the upwardly facing top surface 5210a of the first base 5200a of the bracket 5100-1. More specifically, the fourth side 14 of the wooden block 10 is configured to engage with the outwardly facing side surface 5310a of the first stud side engager 5300a of the bracket 5100-1 and the outwardly facing side surface 5310b of the second stud side engager 5300b of the bracket 5100-1. The method further includes placing the opposing end of the wooden block 10 onto the upwardly facing top surface 5210b of the first base 5200b of the bracket 5100-2. More specifically, the fifth side 15 of the wooden block 10 is configured to engage with the outwardly facing side surface 5310a of the first stud side engager 5300a of the bracket 5100-2 and the outwardly facing side surface 5310b of the second stud side engager 5300b of the bracket 5100-2. It should be appreciated that either the second side 12 of the wooden block 10 or the third side 13 of the wooden block 10 can rest on the upwardly facing top surface 5410a of the base 5200a of the bracket 5100-1 and on the upwardly facing top surface 5410b of the first base 5200b of the bracket 5100-2.

Prior to connecting the wooden block 10 to the support beams 20a and 20b, the method can include changing the position of the brackets 5100 and the wooden block 10 relative to the support beams 20a and 20b if necessary.

After positioning the wooden block 10 between the two support beams 20a and 20b, the method includes connecting the wooden block 10 to the support beam 20a and to the support beam 20b. More specifically, the method includes toe nailing the wooden block 10 into the second side 22a of the support beam 20a. The method includes toe nailing the wooden block 10 into the second side 22b of the support beam 20b. It should be appreciated that the order in which side is toe nailed first is not important to proper installation of the wooden block 10.

Figure 28:
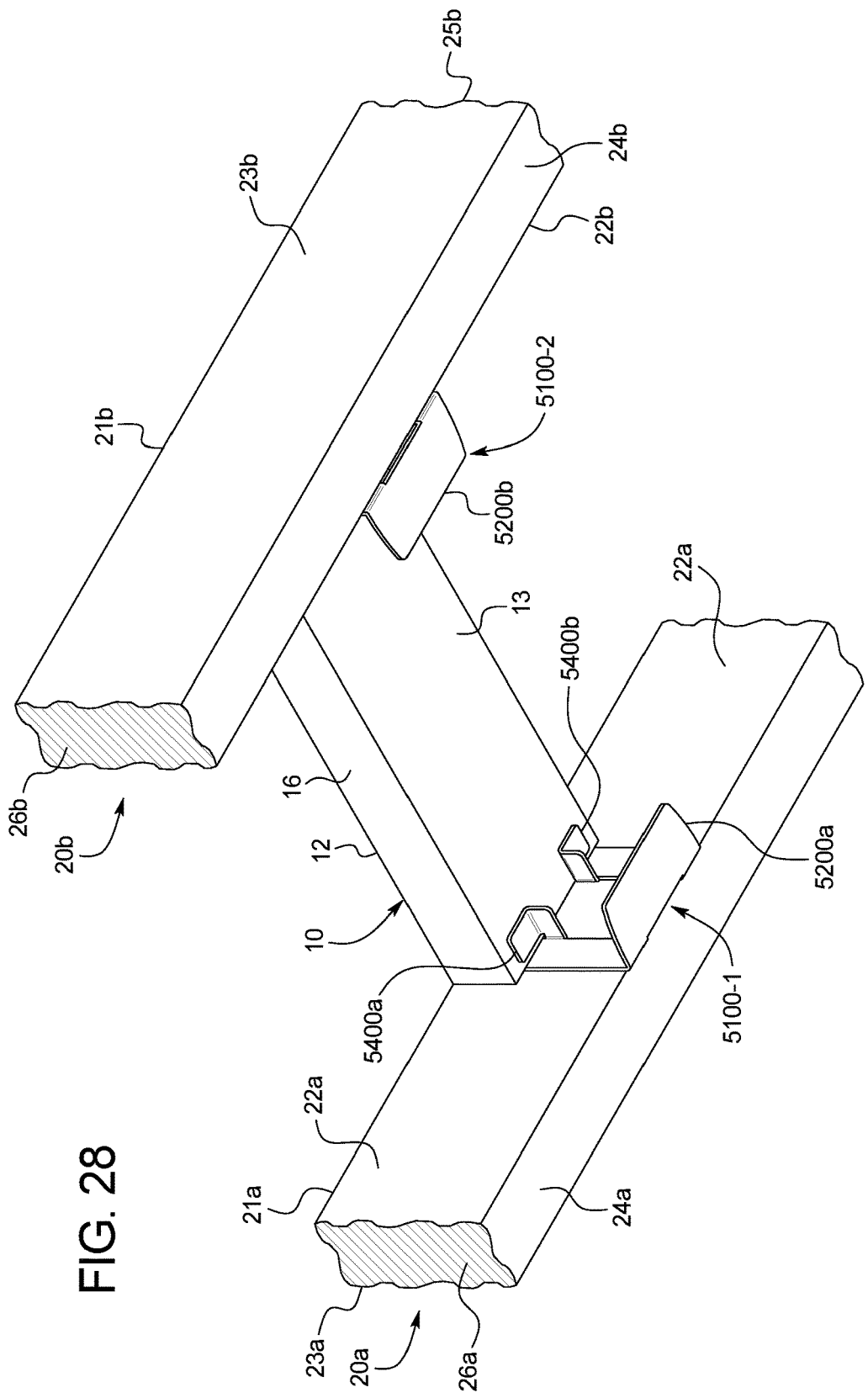
FIG. 28 is a bottom perspective view of the wooden block in the second position parallel orientation positioned between two support beams using two brackets of FIG. 25.

FIG. 28 illustrates another method of the present disclosure of using the same bracket 5100 for parallel blocking in the second position.

The method includes measuring the distance between the two inwardly facing sides 22a and 22b of the support beams 20a and 20b. The method further includes cutting a wooden block 10 to this measured length. After cutting the wooden block 10, the method includes placing one bracket 5100-1 on to the support beam 20a and another bracket 5100-2 on to the support beam 20b. More specifically, the downwardly facing bottom surface 5520a of the first hook 5500a of the bracket 5100-1 and the downwardly facing bottom surface 5520b of the second hook 5500b of the bracket 5100-1 engage with the first side 21a of the support beam 20a. The inwardly facing side surface of the first stud side engager 5400a of the bracket 5100-1 and the inwardly facing side surface of the second stud side engager 5400b of the bracket 5100-1 engage with the second side 22a of the support beam 20a. The bracket 5100-2 is placed on to the support beam 20b in a similar manner and directly opposite of the bracket 5100-1 such the outwardly facing base 3200a of the bracket 5100-1 faces towards the outwardly facing base 3200b of the bracket 5100-2.

The method further includes placing one side of the wooden block 10 onto the upwardly facing top surface 5410a of the second base 5400a of the bracket 5100-1 and onto the upwardly facing top surface 5410b of the third base 5400b of the bracket 5100-1. More specifically, the fourth side 14 of the wooden block 10 is configured to engage with the outwardly facing side surface 5310a of the first stud side engager 5300a of the bracket 5100-1 and is configured to engage with the outwardly facing side surface 5310b of the second stud side engager 5300b of the bracket 5100-1. The method further includes placing the opposing end of the wooden block 10 onto the upwardly facing top surface 5410a of the second base 5400a of the bracket 5100-2 and onto the third base 5410b of the third base 5400b of the bracket 5100-2. More specifically, the fourth side 14 of the wooden block 10 is configured to engage with the outwardly facing side surface 5310a of the first stud side engager 5300a of the bracket 5100-2 and is configured to engage with the outwardly facing side surface 5310b of the second stud side engager 5300b of the bracket 5100-2. It should be appreciated that either the second side 12 of the wooden block 10 or the third side 13 of the wooden block 10 can rest on the upwardly facing top surface 5410a of the second base 5400a and on the upwardly facing top surface 5410b of the third base 5400b of the bracket 5100-1. It should be further appreciated that the second side 12 of the wooden block 10 or the third side 13 of the wooden block 10 can rest on the upwardly facing top surface 5410a of the second base 5400a and on the upwardly facing top surface 5410b of the third base 5400b of the bracket 5100-2.

Prior to connecting the wooden block 10 to the support beams 20a and 20b, the method can include changing the position of the brackets 5100 and the wooden block 10 relative to the support beams 20a and 20b if necessary.

After positioning the wooden block 10 between the two support beams 20a and 20b, the method includes connecting the wooden block 10 to the support beam 20a and to the support beam 20b. More specifically, the method includes toe nailing the wooden block 10 into the second side 22a of the support beam 20a. The method includes toe nailing the wooden block 10 into the second side 22b of the support beam 20b. It should be appreciated that the order in which side is toe nailed first is not important to proper installation of the wooden block 10.

VARIOUS ADVANTAGES AND ALTERNATIVES

It should be appreciated that various embodiments of the brackets 100, 1100, 2100, 3100, 4100, and 5100 of the present disclosure can be made of a suitable metal such as steel. It should further be appreciated that the brackets 100, 1100, 2100, 3100, 4100, and 5100 of the present disclosure can be made of other suitable materials.

It should be appreciated that in various embodiments of the bracket of the present disclosure, the length of the bracket (as defined from the upwardly facing top surface of the first hook, the upwardly facing top surface of the second hook, the upwardly facing top surface of the first connecting hook, or the upwardly facing top surface of the second connecting hook to the downwardly facing bottom surface of the lower base) is greater than the length of the second side 22a of the support beam 20a or the length of the second side 22b of the support beam 20b.

It should be further appreciated that in various embodiments the length of the first hook and the length of the second hook of the bracket of the present disclosure are less than the length of the first side 21a of the support beam 20a or the length of the first side 21b of the support beam 20b.

It should be further appreciated that in various embodiments the length of the first connecting hook and the length of the second connecting hook of the bracket of the present disclosure are greater than the length of the first side 21a of the support beam 20a or the length of the first side 21b of the support beam 20b.

One advantage to using various embodiments of the bracket of the present disclosure is that the brackets and wooden block between two support beams are movable prior to nailing or otherwise fastening. This enables an installer to properly position the wooden block between two support beams in a more efficient and time saving manner. Additionally, the faster installation process enables the installer to not have to bend over as much, therefore providing a more comfortable and easier installation process.

Another advantage to using various embodiments of the bracket of the present disclosure is that the bracket provides support and stability when nailing the wooden block to the support beam. Therefore, the installer does not need to hold the wooden block to secure it while nailing it to the support beam. This improves the probability that the wooden block will not move while nailing the wooden block to the support beam, therefore providing a better method of properly installing the wooden block between two support beams. This also improves the safety of the installation process because the installer's hand can be out of the way when nailing.

It should thus be appreciated from the above that in one embodiment of the bracket of the present disclosure includes: (1) an outwardly facing base; (2) a first block positioner connected to and extending upwardly from the base; (3) a second block positioner connected to and extending upwardly from the base; (4) a first stud side engager connected to and extending transversely to the first block positioner; (5) a second stud side engager connected to and extending transversely to the second block positioner; (6) a first hook connected to and extending transversely to the first stud side engager; and (7) a second hook connected to and extending transversely to the second stud side engager.

It should also be appreciated from the above that in another embodiment, the bracket of the present disclosure includes: (1) an outwardly facing base; (2) a first block positioner connected to and extending upwardly from the base; (3) a second block positioner connected to and extending upwardly from the base; (4) a first stud side engager connected to and extending transversely to the first block positioner; (5) a second stud side engager connected to and extending transversely to the second block positioner; (6) a first hook connected to and extending transversely to the first block positioner; and (7) a second hook connected to and extending transversely to the second block positioner.

It should also be appreciated from the above that in another embodiment, the bracket of the present disclosure includes: (1) an outwardly facing first base; (2) a first block positioner connected to and extending upwardly from the first base; (3) a second block positioner connected to and extending upwardly from the first base; (4) a first stud side engager connected to and extending transversely to the first block positioner; (5) a second stud side engager connected to and extending transversely to the second block positioner; (6) an outwardly facing second base; (7) a third block positioner connected to and extending upwardly from the second base; (8) a fourth block positioner connected to and extending upwardly from the second base; (9) a third stud side engager connected to and extending transversely to the third block positioner; (10) a fourth stud side engager connected to and extending transversely to the fourth block positioner; (11) a first connecting hook connecting the first block positioner and the wooden block third block positioner; and (12) a second connecting hook connecting the second block positioner and the fourth block positioner.

It should also be appreciated from the above that in another embodiment, the bracket of the present disclosure includes: (1) an outwardly facing first stationary base; (2) a first stud side engager connected to and extending upwardly from the first base; (3) a second stud side engager connected to and extending upwardly from the first base; (4) a second movable base connected to the first stud side engager; (5) a third movable base connected to the second stud side engager; (6) a first hook connected to and extending transversely to the first stud side engager; and (7) a second hook connected to and extending transversely to the second stud side engager.

It should also be appreciated from the above that in another embodiment, the bracket of the present disclosure includes: (1) an outwardly facing first or lower base; (2) a first stud side engager connected to and extending upwardly from the lower base; (3) a second stud side engager connected to and extending upwardly from the lower base; (4) a second or upper base connected to the first stud side engager; (5) a third or upper base connected to the second stud side engager; (6) a first hook connected to and extending transversely to the first stud side engager; and (7) a second hook connected to and extending transversely to the second stud side engager.

It should also be appreciated from the above that in another embodiment, the bracket of the present disclosure includes: (1) an outwardly facing first lower base; (2) a first stud side engager connected to the first lower base; (3) a second stud side engager connected to the first lower base;

(4) a second or upper base connected to the first stud side engager; (5) a third or upper base connected to the second stud side engager; (6) an outwardly facing fourth or lower base; (7) a third stud side engager connected to the fourth or lower base; (8) a fourth stud side engager connected to the fourth or lower base; (9) a fifth or upper base connected to the third stud side engager; (10) a sixth or upper base connected to the fourth stud side engager; (11) a first connecting hook connecting the first stud side engager and the third stud side engager; and (12) a second connecting hook connecting the second stud side engager and the fourth stud side engager.

It should be appreciated that the components or parts listed for the brackets 100, 1100, 2100, 3100, 4100, and 5100 in the present disclosure are integrally connected; however, it should be appreciated that in alternative embodiments, two or more of the components are otherwise suitably connected.

It will be understood that modifications and variations may be effected without departing from the scope of the novel concepts of the present invention, and it is understood that this application is to be limited only by the scope of the claims.

The invention is claimed as follows:

1. A wall panel blocking bracket comprising:
   a first base;
   a first stud side engager connected to and extending upwardly from the first base, the first stud side engager configured to engage a first support beam;
   a second stud side engager connected to and extending upwardly from the first base, the second stud side engager configured to engage the first support beam;
   a second base connected to the first stud side engager and spaced apart from the first base, wherein the second base is connected to the first base via the first stud side engager;
   a third base connected to the second stud side engager and spaced apart from the first base, wherein the third base is connected to the first base via the second stud side engager;
   a first hook extending transversely from the first stud side engager, the first hook configured to engage the first support beam; and
   a second hook extending transversely from the second stud side engager, the second hook configured to engage the first support beam,
   wherein the first base is configured to engage a block when the block is in a first orientation, and wherein the second base and the third base are configured to engage the block when the block is in a second orientation different from the first orientation.

2. The wall panel blocking bracket of claim 1, wherein the second base and the third base are configured to be at a same distance from the first base.

3. The wall panel blocking bracket of claim 1, wherein the second base and the third base are at a same level relative to each other.

4. The wall panel blocking bracket of claim 1, wherein the second base includes a top surface configured to support the block and a block side engager.

5. The wall panel blocking bracket of claim 1, wherein the third base includes a top surface configured to support the block and a block side engager.

6. The wall panel blocking bracket of claim 1, which is configured to partially support the block adjacent to the support beam in any of three different orientations.

7. The wall panel blocking bracket of claim 6, which is configured to partially support the block adjacent to the support beam in any one of a perpendicular orientation, a first position parallel orientation, and a second different position parallel orientation.

8. A wall panel blocking bracket comprising:
   a first base;
   a first stud side engager connected to and extending upwardly from the first base, the first stud side engager configured to engage a first support beam;
   a second stud side engager connected to and extending upwardly from the first base, the second stud side engager configured to engage the first support beam;
   a second base connected to the first stud side engager and spaced apart from the first base, wherein the second base is connected to the first base via the first stud side engager;
   a third base connected to the second stud side engager and spaced apart from the first base, wherein the third base is connected to the first base via the second stud side engager;
   a fourth base extending in the opposite direction of the first base;
   a third stud side engager connected to and extending upwardly from the second base, the third stud side engager configured to engage the first support beam;
   a fourth stud side engager connected to and extending upwardly from the fourth base, the fourth stud side engager configured to engage the first support beam;
   a fifth base connected to the third stud side engager and spaced apart from the fourth base, wherein the fifth base is connected to the fourth base via the third stud side engager;
   a sixth base connected to the fourth stud side engager and spaced apart from the fourth base, wherein the sixth base is connected to the fourth base via the fourth stud side engager;
   a first connecting hook connecting the first stud side engager and the third stud side engager, the first connecting hook configured to engage the first support beam; and
   a second connecting hook connecting the second stud side engager and the fourth stud side engager, the second connecting hook configured to engage the first support beam,
   wherein the first base is configured to engage a first block when the first block is in a first orientation, and wherein the second base and the third base are configured to engage the first block when the first block is in a second orientation different from the first orientation, and
   wherein the fourth base is configured to engage a second block when the second block is in a first orientation, and wherein the fifth base and sixth base are configured to engage the second block when the second block is in a second orientation different from the first orientation.

9. The wall panel blocking bracket of claim 8, wherein the second base and the third base are configured to be at a same distance from the first base.

10. The wall panel blocking bracket of claim 8, wherein the second base and the third base are at a same level relative to each other.

11. The wall panel blocking bracket of claim 8, wherein the fifth base and the sixth base are configured to be at a same distance from the fourth base.

12. The wall panel blocking bracket of claim 8, wherein the fifth base and the sixth base are at a same level relative to each other.

13. The wall panel blocking bracket of claim 8, wherein the second base, the third base, the fifth base, and the sixth base are at a same level relative to each other.

14. The wall panel blocking bracket of claim 8, wherein the second base, third base, fifth base, and sixth base each include a top surface and a block side engager.

15. The wall panel blocking bracket of claim 8, which is configured to partially support the first block and the second block, each adjacent to the support beam in any of three different orientations.

16. The wall panel blocking bracket of claim 15, which is configured to partially support the first block and the second block, each adjacent to the support beam in any one of a perpendicular orientation, a first position parallel orientation, and a second different position parallel orientation.

* * * * *